US008080196B2

(12) United States Patent
Martin et al.

(10) Patent No.: US 8,080,196 B2
(45) Date of Patent: Dec. 20, 2011

(54) METHOD AND APPARATUS TO ACHIEVE CRYSTALLIZATION OF POLYMERS UTILIZING MULTIPLE PROCESSING SYSTEMS

(75) Inventors: Wayne Martin, Buchanan, VA (US); George Norman Benoit, Jr., Clifton Forge, VA (US); Robert Gene Mann, Covington, VA (US); Charles W. Simmons, Fincastle, VA (US); Roger Blake Wright, Staunton, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 824 days.

(21) Appl. No.: 12/029,963

(22) Filed: Feb. 12, 2008

(65) Prior Publication Data

US 2009/0203840 A1  Aug. 13, 2009

(51) Int. Cl.
*B29B 9/06* (2006.01)
*F26B 7/00* (2006.01)
*B01D 9/00* (2006.01)
*C08F 6/00* (2006.01)

(52) U.S. Cl. ........ 264/142; 264/345; 528/484; 528/499; 528/503; 34/382; 23/295 R

(58) Field of Classification Search .................. 264/142, 264/345; 528/499, 503, 484; 34/382; 23/295 R
See application file for complete search history.

(56) References Cited

U.S. PATENT DOCUMENTS

| | | | |
|---|---|---|---|
| 2,918,701 A | 12/1959 | Hull et al. | |
| 3,458,045 A | 7/1969 | Dudley | |
| 3,988,085 A | 10/1976 | Krchma | |
| 4,123,207 A | 10/1978 | Dudley | |
| 4,218,323 A | 8/1980 | McCracken | |
| 4,251,198 A | 2/1981 | Altenburg | |
| 4,447,325 A | 5/1984 | Pauley | |
| 4,500,271 A | 2/1985 | Smith | |
| 4,565,015 A | 1/1986 | Hundley, III | |
| 4,621,996 A | 11/1986 | Hundley, III | |
| 4,728,176 A | 3/1988 | Tsuboyama et al. | |
| 4,888,990 A | 12/1989 | Bryan et al. | |
| 4,896,435 A | 1/1990 | Spangler, Jr. | |
| 5,059,103 A | 10/1991 | Bruckmann et al. | |
| 5,265,347 A | 11/1993 | Woodson et al. | |
| 5,403,176 A | 4/1995 | Bruckmann et al. | |
| 5,624,688 A | 4/1997 | Adams et al. | |
| 5,638,606 A | 6/1997 | Bryan et al. | |
| 6,138,375 A | 10/2000 | Humphries, II et al. | |
| 6,237,244 B1 | 5/2001 | Bryan et al. | |
| 6,270,831 B2 | 8/2001 | Kumar et al. | |
| 6,332,765 B1 | 12/2001 | Spelleken | |
| 6,544,658 B2 | 4/2003 | Robbins | |
| 6,551,087 B1 | 4/2003 | Martin | |
| 6,739,457 B2 | 5/2004 | Humphries, II et al. | |
| 6,790,228 B2 | 9/2004 | Hossainy et al. | |
| 6,793,473 B1 | 9/2004 | Fridley | |
| 6,807,748 B2 | 10/2004 | Bryan et al. | |
| 6,824,371 B2 | 11/2004 | Smit | |
| 6,925,741 B2 | 8/2005 | Eloo et al. | |
| 7,024,794 B1 | 4/2006 | Mynes | |
| 7,033,152 B2 | 4/2006 | Eloo et al. | |
| 7,157,032 B2 | 1/2007 | Eloo | |
| 7,172,397 B2 | 2/2007 | Fridley | |
| 7,192,545 B2 | 3/2007 | Ekart et al. | |
| 7,250,486 B1 | 7/2007 | McGehee | |
| 2002/0185584 A1 | 12/2002 | Westmoreland | |
| 2005/0004341 A1 | 1/2005 | Culbert et al. | |
| 2005/0062186 A1 | 3/2005 | Fellinger | |
| 2005/0065318 A1 | 3/2005 | Jernigan et al. | |
| 2005/0085620 A1 | 4/2005 | Bruckmann | |
| 2005/0110182 A1 | 5/2005 | Eloo | |
| 2005/0154183 A1* | 7/2005 | Ekart et al. | 528/486 |
| 2005/0167876 A1 | 8/2005 | Kreyenborg | |
| 2005/0220920 A1 | 10/2005 | Fridley | |
| 2006/0079620 A1 | 4/2006 | Greene et al. | |
| 2006/0130353 A1 | 6/2006 | Eloo | |
| 2006/0165834 A1 | 7/2006 | Fridley | |
| 2007/0132134 A1 | 6/2007 | Eloo | |
| 2007/0134488 A1 | 6/2007 | Hayakawa | |
| 2007/0187860 A1 | 8/2007 | Bonner | |
| 2007/0232732 A1 | 10/2007 | Adams et al. | |
| 2009/0110833 A1 | 4/2009 | Wright et al. | |

FOREIGN PATENT DOCUMENTS

| | | |
|---|---|---|
| DE | 1953741 | 5/1971 |
| DE | 2819443 | 11/1979 |
| DE | 3243332 | 1/1984 |
| DE | 8701490 | 7/1987 |
| DE | 3702841 | 8/1987 |
| DE | 4330078 | 3/1994 |
| DE | 9320744 | 3/1995 |
| DE | 19642389 | 4/1997 |

(Continued)

OTHER PUBLICATIONS

International Search Report and Written Opinion dated Oct. 7, 2009 for PCT Application No. PCT/US2009/033912.

(Continued)

*Primary Examiner* — Fred M Teskin

(74) *Attorney, Agent, or Firm* — Jihan A.R. Jenkins, Esq.; Ryan A. Schneider, Esq.; Troutman Sanders LLP

(57) ABSTRACT

A continuous process wherein polymers or polymeric materials can be subjected to multiple sequential processing systems of differing temperatures and process conditions to synergistically enhance the pelletization and crystallization of those polymers and polymeric formulations, dispersions, and solutions. The multiple sequential processing systems include the processes and equipment for mixing/extrusion, pelletization, multiple transportation processes, crystallization, multiple drying processes, and optional post-processing manipulations of pellets formed. Multiple serial and/or parallel crystallization processing systems are disclosed.

19 Claims, 34 Drawing Sheets

FOREIGN PATENT DOCUMENTS

| | | |
|---|---|---|
| DE | 19651354 | 6/1997 |
| DE | 19708988 | 10/1997 |
| DE | 29624638 | 4/2006 |
| EP | 1033545 | 9/2000 |
| EP | 1218156 | 7/2002 |
| EP | 1582327 | 10/2005 |
| EP | 1602888 | 12/2005 |
| EP | 1647788 | 4/2006 |
| EP | 1650516 | 4/2006 |
| EP | 1684961 | 8/2006 |
| WO | WO 96/22179 | 7/1996 |
| WO | WO-00/23497 | 4/2000 |
| WO | WO-2005/051623 | 6/2005 |
| WO | WO-2006/069022 | 6/2006 |
| WO | WO-2006/081140 | 8/2006 |
| WO | WO-2006/087179 | 8/2006 |
| WO | WO-2006/127698 | 11/2006 |
| WO | WO-2006/128408 | 12/2006 |
| WO | WO-2007/064580 | 6/2007 |

OTHER PUBLICATIONS

USPTO Office Action mailed Apr. 16, 2010 for U.S. Appl. No. 11/932,067.

USPTO Office Action mailed Nov. 20, 2009 for U.S. Appl. No. 11/932,067.

USPTO Advisory Action mailed Aug. 4, 2010 for U.S. Appl. No. 11/932,067.

* cited by examiner

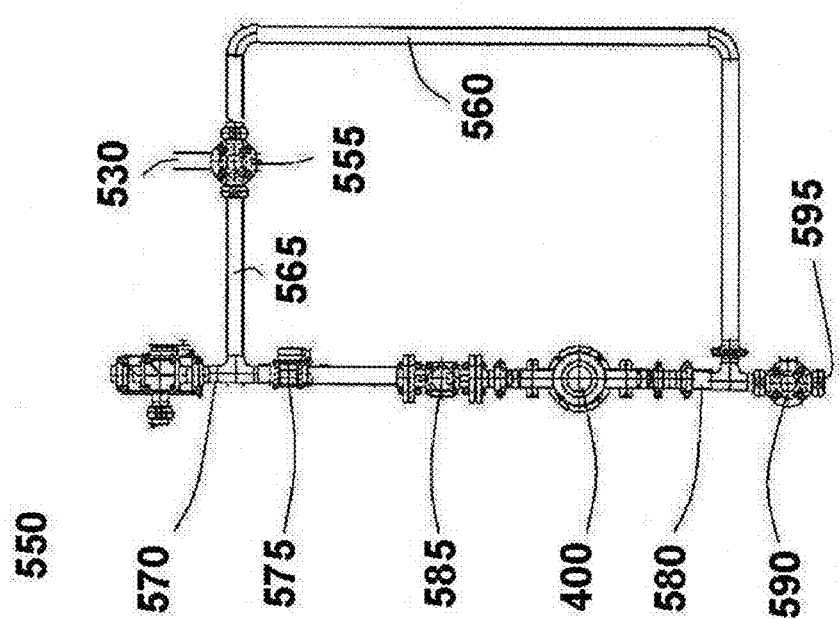

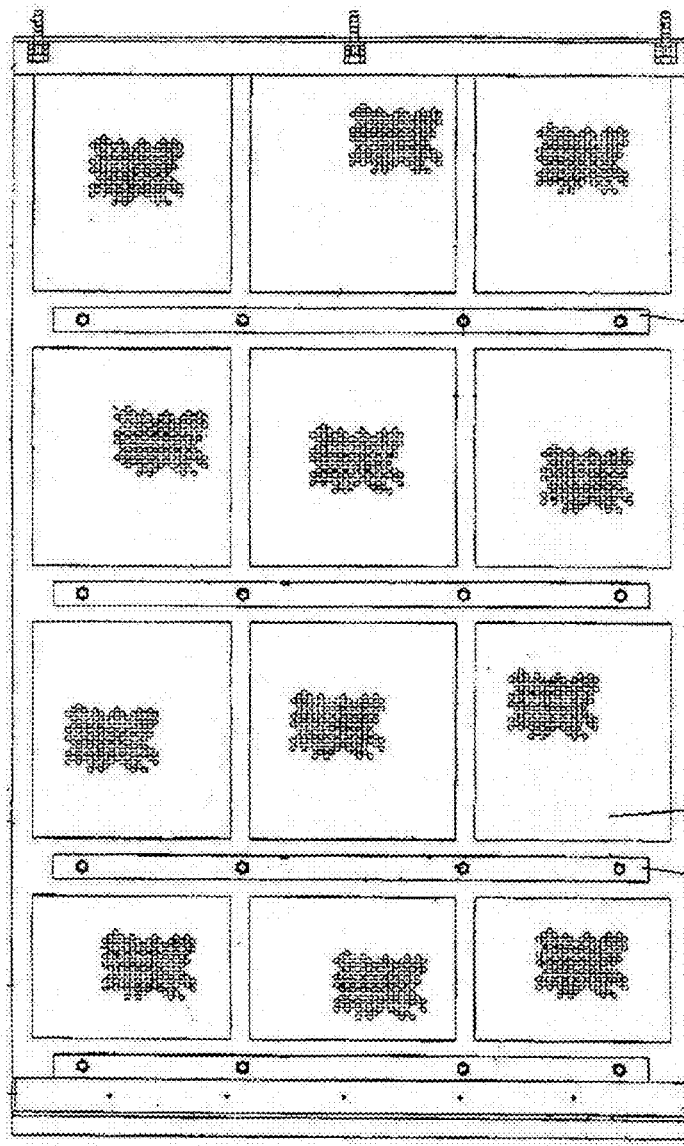
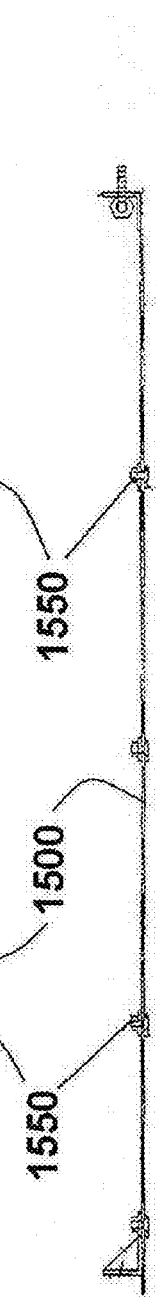
FIG. 30
FIG. 31

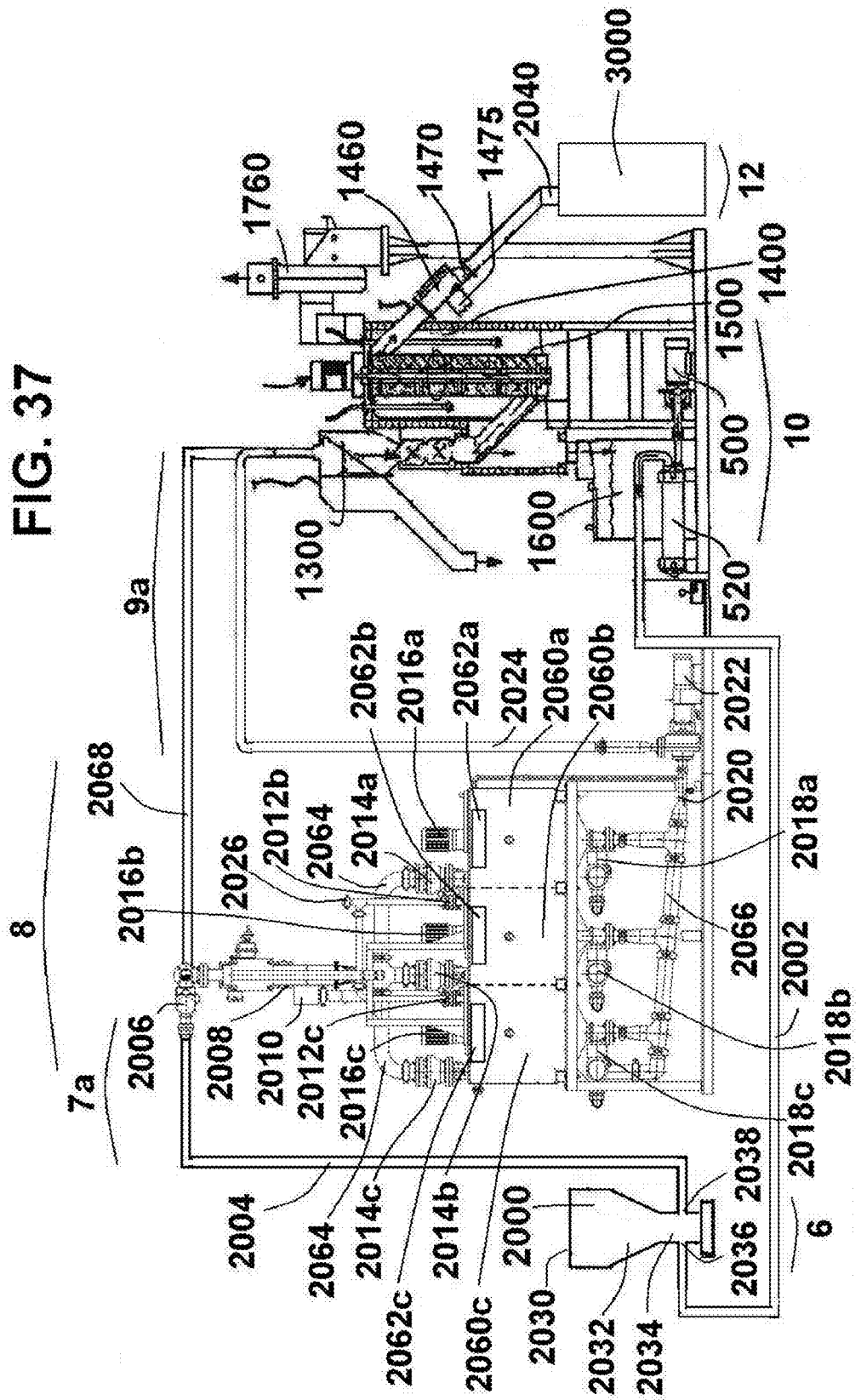

METHOD AND APPARATUS TO ACHIEVE CRYSTALLIZATION OF POLYMERS UTILIZING MULTIPLE PROCESSING SYSTEMS

BACKGROUND OF THE INVENTION

1. Field of the Invention

The present invention generally relates to a continuous process of subjecting polymeric material to a multiple sequential processing system, wherein each processing step of the system operates at different processing conditions to synergistically enhance the pelletization and crystallization of polymer and polymeric formulations, dispersions, and solutions.

2. Description of the Prior Art

The generally independent processes and equipment in the conventional multiple sequential processing system of polymeric material are known, some for many years, and used in various applications. As used herein, the term "multiple sequential processing system" includes the steps, processes and equipment for mixing/extrusion, pelletization, transportation, crystallization, drying, and post-processing manipulations of polymeric material pellets. Yet, the prior art is silent to the controlled and intentional application of these processes in the multiple sequential processing system to synergistically enhance the crystallization of polymeric materials.

Pelletization equipment and its use following extrusion processing have been implemented for many years by the assignee as demonstrated in prior art disclosures including U.S. Pat. Nos. 4,123,207; 4,251,198; 4,500,271; 4,621,996; 4,728,176; 4,888,990; 5,059,103; 5,403,176; 5,624,688; 6,332,765; 6,551,087; 6,793,473; 6,824,371; 6,925,741; 7,033,152; 7,172,397; US Patent Application Publication Nos. 20050220920, 20060165834; German Patents and Applications including DE 32 43 332, DE 37 02 841, DE 87 01 490, DE 196 42 389, DE 196 51 354, DE 296 24 638; World Patent Application Publications WO2006/087179, WO2006/081140, WO2006/087179, and WO2007/064580; and European Patents including EP 1 218 156 and EP 1 582 327. These patents and applications are all owned by the assignee and are included herein by way of reference in their entirety.

Similarly, dryer equipment has been used by the assignee of the present invention for many years as demonstrated in the prior art disclosures including, for example, U.S. Pat. Nos. 3,458,045; 4,218,323; 4,447,325; 4,565,015; 4,896,435; 5,265,347; 5,638,606; 6,138,375; 6,237,244; 6,739,457; 6,807,748; 7,024,794; US Patent Application Publication No. 20060130353; World Patent Application Publication No. WO2006/069022; German Patents and Applications including DE 19 53 741, DE 28 19 443, DE 43 30 078, DE 93 20 744, DE 197 08 988; and European Patents including EP 1 033 545, EP 1 602 888, EP 1 647 788, EP 1 650 516. These patents and applications are all owned by the assignee and are included herein by way of reference in their entirety.

Additionally crystallization processes and equipment are also disclosed by the assignee exemplarily including U.S. Pat. No. 7,157,032; US Patent Application Publication Nos. 20050110182, 20070132134; European Patent Application No. EP 1 684 961; World Patent Application Publication Nos. WO2005/051623 and WO2006/127698. These patents and applications are all owned by the assignee and are included herein by way of reference in their entirety.

Post-processing manipulations as used herein can include thermal manipulation, pellet coating, particle sizing, storage, and packaging of the pellets thusly formed, and are well-known to those skilled in the art.

World Patent Application Publication No. WO/2007/064580 discloses the sequential mixing and/or extrusion processes to provide exceptional control of the temperature, shear, rheology, and subsequent processing conditions facilitating pelletization of high melt index, low viscosity, narrow melting range, polymeric mixtures, formulations, dispersions, or solutions in avoidance of phase separation and die freeze-off, but remains silent as to the importance of, or processes for, crystallization of such materials.

U.S. Pat. No. 2,918,701 discloses the use of water in a cutting chamber that is cool enough to allow the pellet skin to harden quickly to minimize the sticking or jamming of those pellets, yet retain internal heat sufficient for self-drying without being too cool to prevent assumption of the desired shape of the pellet. Water of higher temperatures introduced after the cutting chamber can aid in the drying process. The disclosure remains silent regarding the use of multiple process temperatures and methods to achieve crystallization.

U.S. Patent Application Publication No. 2005/0085620 discloses the use of pelletization wherein the transport water is under pressure. The pellets so produced according to this disclosure and World Patent Application Publication No. WO/2006/128408 are removed from the water, dried, and conveyed to a separate device wherein they are maintained at elevated temperature with agitation to effect crystallization. Similarly, U.S. Patent Application Publication No. 2005/0065318 crystallizes pellets optionally produced by underfluid granulation in a pressurized crystallization chamber at 140° C. with, or preferably without, agitation. Use of a pipe for thermally crystallizing the pellets is disclosed therein.

U.S. Patent Application Publication No. 2005/0062186 discloses a strand granulation device resulting in pellets that are conveyed while hot to a thermal treatment device for solid state crystallization and subsequent polycondensation. An alternate mechanism is disclosed wherein the cooling water for pelletization and the conveyance device are pressurized.

U.S. Pat. No. 7,250,486 discloses the use of a cooling liquid under pressure to solidify granules sufficient for cutting while retaining the bulk temperature of the particle in a range conducive to crystallization. A second warming liquid under pressure replaces the original cooling liquid to maintain this temperature range for crystallization, relying on the exothermic nature of the crystallization process to accelerate the rate of the pellet crystallization. The liquids disclosed are preferably water under pressures ranging from approximately 131 kPa (approximately 19 psig) to approximately 2731 kPa (approximately 136 psig) and may include additives like ethylene glycol to raise the boiling point and potentially lower the effective pressures. Similarly, US Patent Application Publication No. 2005/0167876 discloses a pressurized pelletization process with optional conveyance to a second pressurized vessel for enhancement of crystallization.

U.S. Patent Application Publication No. 2005/0004341 discloses multiple conditioning steps potentially of long, multiple-day duration, prior to crystallization wherein control of the moisture content and/or moisture profile is stressed. Yet, it remains silent as to the continuous and accelerated fluid transport of the pellets between conditioning steps.

World Patent Application Publication No. WO/2000/023497 discloses a multiple step process in which granulation results in a cooled product that is conveyed to a second treatment vessel wherein fluid temperatures are preferably in excess of 100° C. Ethylene glycol and triethylene glycol are preferred alone, in combination, or as additives to the water for maintenance of the temperatures up to 230° C.

U.S. Pat. No. 3,988,085 discloses the use of air injection to facilitate transport of pellets, but remains silent as to an enhancement mechanism for crystallization. The injection of high velocity air or other inert gas into the liquid and pellet slurry line as disclosed in U.S. Pat. No. 7,157,032 increases the speed of the pellets into and through a dryer retaining sufficient heat in the pellets to initiate self-crystallization. Yet, it remains silent as to the use of multiple sequential processing systems for the enhancement of crystallization.

World Patent Application Publication No. WO/2006/127698 similarly discloses the injection of high velocity air to retain sufficient internal heat in pellets for self-initiation of crystallization. It further discloses the use of a pellet crystallization system that optionally and sequentially can be attached to a dryer or to a vibratory unit to provide additional crystallization and cooling for the pellets. It further discloses the enhancement of crystallization effected by the residual latent heat of the pellets and subsequent cooling following drying as facilitated by a 20 second to 120 second retention period of those pellets on a vibratory unit. WO/2006/127698 remains silent as to the use and benefits of differing temperatures in the sequential processing systems as well as the duration of time achieved by the pellet crystallization system for the synergistic enhancement of that crystallization.

What is needed, therefore, is a multiple sequential processing system to facilitate the thermal, shear, and Theological control of pelletization, and to enhance crystallization of pellets formed. Each of the processes/steps of such a multiple sequential processing system is operated at certain processing conditions (for example, temperature, pressure, flow rate, residence time, and transfer agent), and a beneficial multiple sequential processing system would utilize processes/steps wherein no two processes/steps of the system would utilize an equivalent set of processing conditions. For example, a beneficial system would utilize processes/steps that each differ from another in at least one processing condition, for example, operational temperature ranges, and wherein crystallization processes/steps preferably are not at temperatures in excess of the boiling point of water. Transfer between the sequential processes of the system is optionally expedited to retain the internal heat of the pellets, and residence time in each process of the system is specific to a particular material providing the maximum synergistic crystallization for that material wherein introduction of additional pressure and/or additives to achieve higher boiling points and the associated safety hazards therewith are preferably not essential to enhance crystallization of the pellets. It is to such a method that the present invention is primarily directed.

BRIEF SUMMARY OF THE INVENTION

Briefly described, in preferred form, the present invention is a method for controlling the mixing and extrusion processes to facilitate pelletization of otherwise problematic materials including high melt index, low viscosity polymers and polymeric formulations, dispersions, and solutions and further facilitating transport, crystallization, drying, and post-processing manipulations of such materials. The individual processes/steps of the present multiple sequential processing system work synergistically to enhance crystallization, preferably in which each independent process is operated at different processing conditions than are others of the processing systems.

In one preferred embodiment, the present invention comprises a method for the crystallization of polymers and polymeric materials using a multiple sequential processing system, the method comprising the steps of feeding, mixing, extruding, pelletizing, first transporting, first drying, second transporting, crystallizing, third transporting, and second drying. Additionally optional steps can include coating and post-processing. It will be understood by those of skill in the art that each of these steps is operated at processing conditions, wherein the particular processing conditions of each step can be different from other steps of the system. As used herein, "processing conditions" include, for example, temperature, pressure, flow rate, residence time, agitation rate, and transfer agent. It will be understood by those of skill in the art that the processing conditions of a particular step of the present system are the various and multiple operating characteristics of that step.

It will be further understood that since "processing conditions" includes more than one operating characteristic/condition, the different steps of the present system might operate at a same single condition, but not at the same of other conditions. For example, each transporting step of the present invention may operate at a different temperature than another (the second and third transporting steps), but all three transporting steps may utilize the same transfer agent, for example, water.

The present multiple sequential processing system incorporates mixing processes facilitated by vessels, static mixers or melt coolers, and/or extruders alone or in series, in which these components can be independently warmed and/or cooled to provide a uniform formulation, mixture, or melt solution thermally, of sufficient shear, and rheologically prepared for pelletization, preferably under liquid. The pellets thusly produced are efficiently transported in pelletization fluid of controlled temperature and optionally can be expedited by inert gas injection maintaining high levels of internal heat in the pellets to and through a dewatering and/or drying process. The pellets are subsequently and preferably immediately entrained in a second independent fluid of different temperature than the pelletization for transport to and through a multiple chamber pellet crystallization system of the same or different temperature providing additional residence time to effect crystallization of those and specific to those pellets. The partially or completely crystallized pellets are preferably immediately transported with optional expedition by inert gas injection to and through a second dewatering and/or drying process into post-processing systems that optionally include vibratory units for further enhancement of crystallization, for coating of pellets, for additional cooling, and ultimately on to storage or further processing manipulations.

The present invention is a method of multiple sequential processing to achieve crystallization of polymeric material comprising providing multiple sequential processing steps to process non-crystallized polymeric material into crystallized and pelletized polymeric material, and operating each of the processing steps at processing conditions, wherein each of the processing steps operates at least one different condition from each of the other of the processing steps. In one embodiment of the present invention, the multiple sequential processing steps comprises transporting steps, and each of the transporting steps operate at a different temperature from the other of the transporting steps, such that temperature is a different processing condition of the processing conditions of the transporting steps, which conditions also would include flow rate and transport media, among others.

In another embodiment of the present invention, a method of multiple sequential processing to achieve crystallization of polymeric material is provided, wherein the process includes feeding the polymeric material to a mixer, mixing the polymeric material in the mixer, extruding the polymeric material from the mixer, pelletizing the extruded polymeric material, first transporting the pelletized polymeric material to a first dryer, first drying the pelletized polymeric material in the first dryer, second transporting the dried pelletized polymeric material to a pellet crystallization system, crystallizing the pelletized polymeric material in the pellet crystallization system, third transporting the crystallized and pelletized polymeric material to a second dryer, and second drying the crystallized and pelletized polymeric material.

In another embodiment of the present invention, a method of multiple sequential processing to achieve crystallization of polymeric material is provided, wherein portions of the components of the equipment for the multiple sequential processing steps are surface treated. The surface treatment protects the at least a portion of at least one component of the multiple sequential processing steps from action of the polymeric material. The surface treatment can comprise one or more component layers. The present invention can further comprise pretreating the at least a portion of at least one component of the multiple sequential processing steps prior to surface treatment.

In one embodiment of the present invention, the surface treatment is metallization. The surface treatment can fixedly attach metal oxides to the at least a portion of at least one component of the multiple sequential processing steps. The surface treatment can fixedly attach metal nitrides to the at least a portion of at least one component of the multiple sequential processing steps. The surface treatment can fixedly attach metal carbonitrides to the at least a portion of at least one component of the multiple sequential processing steps.

The present invention can further comprise over-layering a polymeric coating on the surface treatment. Further, the polymeric coating can applied by reactive polymerization.

Thus, an object of the present invention is to provide a multiple sequential processing system to mix, extrude, pelletize, transport, crystallize, and dry the pellets thus produced.

Another object of the present invention is to provide a multiple sequential processing system in which mixing/extrusion processes involve multiple different processing conditions, facilitating control thermally and rheologically under shear conditions.

A further object of the present invention is to provide a multiple sequential processing system in which various individual transport steps of the present system are at different temperatures in different sequences of the processing.

Still another object of the present invention is to provide expedited transport of the pellets formed, wherein the transport agents of the various transporting steps are at different temperatures in different sequences of the processing.

Yet another object of the present invention is to provide crystallization of the pellets formed.

An additional object of the present invention is to provide additional thermally controlled residence time for enhancement of the crystallization of the pellets.

A further object of the present invention is to utilize the residual internal heat of the pellets formed to increase crystallization of the pellets.

Another object of the present invention is to provide coated pellets to limit the tack and thus avoid agglomeration of the pellets subsequent to crystallization processes.

Still another object of the present invention is to provide crystallization at temperatures without additional pressurization of the fluids in which the pellets are entrained.

A further object of the present invention is to surface treat portions of the components of the equipment for the multiple sequential processing steps.

These and other objects, features and advantages of the present invention will become more apparent upon reading the following specification in conjunction with the accompanying drawings.

BRIEF DESCRIPTION OF THE DRAWINGS

FIG. 2a is a schematic illustration of a feeder, a mixing vessel, medium pressure pump, and coarse screen changer.

FIG. 2b is a schematic illustration of a feeder, an extruder, gear pump, and screen changer.

FIG. 2c is a schematic illustration of a feeder, gear pump, and static mixer assembly.

FIG. 2d is a schematic illustration of a vertically configured static mixer with attached bypass diverter valve.

FIG. 2e is a schematic illustration of a feeder, mixing vessel, medium pressure pump, coarse screen changer, gear pump, static mixer, extruder, gear pump, and screen changer is series.

FIG. 2f is a schematic illustration of a feeder, an extruder, gear pump, screen changer, static mixer, extruder, gear pump, and screen changer is series.

FIG. 19a is a schematic view of a portion of a streamline cutter hub.

FIG. 19b is a schematic view of the streamline cutter hub rotated in perspective relative to FIG. 19a.

FIG. 19c is a cross-sectional view of the streamline cutter hub in FIG. 19a.

FIG. 22 is a schematic illustration of a comparative waterbox bypass.

FIG. 30 illustrates a dryer screen with deflector bars.

FIG. 31 is a cross-sectional illustration of the screen with deflector bars in FIG. 30.

FIG. 34 illustrates an enlarged edge-on view of a three-layer screen.

FIG. 35 illustrates an enlarged edge-on view of a two-layer screen.

FIG. 37 is a schematic drawing illustration a pellet crystallization system and dryer.

DETAILED DESCRIPTION OF THE INVENTION

Figure 1:
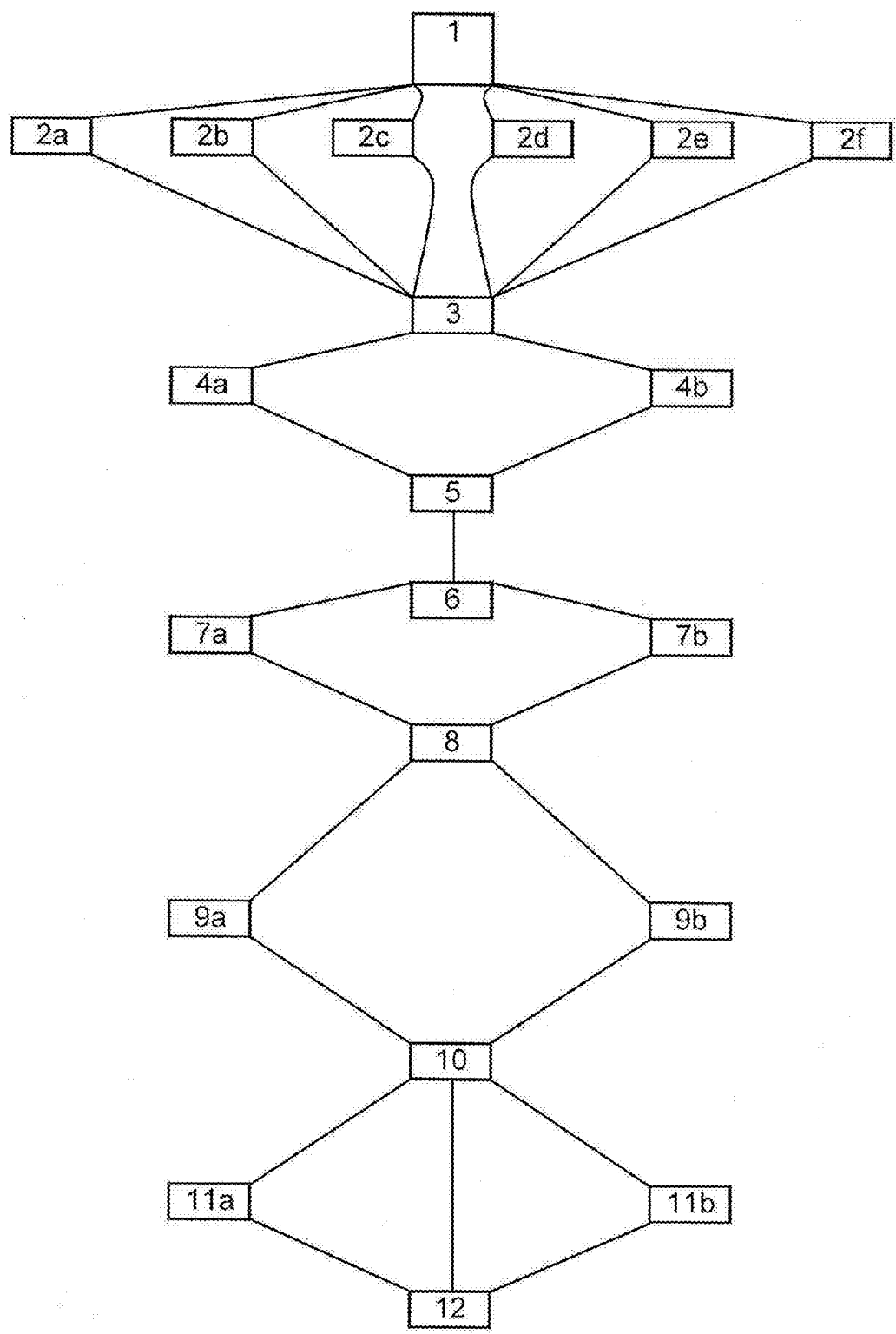
FIG. 1 is a flow chart diagram illustrating the multiple sequential processing systems.

Although preferred embodiments of the invention are explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

The present multiple sequential processing system as shown diagramatically in FIG. 1 includes a feeding or filling section 1 that provides material into a mixing, melting and/or blending section or sections 2. Section 2a refers to a vessel, section 2b represents an extruder, section 2c illustrates a static mixer, section 2d refers to a bypass static mixer, section 2e shows a serial attachment of a vessel to a static mixer to an extruder, and section 2f illustrates a serial attachment of an extruder to a static mixer to a second extruder. The mixing section(s) 2 is fittingly attached to a pelletizing section 3 subsequently connected via a bypass fluid transport system section 4a or, alternatively, an accelerated fluid transport system section 4b, to transport pellets to a dewatering and/or drying device section 5. The pellets from the drying process are conveyed to a distribution section 6 and entrained in a second transport fluid and pumped via standard section 7a or by accelerated transport section 7b, to a pellet crystallization system (PCS) section 8 or sequence thereof, not shown, to facilitate the crystallization process. The at least partially crystallized pellets are transported by standard transport section 9a or accelerated transport section 9b, to a second dewatering and/or drying device section 10. The pellets from this drying process are conveyed optionally to a vibratory unit for coating pellets section 11a or alternatively and optionally to a vibratory unit to further enhance crystallization 11b and/or alternatively and ultimately to packaging, storage and/or post-processing manipulations section 12.

The previous section/equipment description facilitates an understanding of the method steps of the present invention. As such, the present invention can comprise a method for the crystallization of polymers and polymeric materials using a multiple sequential processing system, the method comprising the steps of feeding material from the feeding or filling section 1 to the mixing, melting and/or blending section or sections 2. The next process of the system includes the mixing of the material in sections 2.

A next process of the present invention can include extruding the material in section 2b. A further processing step is pelletizing the material in pelletizing section 3. A first transporting step 4 transports the pellets to a dewatering and/or drying device section 5. The step of first drying occurs in section 5

The pellets from the drying process are conveyed via a second transporting step 7 to the PCS section 8, wherein the crystallizing step occurs. The at least partially crystallized pellets are transported via a third transporting step 9 to the second dewatering and/or drying device section 10. The step of second drying occurs in section 10.

Additionally optional steps can include coating 11 and post-processing 12.

Each of these steps of the present invention is operated at processing conditions, wherein the particular processing conditions of each step might be different from other steps of the system. For example, the step of mixing the polymeric material can occur at "mixing processing conditions" (temperatures, pressures, etc.), and the step of extruding the polymeric material can occur at "extruding processing conditions" (temperatures, pressures, etc.). It can be that at least one common condition of both the mixing processing conditions and the extruding processing conditions are different, for example, the temperature that each step operates, while another common condition, the pressure, is the same in each step.

Figure 2:
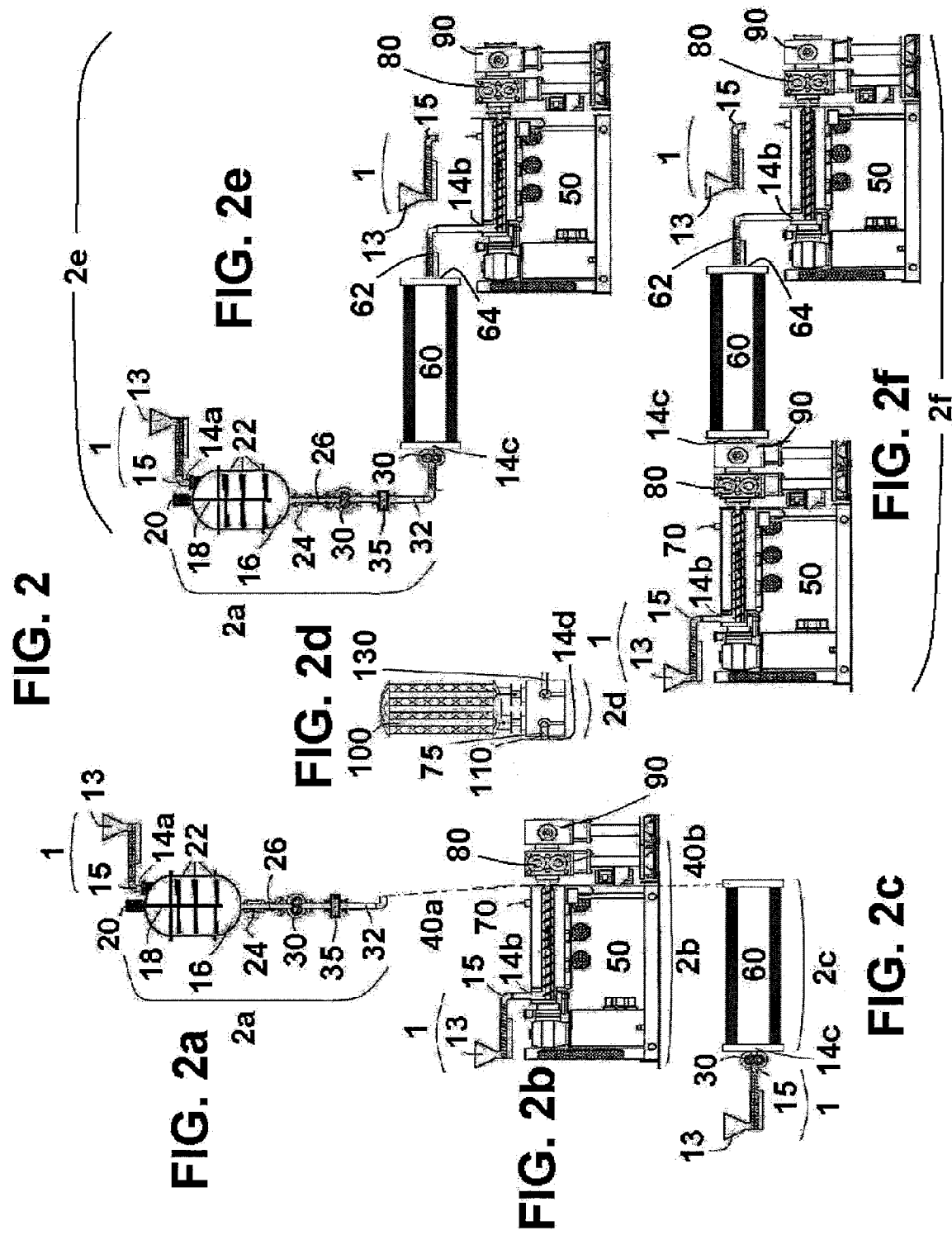
FIG. 2 is a schematic illustration of a preferred embodiment of the present invention including a feeding section and mixing sections of the mixing process system.

Turning now to FIG. 2, the apparatus includes the feeding or filling section 1 that provides material or component materials into the mixing, melting, and/or blending section or sections 2 (shown as 2a to 2c, 2e and 2f in respective FIGS. 2a, 2b, 2c, 2e, and 2f). The material or component materials are fed manually as a solid or liquid. Preferably, liquids can be pumped or metered, not shown, into the mixing apparatus and solids can be added via a feed screw 13 as indicated in section FIGS. 2a, 2b, 2c, 2e, and 2f or by other appropriate device. Feeding can be accomplished gravimetrically or volumetrically, and preferably is controlled through mechanical and/or electronic feed-back mechanisms as are readily known to those skilled in the art. One or more similar or different feeding mechanisms can be used, and can be placed at the same or different entry points in mixing section 2 as indicated by mixing inlet 14a, 14b, 14c, or 14d. The feeding components can be ambient in temperature, heated, or cooled and can be at atmospheric conditions or pressurized, purged with air or an inert medium such as, but not limited to, argon or nitrogen preferentially, or can be subjected to a vacuum or partial vacuum to expedite flow into mixing section 2 preferentially near the exit port of the feeding device exemplary of that being the feed screw outlet 15.

The mixing section 2 of the present invention includes dynamic 2a, extrusional 2b, and/or static 2c mixing components that can be used individually or as a plurality of two or more of these component types interconnectedly attached in series, in tandem, and/or in parallel.

The feed screw outlet 15 of feeding section 1, FIG. 2a, is attached to the dynamic section 2a at one or more inlets exemplified by inlet 14a for the thermally controlled mixing vessel 16. The vessel chamber can be atmospheric or purged with air or inert gas, for example argon or preferably nitrogen. Components can be added continuously or portionwise with warming to temperature as required by a particular process. Mixing is achieved by rotation of the rotor 18 controlled by motor 20. Attached to rotor 18 are mixing blades 22 exemplary of which can be propeller or boat style, ploughshare style, delta or sigma style in single, double, or multiple configurations, and helical or helical dispersion blades. Alternatively, the vessel can be a kneader, Buss kneader, or Farrel internal mixer or it can be a ribbon blender, Banbury-type blender, horizontal mixer, vertical mixer, planetary mixer or equivalent devices known to those skilled in the art.

On reaching the appropriate pour point, valve 24 is opened and the fluid or molten material passes into and through pipe 26 and is drawn into booster pump 30. The booster pump 30 can be, for example, a centrifugal pump or a positive displacement reciprocating or rotary pump. Preferably the booster pump 30 is rotary and can be a peristaltic, vane, screw, lobe, progressive cavity, or more preferably, a gear pump. The gear pump can be high precision or preferably is open clearance and generates an intermediate pressure, typically up to approximately 33 bar, and preferably less than approximately 10 bar. The pump pressure can vary, and need be sufficient to force the melt through coarse filter 35 that can be a candle filter, basket filter, or screen changer, and is more preferably a basket filter of 20 mesh or coarser. The coarse filter 35 removes larger particles, agglomerates, or granular material from the melt as it flows to and through pipe 32. The dotted line 40a indicates the connection to melt pump 80.

Alternatively the feeding section 1 in FIG. 2b is connectedly attached via feed screw outlet 15 to the mixing section 2, and more specifically extrusional mixing section 2b, at one or more inlets as exemplified by inlet 14b to an extruder 50 that optionally can be, but is not limited to, a single screw, twin screw, multiple screw or ring extruder, or a ram extruder and is preferably a single screw, and more preferably is a twin screw extruder. The sections or zones of the screw should feed, mix, and convey the material simultaneously providing sufficient energy, thermal and mechanical, to melt, mix, and uniformly disperse and distribute the material or materials for the pelletization to follow. The extruder 50, preferably the twin screw extruder, optionally can be purged with air or an inert gas, of which nitrogen or argon are preferential but not limiting, and additionally can have one or more vent ports some or all of which can be fitted with one or more vacuum attachments or other exhaust mechanism or mechanisms as is understood by those skilled in the art. Vent ports or appropriate exhaust mechanisms facilitate removal of gases, unwanted volatiles such as residual monomer or byproducts, and/or impurities. Venting should be used with caution and positionally placed such that volatile components essential to the formulation are not lost or compromised after introduction to the mixing process. The configuration of the screw should be satisfactory to achieve an appropriate level of feeding, mixing dispersively and/or distributively, melting, blending, and throughput rate determined by the formulation and processing requirements. The extruder 50 is attachedly connected to the melt pump 80 as shown in FIG. 2b at the locus similarly identified by the dotted line 40a for dynamic mixing section 2a illustrated in FIG. 2a.

Analogously, feeding section 1 can be connected via feed screw outlet 15 to inlet 14c in the static mixing section 2c in FIG. 2c and/or to inlet 14d in the bypass static mixing section 2d in FIG. 2d. Process operations can dictate the use of a booster pump 30 and/or a melt pump 80 to facilitate transfer and pressurization of the material flow into the static mixer 60. Static mixer 60 is connected to melt pump 80 positionally as indicated by dotted line 40b in FIG. 2c.

Mixing sections can be used alone or in combination where dynamic, extrusional, and/or static mixing as described herein are connected in series and/or in parallel. Exemplary of this is dynamic mixing section 2a attached directly to static mixing section 2c at inlet 14c or extrusional mixing section 2b attached directly to static mixing section 2c at inlet 14c or alternatively to static mixing section 2c at inlet 14d of bypass static mixer 100 as detailed below. Extrusional mixing section 2b alternatively can be attached to another extrusional mixing section in series and/or in parallel of similar or different design type or configuration. Temperatures and process parameters can be the same or different in the various mixing sections, and mixing units can be attached in combinations greater than two serially or otherwise.

The conventional limitations of FIGS. 2a, 2b, and 2c alone or serially in combination as heretofore described remain problematic in that cooling, though present in these components, does not have a level of control and narrowness of definition of degree in temperature to acceptably be able to produce high quality pellets of narrow melting range materials. Secondarily, the mixing sections as described above are limited in their capacity to achieve efficient and uniform dispersive mixing and are further limited in their ability to reduce or eliminate phase separation of blended materials including polymer formulations, dispersions, and solutions. Furthermore, materials of high melt flow index commonly require high shear to melt the material, after which the resultant viscosity is extremely low and, with limited cooling, can still result in problematic extrusion. For these materials the temperature transition from fluid to more viscous semi-solid or solid is typically narrow, and control of this is extremely limited in mixing sections heretofore described.

In consideration of these challenges, a preferred embodiment of the present invention is exemplified in FIG. 2e, in which the dynamic mixing section 2a (FIG. 2a) is fixedly attached to booster pump 30 affixed to inlet 14c of static mixer 60. An insulated conveyance pipe 62 is connectedly attached to static mixer outlet 64 and inlet 14b of cooling extruder 50. The screw configuration of cooling extruder 50 can provide rigorous mixing and propagation of the melt to and through the zones or sections of the extruder distal from the inlet 14b. One or more side feeders indicated as section 1 and illustrated without attachment to cooling extruder 50 can be variably positioned at inlets along the extrusion zones as needed for a particular process.

A more preferred embodiment of the present invention, FIG. 2f, includes an extrusional mixing section 2, previously described for FIG. 2b, fixedly attached to melt pump 80 and screen changer 90, described below. Static mixer 60 is attached thereto at inlet 14c and connectedly attached at static mixer outlet 64 to conveyance pipe 62 subsequently attached to cooling extruder 50, described above, at inlet 14b.

Ingredients, liquid or solid, can be added utilizing the feeding section (or sections) 1 herein described connected at one or more locations including, but not limited to, inlets 14a, 14b, 14c, or 14d. For vessel mixing, components are added at inlet 14a or preferably for any volatiles at inlet position 75 proximal to inlet 14d. Where vessel mixing is attached serially to static mixing (not shown in FIG. 2), addition of the any volatiles is preferably performed at the inlet of the static mixer as is exemplified by a modification of inlet 14c for static mixer 60 (FIG. 2c) as is understood by one skilled in the art. For extrusional mixing, components are added at inlet 14b, and for any volatiles, preferably at an inlet positionally near the end of the extruder 50 as indicated by inlet position 70 or alternatively at inlet position 75 proximal to inlet 14d. For extrusional mixing serially attached to static mixing prior to gear pump 80 (not shown in FIG. 2), addition of components can be accomplished at the inlet of the static mixer as is exemplified by a modification of inlet 14c for static mixer 60 (FIG. 2c) as previously described for serial vessel and static mixing. For static mixing, introduction of components can be done at inlet 14c in FIG. 2c or for volatiles at inlet position 75 proximal to inlet 14d in FIG. 2d.

Various levels of mixing and shear are achieved by the differing styles of mixing processes. Static mixing typically has the least shear and relies more on thermal energy. Dynamic mixing depends to a large degree on blade design and mixer design. Extrusional mixing varies with type of screw, number of screws, and the screw profile and is quite capable of significant generation of shear energy. Therefore, energy is introduced into the mixing process in terms of both shear or mechanical energy and thermal energy. Heating and/or cooling of the units can be achieved, for example, electrically, by steam, or by circulation of thermally controlled liquids such as oil or water. Mixing continues until a formulation reaches an appropriate temperature or other criterion of consistency or viscosity as determined or known specifically for the process by those appropriately skilled in the art.

Referring again to FIG. 2, on exit from the mixing stage 2a, 2b, 2c, 2d, 2e, 2f, or any combination thereof, the molten or fluidized material optionally passes to and through a melt pump 80 that generates additional pressure on the melt, preferably at least approximately 10 bar and more preferably between approximately 30 to approximately 250 bar or more. Pressures required are dependent on the material being processed and are significantly affected by the pelletization process (section 3 of FIG. 3) that follows mixing as well as on the throughput rate or flow rate of the process. Melt pump 80 can be a centrifugal or positive displacement reciprocating or rotary pump, and preferably is a rotary pump that can be a peristaltic, vane, screw, lobe, progressive cavity, or gear pump, and more preferably is a gear pump. Seals should be compatible with the material being processed, chemically and mechanically, the details of which are well understood by those skilled in the art.

The pressurized melt passes through a filter 90, FIGS. 2b, 2e, and 2f, that is preferably a basket filter or screen changer, and is more preferably a screen changer of 200 mesh or coarser, and even more preferably a multilayer screen changer of two or more screens of differing mesh, most preferably a series of filters exemplary of which is 20 mesh, 40 mesh, and 80 mesh. The screen changer can be manual, plate, slide plate, rotary plate, single or dual bolt, and can be continuous or discontinuous.

The use of melt pump 80 and/or filter 90 is strongly and optionally dependent on the containment of volatile ingredients in the formulation. Pressures can be sufficient from extrusional mixing 2b to forego use of melt pump 80, whereas use of static and/or dynamic mixing, 2c or 2a respectively, can require facilitation of pressurization to insure progress through and egress of the formulation from the apparatus. The filter 90 provides a safety mechanism, where employed, to insure oversize particles, lumps, amorphous masses, or agglomerates are not propagated to the bypass static mixer 100 or pelletization process section 3, FIG. 3. Alternatively, introduction of volatile components can be performed at inlet position 75 proximal to inlet 14d in FIG. 2d as previously delineated. Where additional pressurization and/or screening are a requisite process component, introduction via inlet position 75 proximal to inlet 14d is a preferred approach.

Static mixer 60 in FIGS. 2c, 2e, and 2f can be used to heat the mixture being formed to generate a uniform molten mass or can be used effectively as a melt cooler to reduce the temperature of the molten mass. When static mixers are used in series, each unit can be used to heat and further mix the formulation wherein the temperatures, design, geometries and configurations, physical sizes, and process conditions can be the same or different among mixers. A static mixer in the series can be heating the mixture to achieve better dispersive and distributive mixing, whereas a second static mixer can actually be cooling the mixture to facilitate further processing. A static mixer 60 or melt cooler is a heat exchanger of the coil type, scrape wall, shell and tube design, or U-style tube design or other comparable style and preferably is a shell and tube design that includes static mixing blades of appropriate configuration within the individual tubes to further mix the material and bring more of the material into intimate contact with the wall of the tube outside of which is a flow preferably of, but not limited to, oil or water to provide warming or cooling as appropriate. The temperature and flow rate of the circulating medium is carefully regulated by a control unit, not shown. An important criterion for selection of conditions in static mixing or melt cooling is to do a maximum amount of work to effect mixing with a minimum pressure drop while maintaining the pressure required for proper admixture. Pressures generated by the extruder 50 and/or the melt pump 80, where present, should be sufficient to maintain flow of the molten or fluid mass through the filter 90, where applicable, into and through the bypass static mixer 100, and into and through the pelletization section 3, FIG. 3. Alternatively, an optional melt pump 80 can be positionally attached to outlet 130, FIG. 2d and inlet 205, FIG. 3, to maintain or increase pressure into and through the pelletization section 3.

Figure 4:
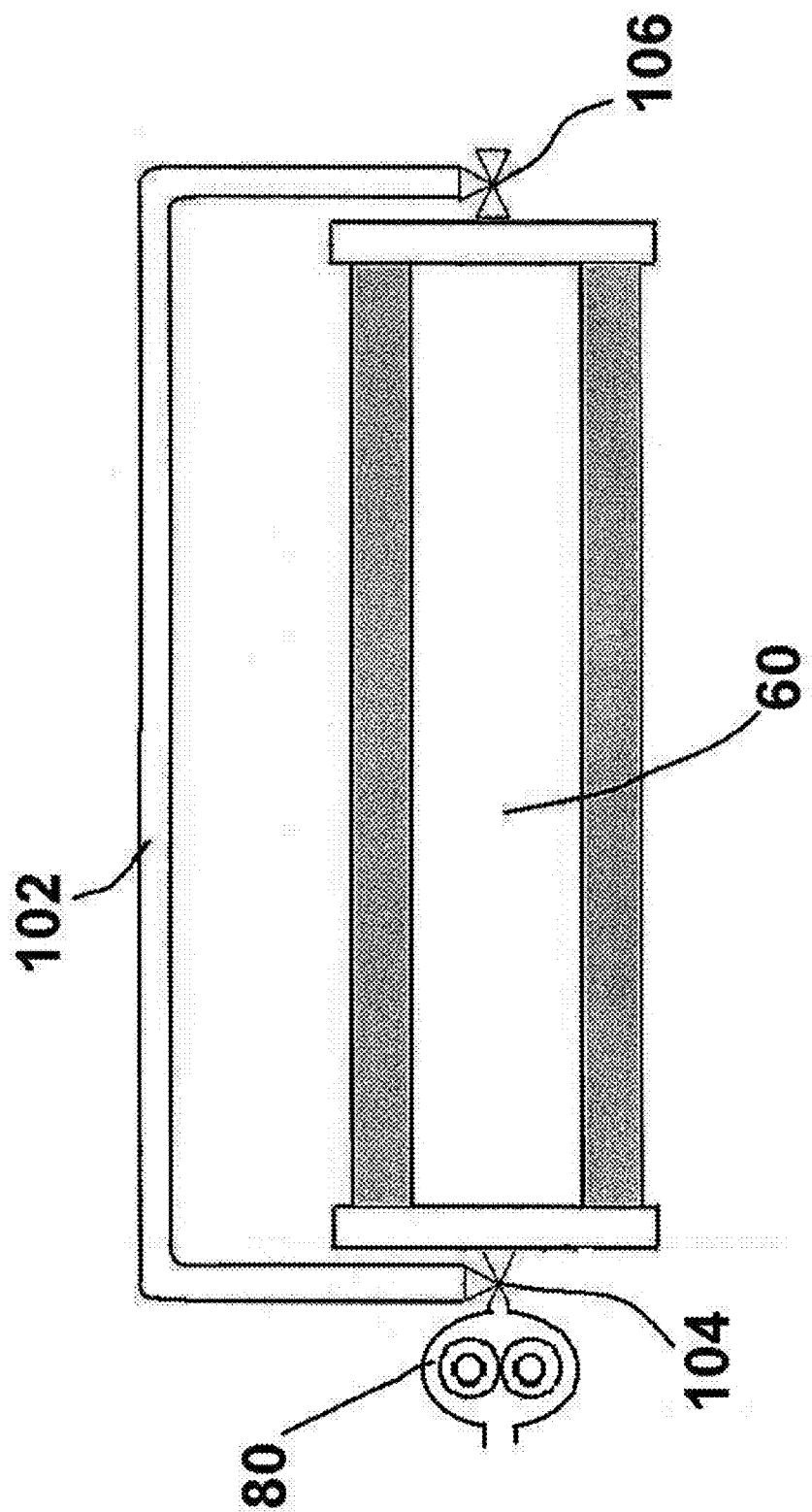
FIG. 4 is a schematic illustration of a comparative static mixer with gear pump and bypass pipe connected by three-way valves.

The optional bypass static mixer 100 in FIG. 2d has a distinct advantage over prior art devices that would have to physically be removed from the melt flow pathway for maintenance or cleaning, and is not always necessary in a particular process. To simplify this challenge, a "spool" or straight large bore pipe that can or can not have a coolant connection can be inserted into the pathway to allow flow effectively bypassing the unnecessary static mixer. Alternatively, a bypass line 102 can be inserted into the flow path as shown in FIG. 4 with a diverter valve 104 used to switch flow from the static mixer 60 into the bypass line 102. Similarly a second diverter valve 106 can be used to reconnect the bypass flow back into the mainstream at or near the outlet of static mixer 60.

Figure 5:
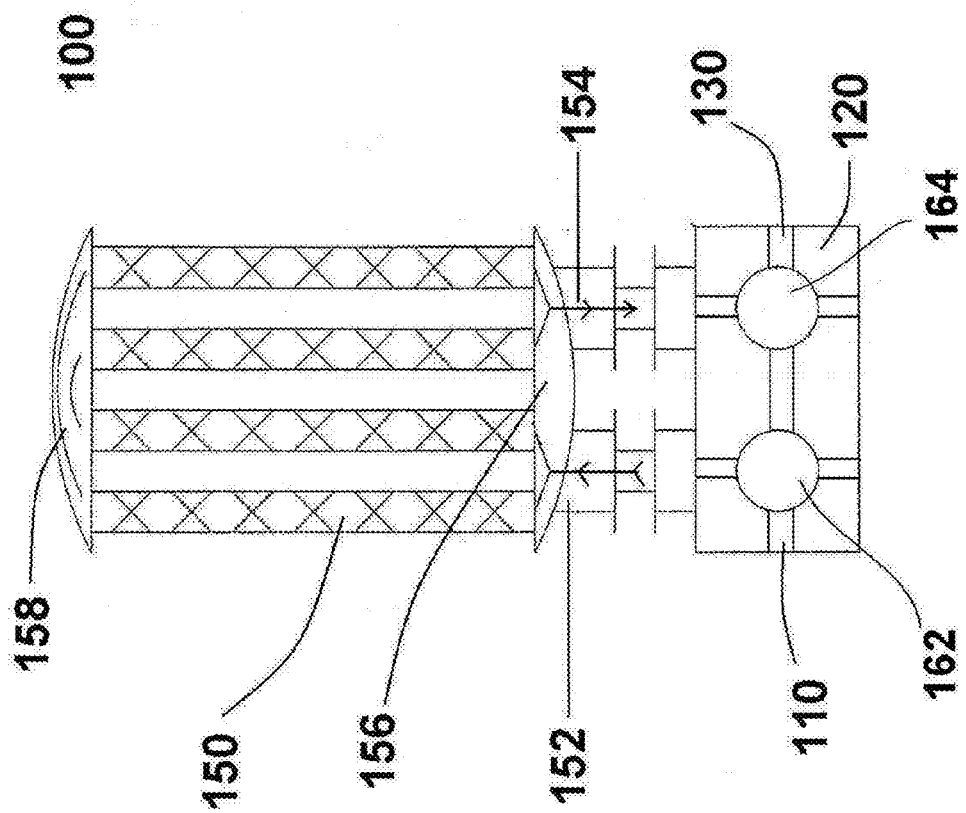
FIG. 5 is a schematic illustration of a vertically configured static mixer with attached bypass diverter valve.

The outlet of optional filter 90 is attachedly connected to the bypass static mixer 100 in FIG. 2d via inlet 110 of bypass diverter valve 120 detailed in FIG. 5. Inlet 110 directs melt flow into the static mixing component 150 of the bypass static mixer 100 through static mixer inlet 152. The melt flow passes through static mixing component 150 and exits through static mixer outlet 154 into the outlet 130 of the bypass diverter valve 120. A two-pass or double pass heat exchanger is illustrated in FIG. 5 wherein the base 156 of the static mixing component 150 is attachedly connected as described through inlet 152 and outlet 154 to the bypass diverter valve 120. The top 158 of the static mixing component 150 is distal from the bypass diverter valve 120. The orientation of the static mixer 100 and bypass diverter valve 120 as herein described can be pendulous, horizontal, or vertically disposed or can be positionally inclined at many angles inclusive between the aforementioned positions.

The valve components 162 and 164 are preferably in the form of movable bolts, valve component 162 being upstream of the static mixing component 150 and valve component 164 is similarly downstream. The bolts contain, but are not limited to, two (2) bores exemplary of which is valve component 164, or three (3) bores of which valve component 162 is an example, or more bores. The respective bores can have various orientations, for example, they can be straight-through, form a 90° turn, or be in the shape of a "tee or T", and are specifically placed along the length of the bolt. Each of these bores is positionally placed by means of a fluid-controlled cylinder or equivalent device, and will adjustably maintain good alignment with the proper inlets and/or outlets of the bypass diverter valve 120, based on the desired position required by the operator running the process, as will be understood by those skilled in the art. The positioning of the fluid powered cylinders, and thus the each bolt's position, can be controlled by manually operating a fluid flow valve or by automatic control such as by PLC, or both.

Figure 3:
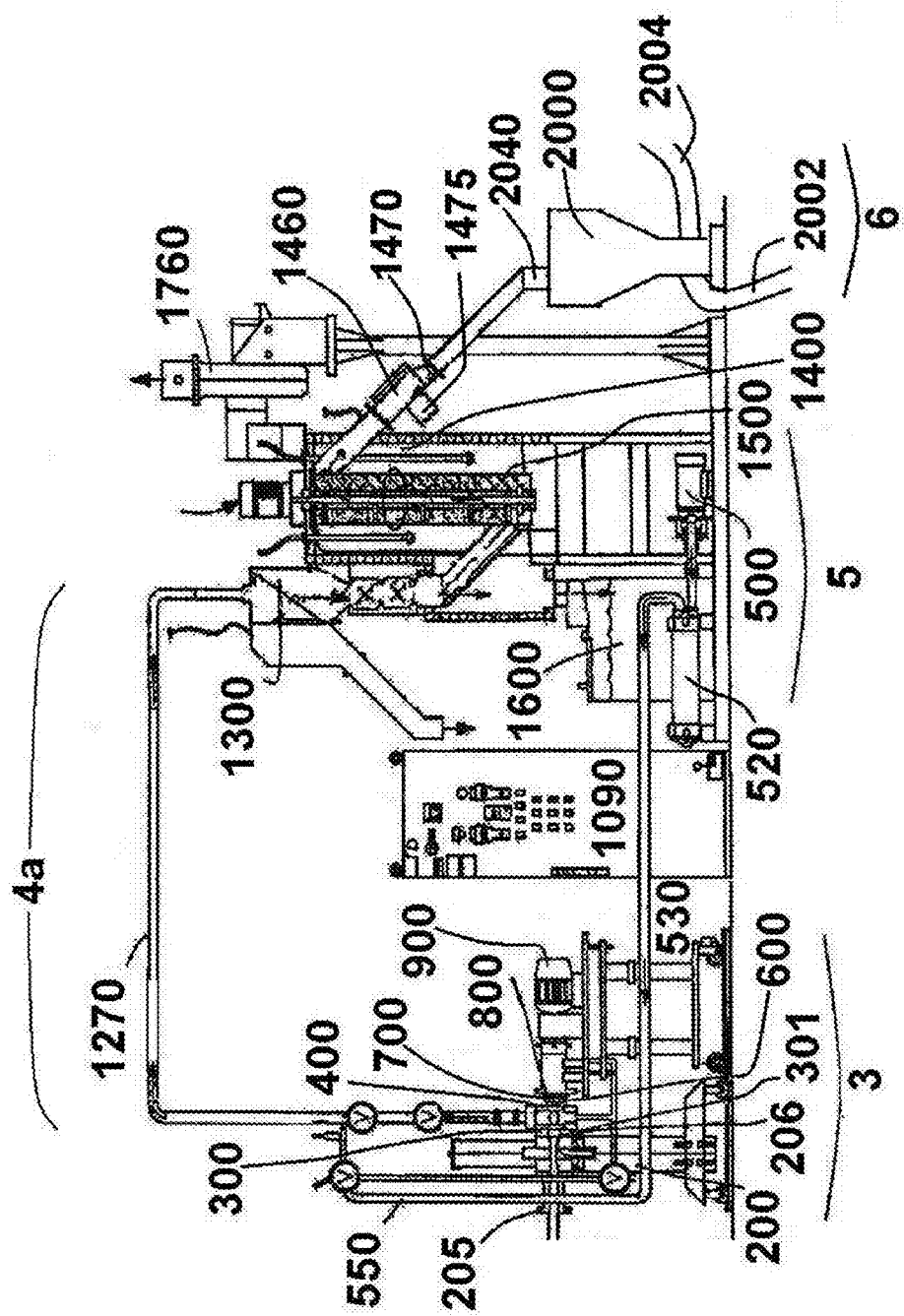
FIG. 3 is a schematic illustration of a pelletization system and transport to dewatering and drying system in series.
Figure 6:
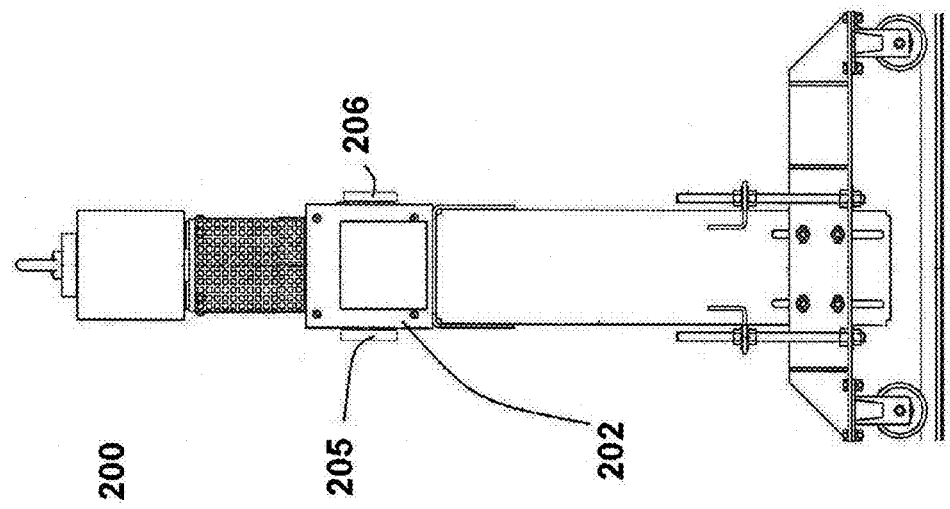
FIG. 6 is a schematic illustration of a polymer diverter valve.

The component or components of the mixing section 2 are attachedly connected to the diverter valve 200, as indicated in FIG. 3 where the outlet 130, FIG. 2d, of the bypass static mixer 100 is attached to inlet 205, FIG. 3. FIG. 6 illustrates inlet 205 and outlet 206 attached to housing 202 of diverter valve 200. The movable diverter bolt, not illustrated, can be actuated electromechanically, hydraulically, pneumatically and many combinations thereof.

Use of surface treatments and coatings for components in sections 1 and 2 of FIG. 2 including vessels, extruders, gear pumps, screen changers, polymer diverter valves (FIG. 3), and static mixers or melt coolers are contemplated by the present invention and are included herein by way of reference without intending to be limited. Nitriding, carbonitriding, electrolytic plating, electroless plating, thermal hardening, flame spray techniques, and sintering techniques are exemplary of these surface treatments and coatings.

Referring again to FIG. 3, diverter valve 200 is attached at outlet 206 to the pelletization section 3 at inlet 301 of the die 320, with details illustrated in FIGS. 7, 8a, 8b, 9, and 10.

Figure 7:
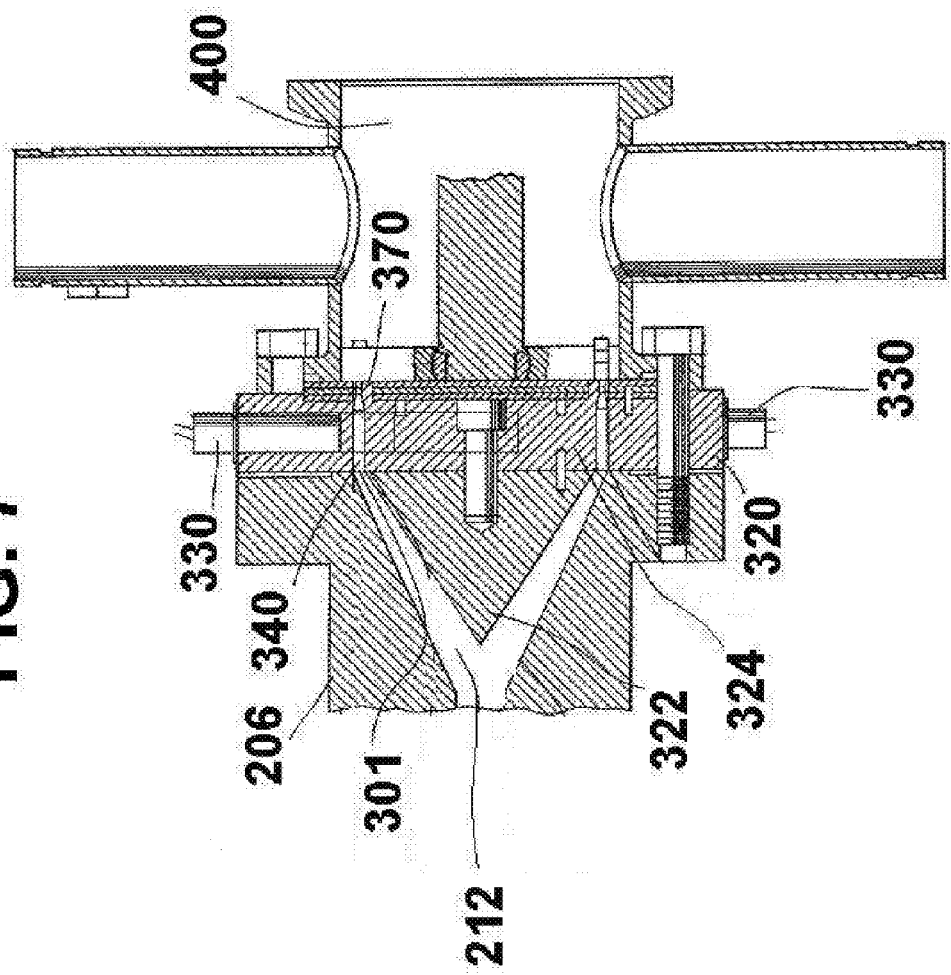
FIG. 7 is a schematic illustration of a one-piece die plate with heating elements in three configurations.

The die 320 in FIG. 7 is a single-body style including a nose cone 322 attached to die body 324 into which are fitted heating elements 330 and through which are bored multiple die holes 340 that vary in number and orientation pattern and are preferably approximately 3.5 mm in diameter or smaller. The die holes 340 can be many combinations of design including, but not limited to, increasing or decreasing taper or cylindrical or many combinations thereof and segments can vary in length as necessitated by the process and materials. Preferably the die holes 340 are placed singularly or collectively in groups or pods in one or more concentric rings as determined by the diameter of the outlet 206 of the diverter valve 200 fittedly attached thereto.

Figure 8A:
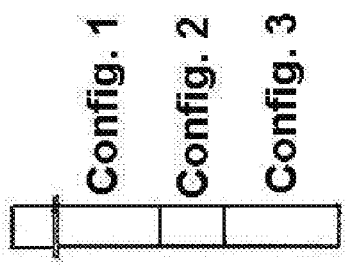
FIG. 8a illustrates the three configurations of the heating element extracted from the die plate.
Figure 8B:
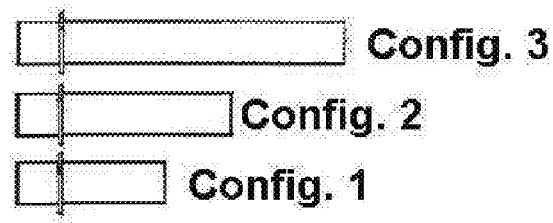
FIG. 8b illustrates the three configurations of the heating element positionally placed individually in side view.

Heating elements 330 can be a cartridge or more preferably a coil type element and can be of sufficient length inside the die body 324 to remain outside the circumference of the die holes as illustrated in FIG. 7 and detailed in FIGS. 8a and 8b as configuration 1, or can extend into and near the center of the die body without passing the center in length, configuration 2 in FIGS. 8a and 8b, or can extend past the center in length but not of sufficient length to contact the ring of die holes diametrically opposed, (configuration 3). Positioning of the die holes will vary as would be readily recognized by one skilled in the art to accommodate the appropriate configuration of the heating elements 330 and one or more lengths or designs of heating elements are optionally included within the scope of the present invention.

Figure 9:
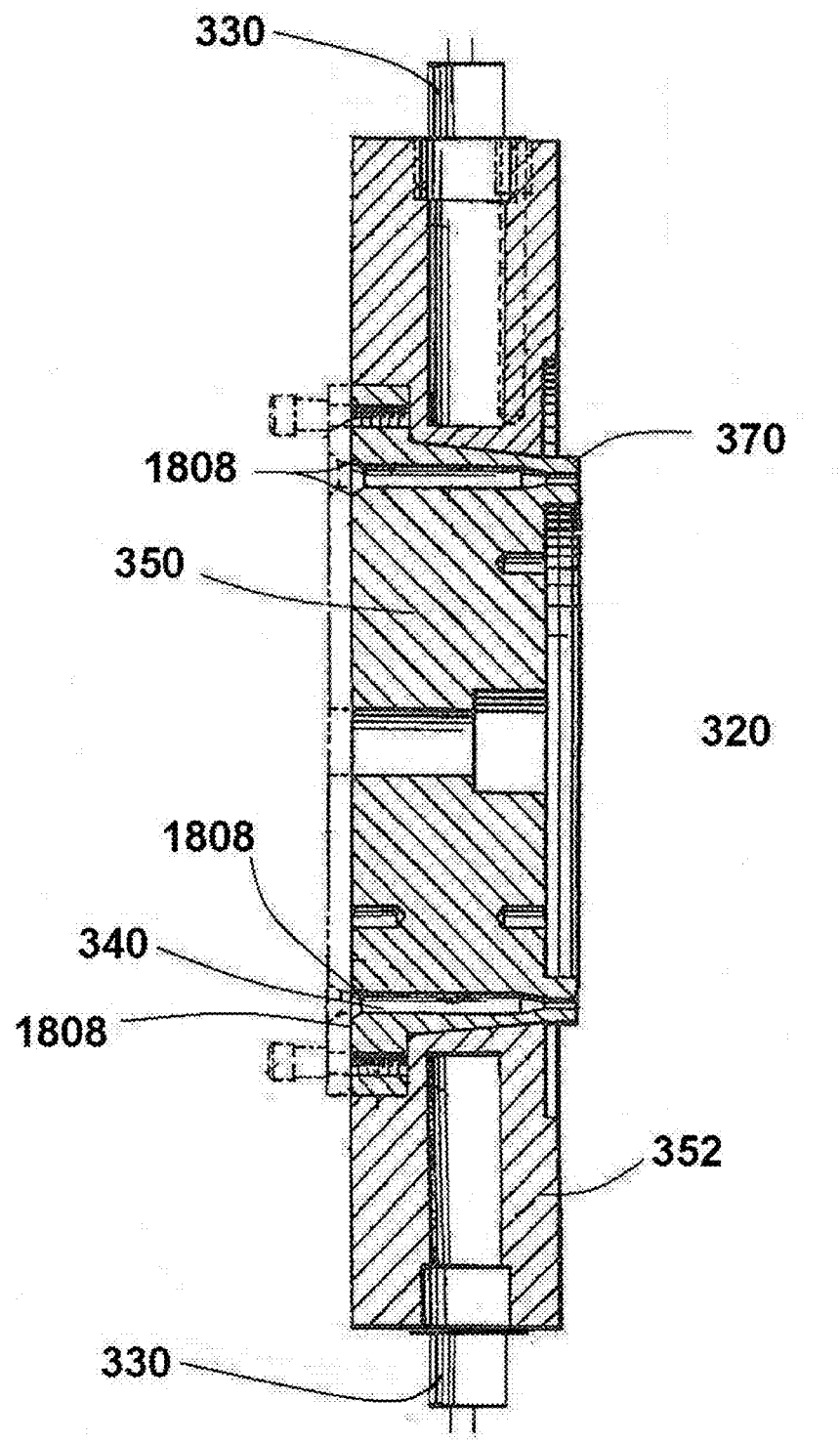
FIG. 9 is a schematic illustration of a removable-center die.

A preferred design of die 320 is illustrated in FIG. 9 in that the die body is of a removable center or insert configuration. The heating elements 330 are of a cartridge or, more preferably, a coil configuration and are inserted into the outer die body component 352 whereby they are constrained in length to suitably fit within the confines of the outer die body component 352. The die holes 340 are contained within removable insert 350 and are variable in design, dimension, and placement as detailed in the foregoing discussion. The removable insert 350 is fixedly attached to outer die body component 352 by known mechanisms.

Figure 10:
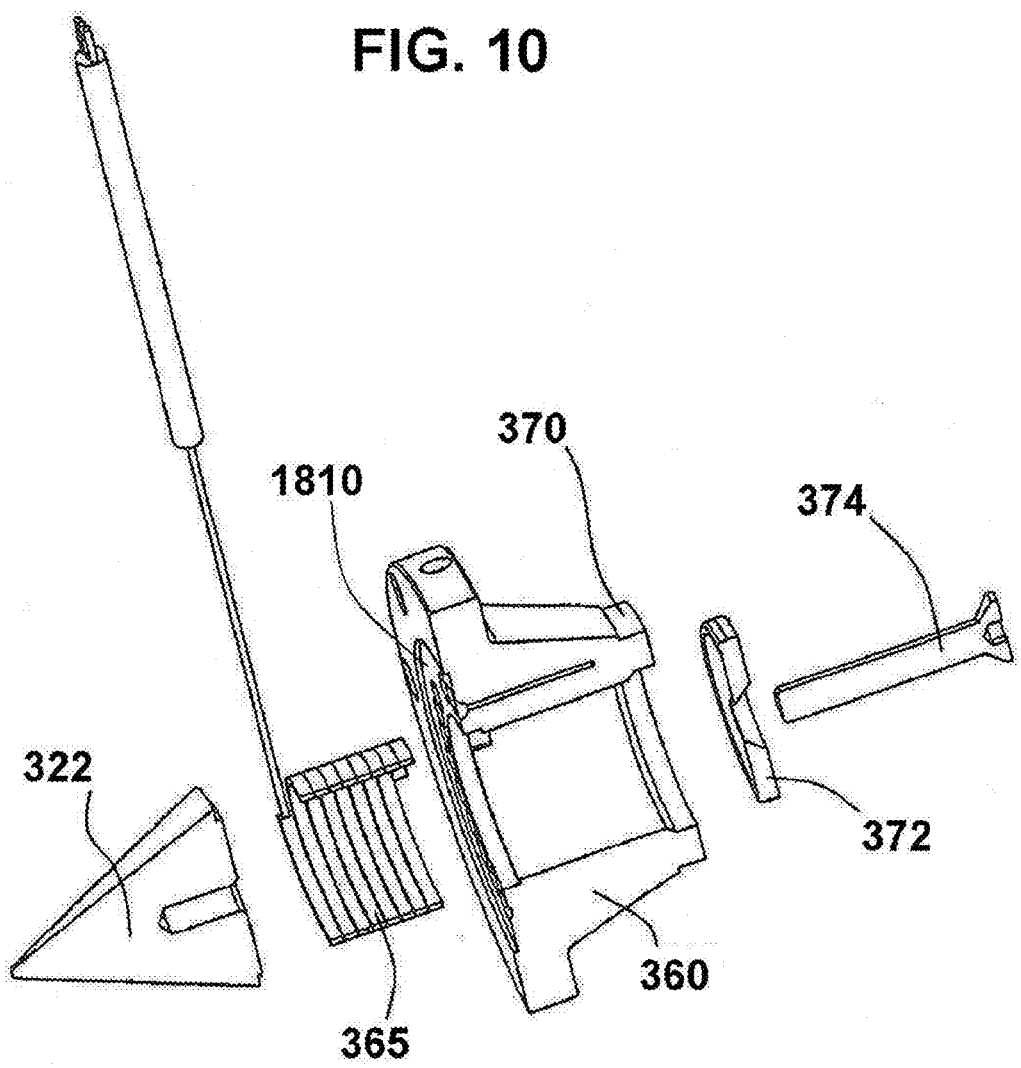
FIG. 10 is an expanded view illustration of the components of a removable center-heated die.

FIG. 10 shows an alternative design of die 320 in that the die body is of a removable center or insert configuration with multiple heating zones for enhanced heating efficiency and more facile thermal transfer to the molten or liquid materials as they pass through the die holes 340. The outer die body component, not shown, is comparable to that described for FIG. 9. The heated removable insert 360 of the alternative design has an open center to which is fitted a heating element 365, preferably a coiled heating element, that can be thermally controlled in common with other heating elements in the outer die body component or more preferably, is autonomously regulated thermally thus allowing multizone heating capacity within the die 320.

The die 320 in all configurations (FIGS. 7, 8a, 8b, 9, and 10) can contain an appropriate hardface 370 fixedly attached for a cutting surface as illustrated in FIG. 10 that is preferably an abrasion resistant, wear resistant, and where required, a corrosion resistant material and through which pass the die holes 340 for extrusion of the molten or liquid extrudate. Tungsten carbide, titanium carbide, ceramics or mixtures thereof, are common materials for hardface applications as is understood by those skilled in the art and are cited by way of example alone or in combination without intent to be limiting or otherwise restrictive within the scope of the present invention.

The bolting mechanism for the nose cone 322 is illustrated in FIG. 10 by way of example without limitation. A cover plate 372 is positionally attached by bolt 374 to the face of the die body 320 or removable insert 350 or heated removable insert 360, FIGS. 7, 9, and 10 respectively, that can be less than or at least equal to the height dimension of the hardface 370. Alternatively, gasket material or other materials for sealing of the cover plate 372 can be used as required.

Diverter valve outlet 206 is comprised of an inner bore that is tapered diametrically and conically in increasing diameter to create a chamber continuously and proportionately larger than nose cone 322 that inserts therein. The volume of the chamber thusly generated allows unobstructed flow of the polymeric material or other molten or liquid material to flow from the diverter valve 200 into the die hole 340. Alternatively, an adapter (not shown) can be attached to diverter valve outlet 206 which is accordingly tapered as described herein to accommodate the nose cone 322.

Figure 11:
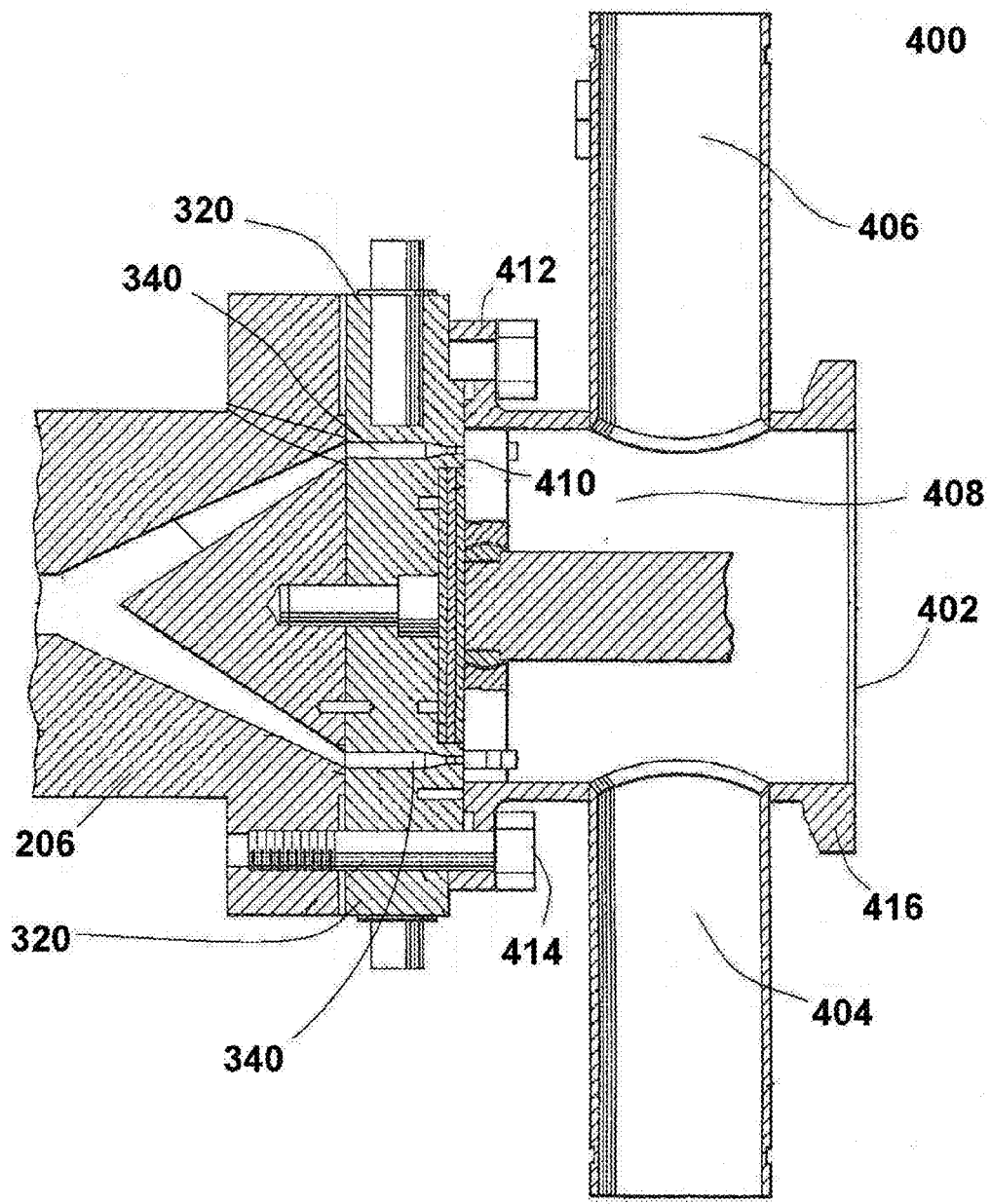
FIG. 11 is a schematic illustration of a die body with transport fluid box or waterbox.
Figure 12:
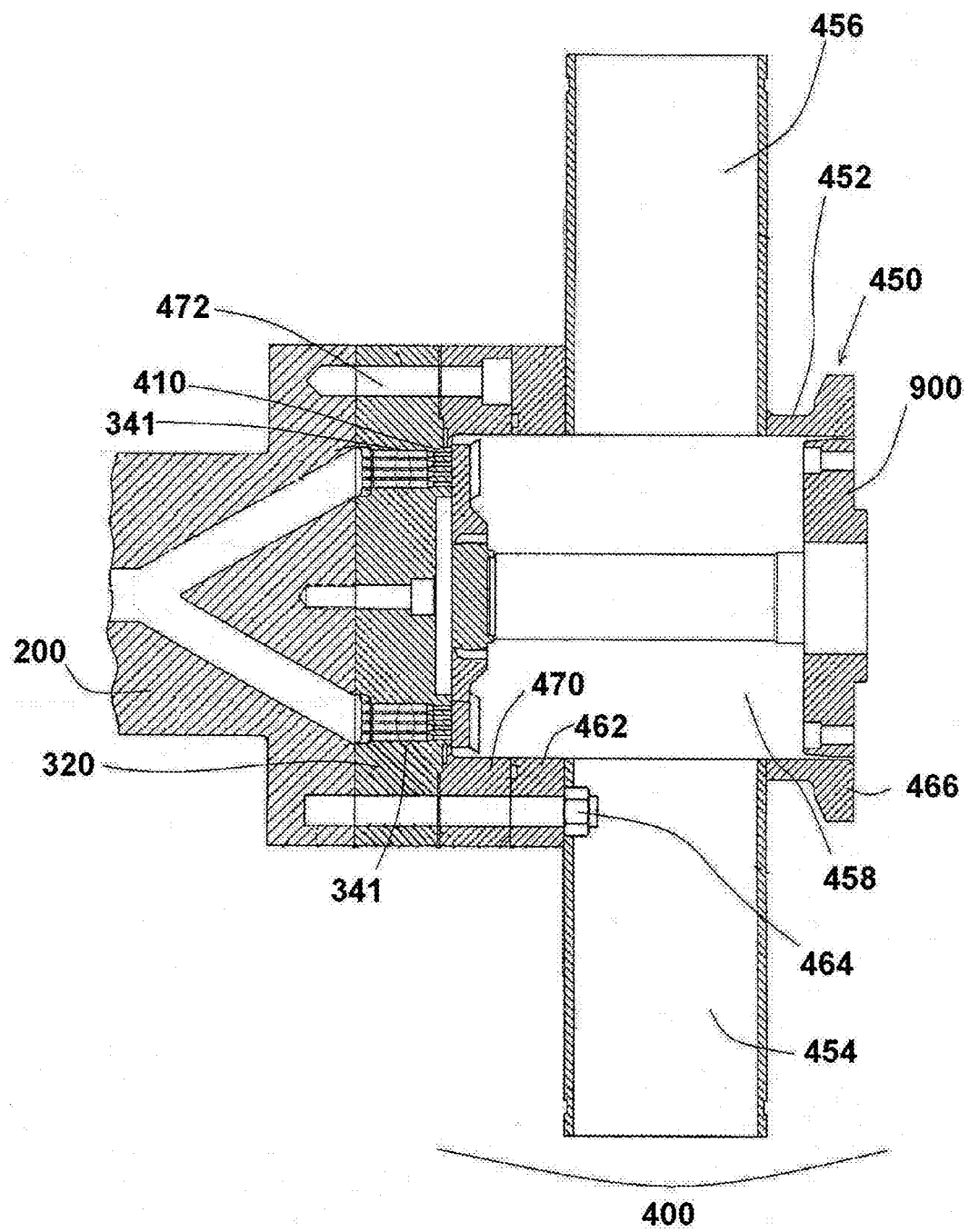
FIG. 12 is a schematic illustration of a die body and two-piece transport fluid box or waterbox.

The diverter valve outlet 206 and alternative adapter (not shown), nose cone 322, and die body 324 in FIGS. 7, 11, and 12 as well as the removable insert 350, FIG. 9, and heated removable insert 360, FIG. 10, can be made of carbon steel, thermally hardened carbon steel, stainless steel including martensitic and austenitic grades, thermally hardened and precipitation-hardened stainless steel, or nickel to improve resistance to abrasion, erosion, corrosion, and wear. Nitriding, carbonitriding, electrolytic plating and electroless plating techniques are for enhancement of these resistance properties are included herein by way of reference.

To provide a smooth surface for die holes 340 in FIGS. 7, 9, and 11 thusly reducing erratics from manufacturing processes including bore marks, conventional technology for the die holes 340 can include treatment by electron discharge machining (EDM) utilizing a wire that is circumferentially rotated about the die hole subsequently enhancing surface smoothness, improving uniformity of the die hole geometry, and controllably and uniformly increasing the die hole diameter. Alternatively, high-velocity abrasive and polishing grits of uniformly fine grain size can be passed through the die holes to effect improved smoothness within the die hole. Additionally, inserts to reduce abrasion and adhesion can be placed into the lands of die holes 340. Fluoropolymer, ceramic, and tungsten carbide inserts are non-limiting examples. Other surface treatments for improvement of surface properties, enhancement of corrosion and abrasion resistance, and improvement of wear can be used without intending to be limited.

Figure 13:
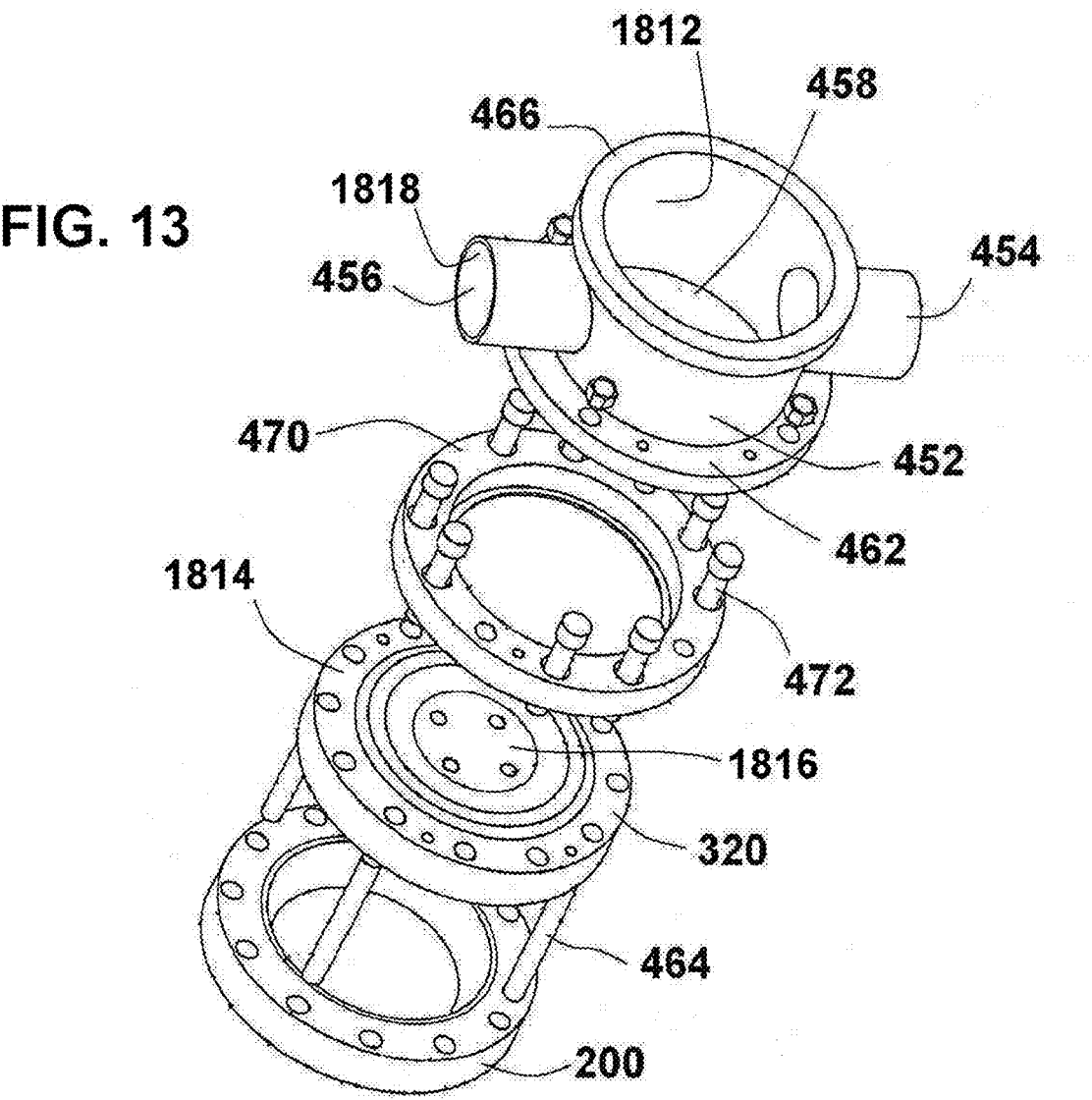
FIG. 13 is an expanded view illustration of a comparative two-piece waterbox or transport fluid box.
Figure 14C:
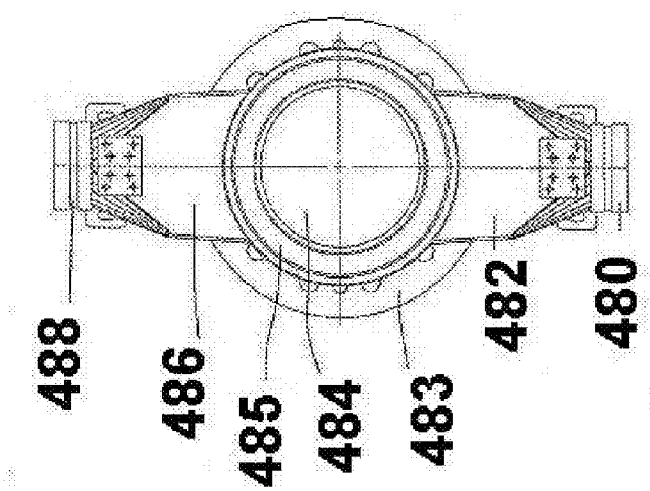
FIG. 14c is a schematic face-view illustration of the alternative waterbox or transport fluid box inlet and outlet design of FIG. 14b.
Figure 14B:
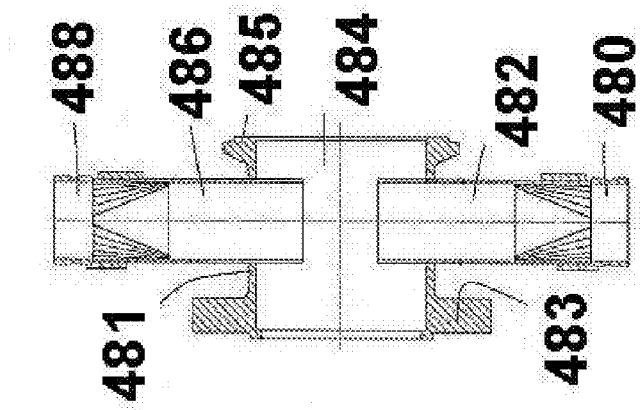
FIG. 14b is a cross-sectional illustration of an alternative waterbox or transport fluid box inlet and outlet design.
Figure 14A:
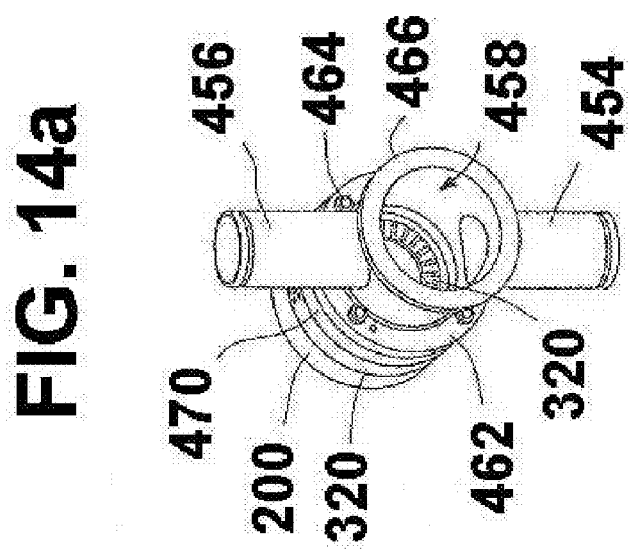
FIG. 14a is a schematic illustration of a complete assembly of a comparative two-piece waterbox or transport fluid box.

Referring once again to FIG. 3, the die 320 is fixedly attached to transport fluid box or waterbox 400 as shown in FIGS. 11 and 12 and detailed in FIGS. 13, and 14a, b, c. FIG. 11 illustrates a configuration of a one-piece transport fluid box or waterbox 400 that comprises a housing 402 to which is connected inlet pipe 404 and outlet pipe 406 of similar diameter and geometry and diametrically opposed positionally and interconnectedly attached to a rectangular, square, or preferably cylindrical or other geometrically open cutting chamber 408 surrounding and of sufficient diameter to completely encompass the die face 410 (representationally equivalent to the surface of hardface 370 in FIGS. 7, 9, and 10). Housing 402 has mounting flange 412 through which a plurality of mounting bolts 414 pass to sealingly attach the transport fluid box or waterbox 400 and die 320 to diverter valve 200. Flange 416 on housing 402 allows attachment to the pelletizer 900 (see FIG. 3) as is detailed below. Components that are free to rotate within the cutting chamber 408 are described hereinafter.

Similarly, FIG. 12 illustrates a two-piece configuration of transport fluid box or waterbox 400 comprising a main body 450 with housing 452 to which is connected inlet pipe 454 and outlet pipe 456 of similar diameter and geometry and diametrically opposed positionally and interconnectedly attached to a rectangular, square, or preferably cylindrical or other geometrically open cutting chamber 458 surrounding, and of sufficient diameter to completely encompass, the die face 410 (representationally equivalent to the surface of hardface 370 in FIGS. 7, 9, and 10) comparably described above and as completely assembled as herein described. Housing 452 has mounting flange 462 through which a plurality of mounting bolts or studs 464 pass. Mounting flange 462 sealingly attaches to adapter ring 470 of comparable diameter, both inside and outside dimensions, through which pass a plurality of countersink bolts 472. Mounting bolts or studs 464 and countersink bolts 472 are preferably alternating positionally and sealingly attach the components of and thus the complete transport fluid box or waterbox 400 and die 320 to diverter valve 200. Flange 466 on housing 452 of the main body 450 allows attachment to the pelletizer 900 (see FIG. 3) as is detailed below. Components that are free to rotate within the cutting chamber 408 in FIG. 11 and/or cutting chamber 458 in FIG. 12 are described hereinafter. Separate attachment of the adapter ring 470 to and through the die 320 allows the main body 450 to be removed for cleaning or maintenance while leaving die body 320 sealingly attached to diverter valve 200.

An exploded view of the two-piece configuration of transport fluid box or waterbox 400 is illustrated in FIG. 13 with a complete assembly illustrated in FIG. 14. Reference numbers are retained to be consistent wherein similar parts have similar numbers in FIGS. 12, 13, and 14a.

FIGS. 14b and 14c illustrate an alternative design for the transport fluid box or waterbox inlet and outlet in that inlet 480 is fixedly attached to a rectangular or square inlet tube 482 that taperingly increases along its length as it approaches the housing 481 to which it is attachedly connected and within which is cutting chamber 484. Similarly attached to housing 481 and diametrically opposed to inlet tube 482 is rectangular or square outlet tube 486 that taperingly decreases along its length to outlet 488 to which it is fixedly attached. Flange 483 and flange 485 in FIGS. 14b and 14c compare in design and purpose to flanges 462 and 466 in FIG. 14a previously described.

FIGS. 14a, b, and c illustrate a preferred diametrically opposed inlets and outlets. Alternatively, the inlets, 454 and 480, and outlets, 456 and 488, can be located at an angle from approximately 20° to a preferred 180° relative to and defined by the position of outlet to inlet and can be opposingly or staggeringly attached to housing 481 by way of example. Dimensions of the inlet and outlet can be the same or different and the inlet and outlet can be similar or different in design. Preferably the inlet and outlet so identified are of similar dimension and design, and are diametrically opposed.

Returning to FIG. 13, for conventional surface treatments to reduce abrasion, erosion, corrosion, wear, and undesirable adhesion and sticture, the inner surface 1812 of flange 466 and the lumens 1818 of inlet pipe 454 and outlet pipe 456 (lumen not shown) can be nitrided, carbonitrided, sintered, can undergo high velocity air and fuel modified thermal treatments, and can be electrolytically plated. The exterior surface 1814 and exposed surface 1816 of die body 320 can be treated similarly. It is understood that variations illustrated in FIGS. 11, 12, 13, and 14a, b, c can be treated similarly. Other surface treatments for improvement of surface properties, enhancement of corrosion and abrasion resistance, improvement of wear, improvement of wear, and/or reduction of clumping, agglomeration, and/or sticture can be used without intending to be limited.

Once again returning to the principle disclosure illustration in FIG. 3, pelletizer 900 is shown in the non-operational open position. Attached to the pelletizer is flow guide 800, and cutter hub 600 with cutter blades 700. Upon operation of the equipment, pelletizer 900 is moved into position such that it can be fixedly attached to flange 416 of the one-piece configuration of transport fluid box or waterbox 400 or flange 466 on the main body 450 of the two-piece configuration of transport fluid box or waterbox 400 as detailed in FIGS. 11 and 12, respectively. Attachment is most preferably made, but not limited to, quick disconnects but can be through many mechanisms. In the operating configuration, the cutter hub 600 and cutter blades 700 freely rotate within the cutting chamber 408 (FIG. 11) or 458 (FIG. 12). Details of all illustrated components are contained within the ensuing discussions.

Figure 15:
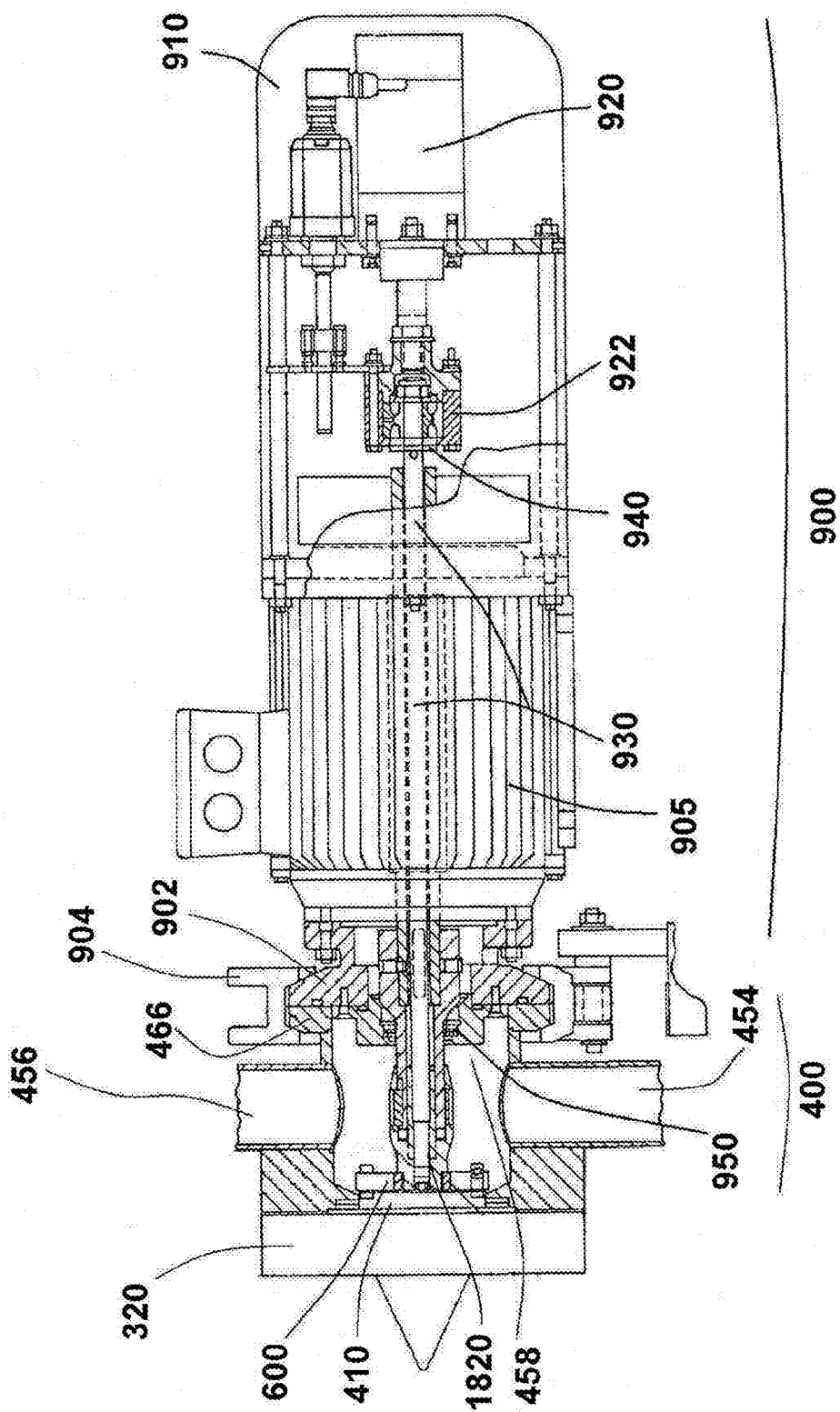
FIG. 15 is a schematic illustration of a pelletizer with attached waterbox or transport fluid box showing the die.

The pelletizer 900 of the instant invention is shown diagramatically in FIG. 15 and can be positionally adjustable in terms of cutter hub 600 relationally to die face 410. FIG. 15 represents the pelletizer 900 in operational position wherein it is sealingly attached via pelletizer flange 902 to transport fluid box or waterbox flange 466 tightly held by removable quick disconnect clamp 904, for example. Positional adjustment of the pelletizer can be achieved manually, spring-loaded, hydraulically, pneumatically, or electromechanically, or can be achieved by combinations of these mechanisms acting cumulatively in one direction or opposingly in counter-direction of forces applied to insure appropriateness of position as necessitated to achieve even wear, increased longevity, avoidance of undue extrusion leading to melt wrap around the cutter hub or the die face 410, and consistency of the pelletized product. A preferred design is of the hydraulic-pneumatic mechanism detailed in FIG. 15 comprising a motor 905, housing 910, and containing hydraulic cylinder 920 engagedly attached to coupling 922. A rotor shaft 930 connects coupling 922 to the cutter hub 600 at the die face 410 and passes through thrust bearing 940 and sealing mechanism and preferably a mechanical sealing mechanism 950 in fluid contact with cutting chamber 458 of transport fluid box or waterbox 400. Inlet pipe 454 and outlet pipe 456 indicate flow direction of fluids, preferably water, into the cutting chamber 458, admixture of fluids and pellets in the cutting chamber 458, and subsequently, flow of the pellet slurry formed away from the cutter hub 600 as well as die face 410 and out of the cutting chamber 458.

Figure 16:
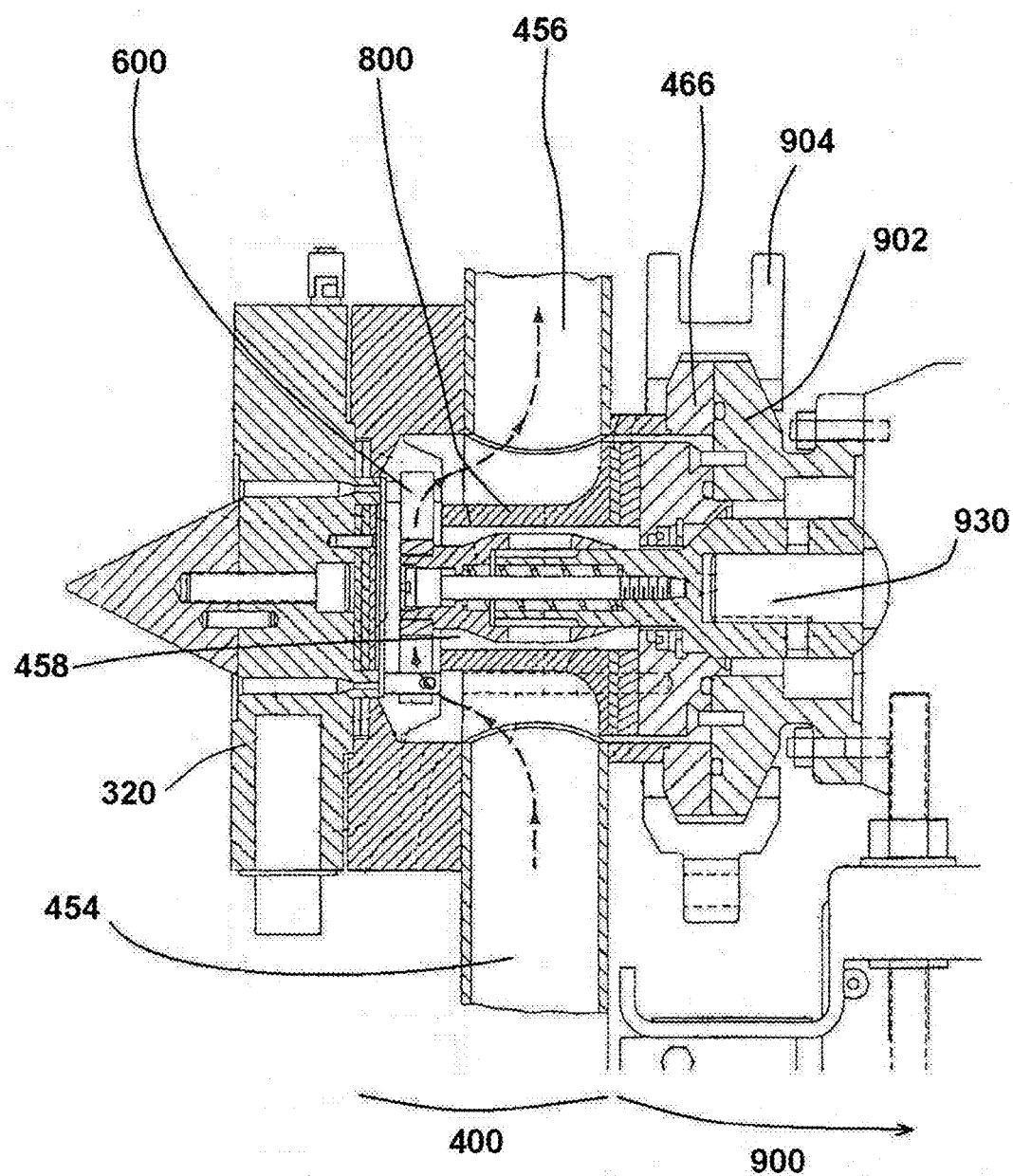
FIG. 16 is a schematic illustration of a die attached to a waterbox or transport fluid box containing a flow guide.
Figure 17A:
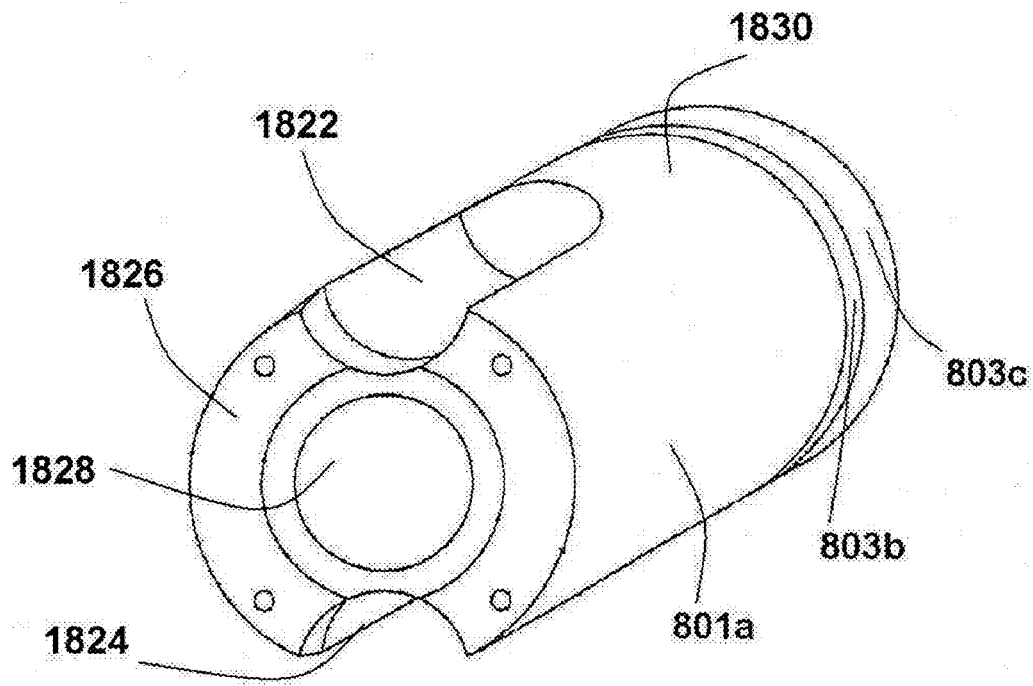
FIG. 17a is a schematic illustration of a comparative flow guide.
Figure 17B:
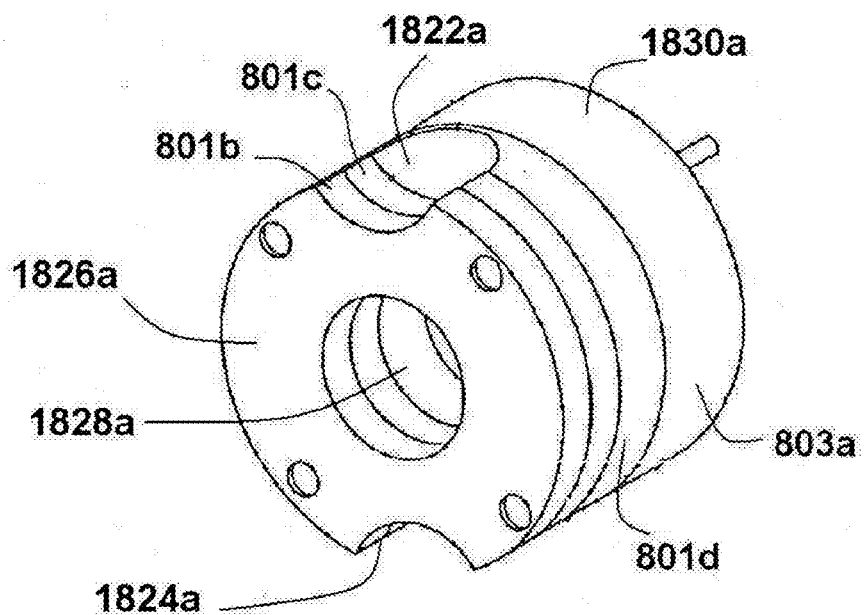
FIG. 17b is a schematic illustration of a second configuration of a comparative flow guide.

To increase fluid velocity through the cutting chamber 458, improve pellet quality, reduce freeze off, avoid wrapping of melt around die face 410, generate or increase head pressure, and improve pellet geometry, FIG. 16 illustrates a preferred configuration in which flow guide 800 is positioned in the cutting chamber 458 effectively reducing the fluid volume of that region. The die 320, transport fluid box or waterbox 400, and pelletizer 900, shown only partially, are positionally the same as in FIG. 15. The hollow shaft rotor preferably is attached to cutter hub 600 in cutting chamber 458 with appropriate inlet pipe 454 and outlet pipe 456 as previously described. The pelletizer 900 is sealingly and removably attached to the transport fluid box or waterbox 400 through use of quick disconnect clamp 904 on pelletizer flange 902 and transport fluid box or waterbox flange 466 as before. FIGS. 17a and 17b show two exemplary configurations for flow guide 800, in which sections can be of similar or different segmental length having consistent outside diameter that is less than the diameter of cutting chamber 458 and can be varied in accordance with the requisite diminution of volume desired in that cutting chamber 458. Flow guide spacer sections 803 can be uniform circumferentially and diametrically as indicated singly by 803a, or plurally in 803b and 803c, but can vary in segmental length and are not limited in plurality to two as shown. To direct and/or restrict flow, flow directing segments 801 singly in 801a or unlimited plurally in 801b, 801c, and 801d, for example, are modified by longitudinally extending grooves that are arcuate in transverse configuration with the deepest grooved section positioned proximal to the cutter hub 600. A preferred configuration of a series of segments is not intended to be limited as to number of segments and a single flow guide component of comparable geometry and functionality is well within the scope of the present invention.

Figure 18:
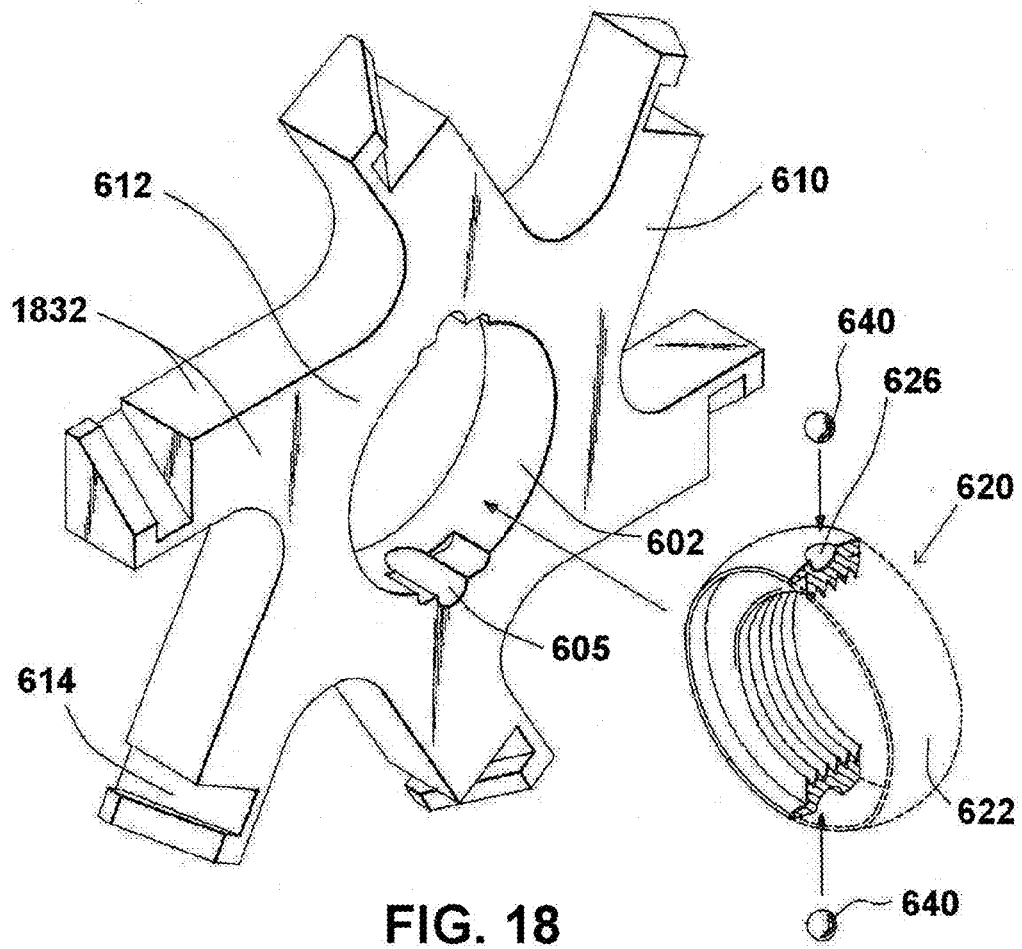
FIG. 18 is a schematic illustration of a comparative flexible cutter hub with exploded view of flexible hub component.

Continuing with FIG. 15, cutter hub 600 is attached by screwing onto the threaded end of the rotor shaft 930 of pelletizer 900. The cutter hub 600 can be rigidly mounted to the rotor shaft 930 and can contain a number of cutter arms 610 in balanced proportion placed circumferentially about the cutter hub 600 as illustrated in FIG. 18. Alternatively and preferably, the cutter hub 600 is flexibly attached to rotor shaft 930 using an adapter 620 in which the adapter 620 is attachedly and threadedly connected to rotor shaft 930. Adapter 620 has a partial spherical outer surface 622 matching a similar partial spherical inner surface bore 602 in the cutter hub 600. Diametrically opposed and recessed into the partial spherical inner surface bore 602 are longitudinal recesses 605 that extend to the edge of the cutter hub 600 and into that fit ball 640. Similarly, diametrical recesses 626 for ball 640 are located on adapter 620 positionally oriented such that longitudinal recess 605 and diametrical recess 626 align to interlockingly affix balls 640 once adapter 620 is inserted orthogonally into position and rotated to a position parallel to cutter hub 600. This allows free oscillation of the cutter hub 600 about the diametrically positioned balls 640 on fixedly attached adapter 620 to rotor shaft 930 that permits rotational self-alignment of the cutter hub 600.

Figures 19A, 19B, 19C:
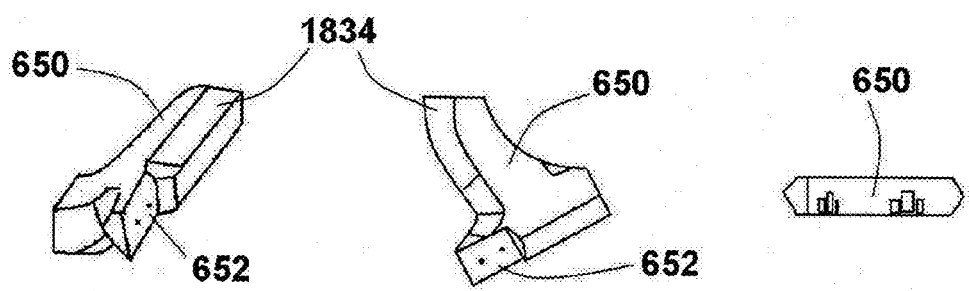

The cutter arms 610 and body of cutter hub 612 can be square or preferably rectangular in cross-section as shown in FIG. 18 or can be more streamlined to give an extended hexagonal cross-section as illustrated in FIG. 19c. FIGS. 19a and 19b shows segments of streamline cutter hub 650. Cutter blades (not shown) are fixedly attached by screw or similar mechanism at flattened angular groove 614, FIG. 18, or at flattened angular notch 652, FIGS. 19a and 19b.

Figure 20:
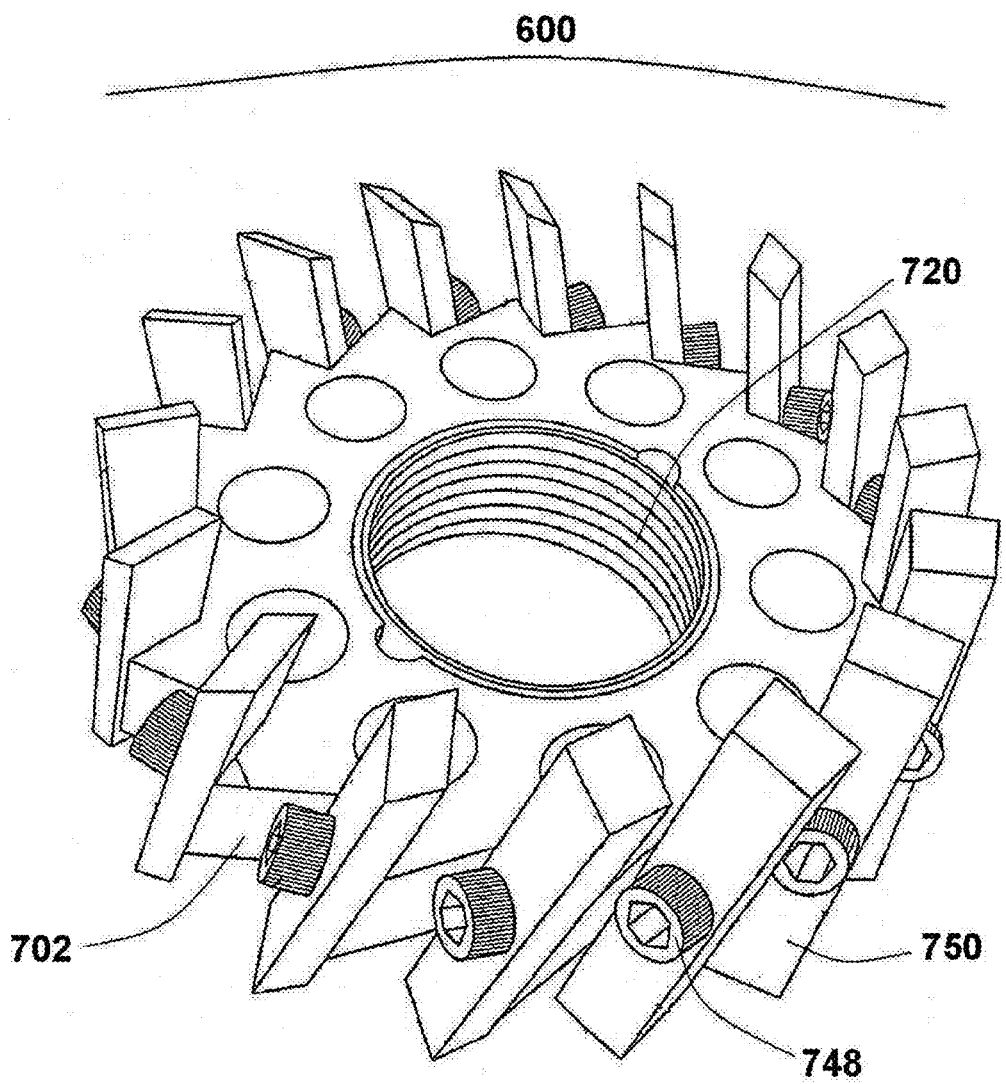
FIG. 20 is a schematic illustration of a steep angle cutter hub.
Figure 21A:
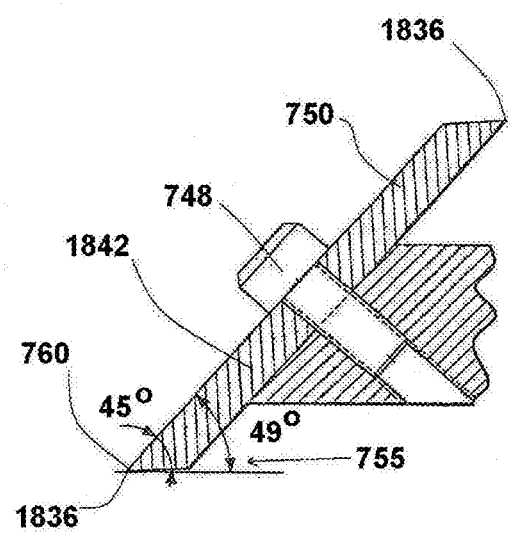
FIG. 21a is a schematic illustration of a comparative cutter hub with attached normal angle blade.
Figure 21B:
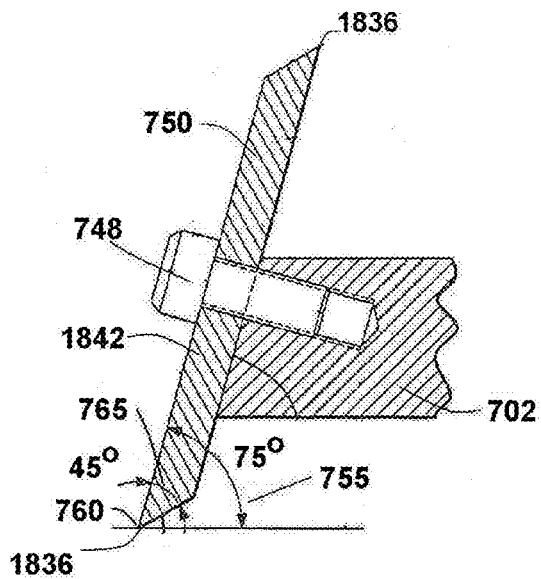
FIG. 21b is a schematic illustration of a steep angle cutter hub with attached blade.
Figure 21C:
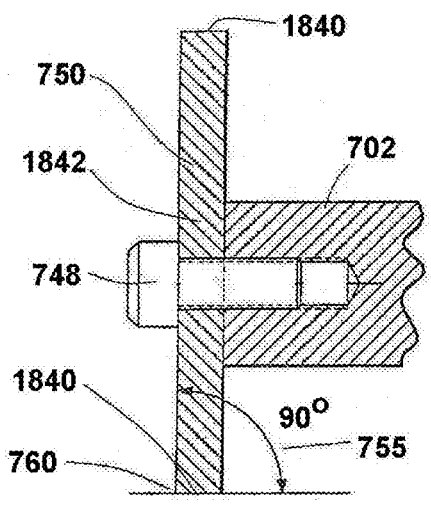
FIG. 21c is a schematic illustration of a comparative perpendicular angle cutter hub with attached non-tapered or square-cut blunted tip blade.
Figure 21D:
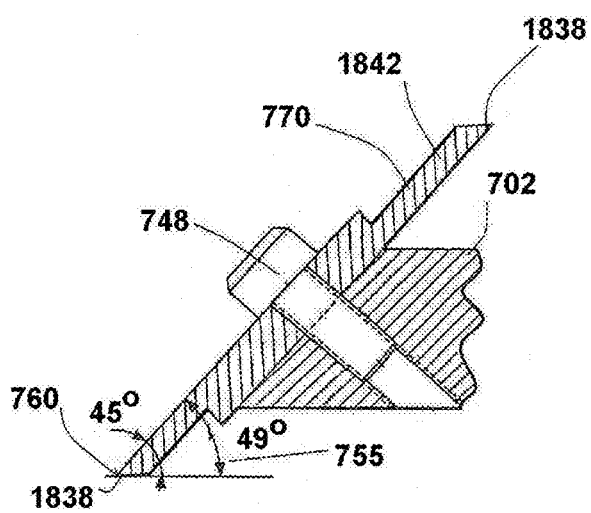
FIG. 21d is a schematic illustration of a cutter hub with attached reduced thickness blade at normal angle.

Alternatively, FIG. 20 illustrates a preferred steep-angle cutter hub 600, in which cutter arms 610 as shown in FIG. 15 are optionally replaced by cutter blade support 702 to which are attached cutter blade 750 preferably by screw 748 while other mechanisms are known to those skilled in the art and are not limited as herein described. Adapter 720 allows self-aligning flexibility with threaded attachment to rotor shaft 930, FIG. 15, as detailed previously. Other cutter hub designs that are functionally equivalent are within the scope of the present invention as are known to those skilled in the art.

FIG. 21 illustrates various angularly inclined positions and shapes of the cutter blades 750. The blade angle 755 can vary from approximately 0° to approximately 110° or greater, FIGS. 21a, b, and c, relative to die hard face 370, FIG. 10, with a blade angle 755 of between approximately 60° to approximately 79° preferred, FIG. 21b, and a blade angle of approximately 75° more preferred. The blade cutting edge 760 can be square, beveled, or angled as has been demonstrated by prior art and is preferably at a blade cutting angle 765 of approximately 20° to approximately 50° and more preferred at approximately 45°. Alternatively, and most preferred, is a half-thickness blade 770 as illustrated in FIG. 21d that can be similarly attached, similarly angled, and with comparable blade cutting angles and preferences as described above. Additionally, blade designs, dimensionally and compositionally, can prove useful depending on other process parameters.

The cutter blade 750 and half-thickness blade 770 compositionally include, but are not limited to, tool steel, stainless steel, nickel and nickel alloys, metal-ceramic composites, ceramics, metal or metal carbide composites, carbides, vanadium hardened steel, suitably hardened plastic, or other comparably durable material and can be further annealed and hardened as is well known to those skilled in the art. Wear-resistance, corrosion resistance, durability, wear lifetime, chemical resistance, and abrasion resistance are some of the important concepts influencing the utility of a particular blade relative to the formulation being pelletized. Blade dimensions of length, width, and thickness as well as number of blades used relationally with cutter hub design are not limited within the scope of the present invention.

Returning to FIG. 15, conventional surface treatments to reduce abrasion, erosion, corrosion, wear, and undesirable adhesion and sticture, can be applied to the outer surface 1820 of the exposed portion of the rotor shaft 930 that extends out from the transport fluid box or waterbox flange 466 into cutting chamber 458 and can be nitrided, carbonitrided, metallized by sintering, and electrolytically plated. The extent of the surface treatment on rotor shaft 930 is reduced to the portion distal from waterbox flange 466 when flow guide 800 is utilized to reduce the volume of the cutting chamber 458 as heretofore described.

Similarly, conventional nitriding, carbonitriding, sintering, high velocity air and fuel modified thermal treatments, and electrolytic plating can also be applied to the surfaces of flow guide 800 (FIG. 16) as detailed in FIGS. 17a and 17b. In particular, the outlet flow surfaces 1822 and 1822a, the inlet flow surfaces 1824 and 1824a, flow guide faces 1826 and 1826a distal from flange 466 and flow guide faces (not shown) proximal to flange 466, the flow guide lumen surfaces 1828 and 1828a, and the flow guide circumferential surface 1830 and 1830a. These same conventional treatments can be applied to the cutter hub and arm surfaces 1832 of cutter hub 612 and cutter arms 610 detailed in FIG. 18 and to cutter hub and arm surfaces 1834 of variant design cutter hub and cutter arms illustrated in FIGS. 19a and 19b. Cutter blade 750 and half-thickness blade 770 illustrated in FIGS. 21a, b, c, d may be similarly treated on the tip surface 1836 in FIGS. 21a and 21b, on tip surface 1838 in FIG. 21d, and edge surface 1840 in FIG. 21c. Alternatively, circumferential blade surface 1842 can optionally be treated conventionally as well. Other surface treatments for improvement of surface properties, enhancement of corrosion and abrasion resistance, improvement of wear, and/or reduction of clumping, agglomeration, and/or sticture can be used without intending to be limited.

FIG. 3 illustrates the relative position of the bypass loop 550. A transport medium, for example, water or comparable fluid for use in the bypass loop 550 and pellet transportation, is obtained from reservoir 1600 or other sources, and is transported toward the transport fluid box or waterbox 400 through pump 500 that can be of a design and/or configuration to provide sufficient fluid flow into and through the optional heat exchanger 520 and transport pipe 530 to and into bypass loop 550. The heat exchanger 520 similarly can be of a design of suitable capacity to maintain the temperature of the water or other transport fluid at a temperature appropriately suitable to maintain the temperature of the pellets being formed such that pellet geometry, throughput, and pellet quality are satisfactory without tailing, and where wrap-around of molten plastic on the cutting face, agglomeration of pellets, cavitation, and/or accumulation of pellets in the transport fluid box or waterbox are maximally avoided. Temperatures and flow rates as well as composition of the transport fluid will vary with the material or formulation being processed. Transport medium/fluid temperatures are preferably maintained at least approximately 20° C. below the melting temperature of the polymer and preferably are maintained at a temperature of between approximately 30° C. to approximately 100° C. below the melt temperature. Maintenance of the transport fluid temperature is more preferably maintained from between approximately 0° C. to approximately 100° C., still more preferred from between approximately 10° C. to approximately 90° C., and most preferably from between approximately 60° C. to approximately 85° C.

Additionally processing aids, flow modifiers, surface modifiers, coatings, surface treatments including antistats and various additives known to those skilled in the art can be accommodated in the transport fluid. Piping, valving, and bypass components should be of suitable construction to withstand the temperature, chemical composition, abrasivity, corrosivity, and/or any pressure requisite to the proper transport of the pellet-transport fluid mixture. Any pressure required by the system is determined by the transport distance, vertical and horizontal, pressure level needed to suppress unwanted volatilization of components or premature expansion, pellet-transport fluid slurry flow through valving, coarse screening, and ancillary process and/or monitoring equipment. Pellet-to-transport fluid ratios should similarly be of varying proportions to be satisfactorily effective in eliminating or alleviating the above-mentioned complicating circumstances exemplary of which are pellet accumulation, flow blockage or obstruction, and agglomeration. Piping diameter and distances required are determined by the material throughput, thus the flow rate and pellet-to-transport fluid ratio, and time required to achieve an appropriate level of cooling and/or solidification of the pellets to avoid undesirable volatilization and/or premature expansion. Valving, gauges, or other processing and monitoring equipment should be of sufficient flow and pressure rating as well as of sufficient throughpass diameter to avoid undue blockage, obstruction or otherwise alter the process leading to additional and undesirable pressure generation or process occlusion. Transport fluid and additive composition should be compatible with the components of the pellet formulation and should not be readily absorbed into or adsorbed onto the components in that formulation. Excess transport fluid and/or additives should be readily removable from the pellets by such methods as rinsing, aspiration, evaporation, dewatering, solvent removal, filtration, or a similar technique understood by those skilled in the art.

Pump 500 and heat exchanger 520 in FIG. 3 are prone to abrasion, erosion, corrosion, and wear as well particularly from by-products of the pelletization process, and components (not shown) can optionally be surface treated utilizing conventional nitriding, carbonitriding, sintering, high velocity air and fuel modified thermal treatments, and electrolytic plating. In addition, flame spray, thermal spray, plasma treatment, electroless nickel dispersion treatments, and electrolytic plasma treatments, singly and in combinations thereof can be utilized as is known to those skilled in the art.

The standard bypass loop 550, as illustrated in FIG. 22, allows the transport fluid, preferably water, from inlet pipe 530 to enter three-way valve 555 and be redirected into the bypass flow or toward the transport fluid box or waterbox 400. To bypass the transport fluid box or waterbox 400, the transport fluid is directed by three-way valve 555 into and through bypass pipe 565 into outlet pipe 570. To achieve this, blocking valve 575 is closed. Alternatively, to allow water to flow to and through the transport fluid box or waterbox 400 the three-way valve 555 is directed to allow flow into and through pipe 560 and into pipe 580 with blocking valve 575 open and with drain valve 590 closed. Water proceeds into and through transport fluid box or waterbox 400 and transports pellets into and through sight glass 585 through blocking valve 575 and into outlet pipe 570 for down-stream processing as described below. To drain the system and allow cleaning or maintenance of the transport fluid box or waterbox 400 or die hardface 370 or to replace any of the die 320 components, three-way valve 555 directs flow into and through pipe 565 and into outlet pipe 570. With blocking valve 575 now closed and drain valve 590 open, the water remaining entrapped below 575, in components 585, 400, 560, and 580 drains out drain 595 for recycling or disposal.

Figure 23:
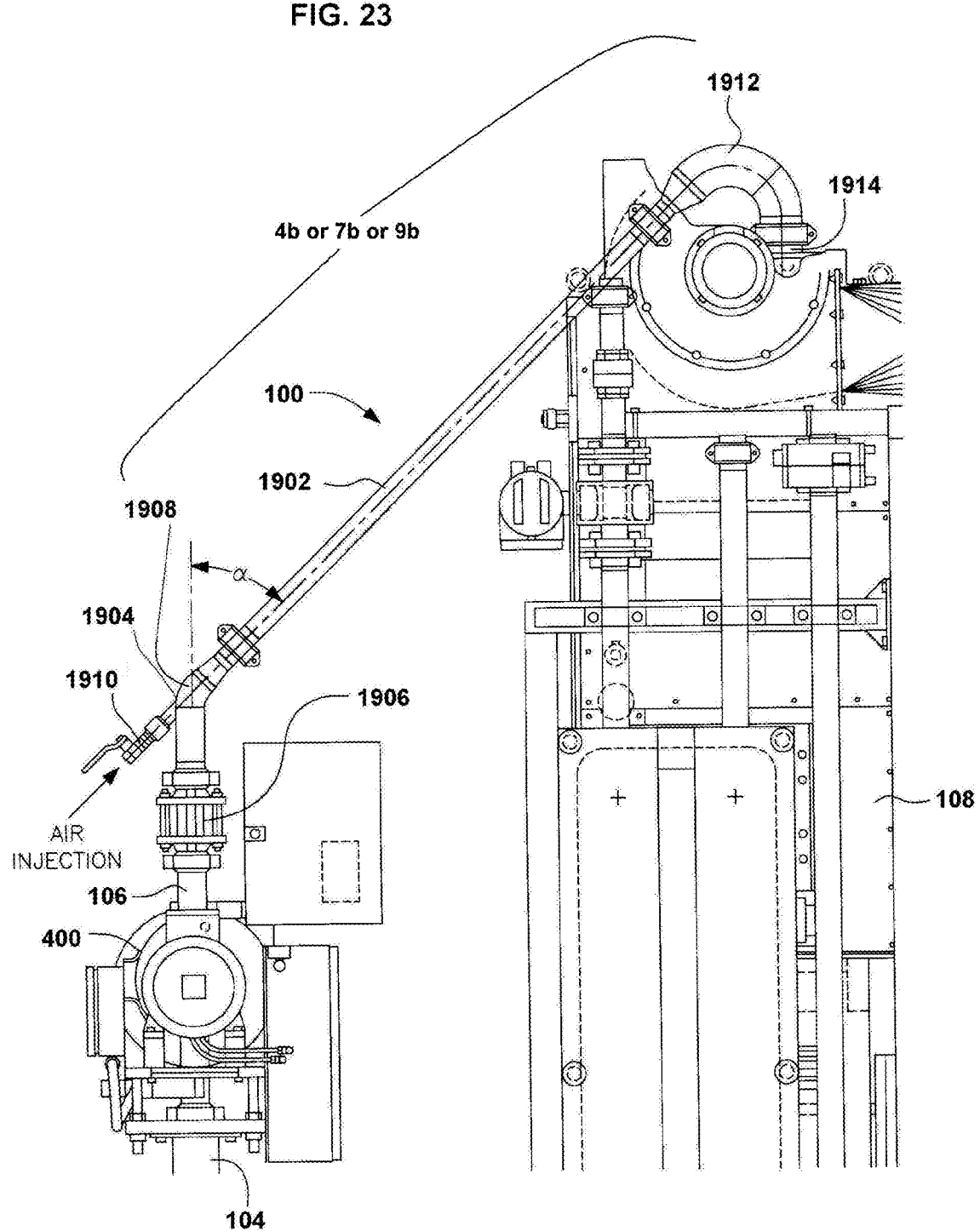
FIG. 23 is a schematic illustration showing the method and apparatus for inert gas injection into the slurry line from the pelletizer to the dryer.

Once the pellet is sufficiently solidified for processing, it is transported via pipe 1270 to and through an agglomerate catcher/dewatering unit 1300 and into the drying unit 1400, subsequently exiting the dryer for additional processing as described hereunder.

Wherein crystallization of the pellets is a part of the process, the standard bypass loop 550 is optionally replaced with a direct pathway between the transport fluid box or waterbox 400 and the dryer 1400 such that pressurized air can be injected into that pathway as illustrated in FIG. 23. Air is injected into the system slurry line 1902 at point 1904, preferably adjacent to the exit from the transport fluid box or waterbox 400 and near the beginning of the slurry line 1902. This preferred site 1904 for air injection facilitates the transport of the pellets by increasing the transport rate and facilitating the aspiration of the water in the slurry, thus allowing the pellets and granules to retain sufficient latent heat to effect the desired crystallization. High velocity air is conveniently and economically injected into the slurry line 1902 at point 1904 using conventional compressed air lines typically available at manufacturing facilities, such as with a pneumatic compressor. Other inert gas including, but not limited to, nitrogen can be used to convey the pellets at a high velocity as described. This high velocity air or inert gas flow is achieved using the compressed gas producing a volume of flow of at least approximately 100 cubic meters/hour using a standard ball valve for regulation of a pressure of at least approximately 8 bar into the slurry line which is standard pipe diameter, preferably approximately 1.6 inch (approximately 4.1 centimeters) pipe diameter.

Figure 24:
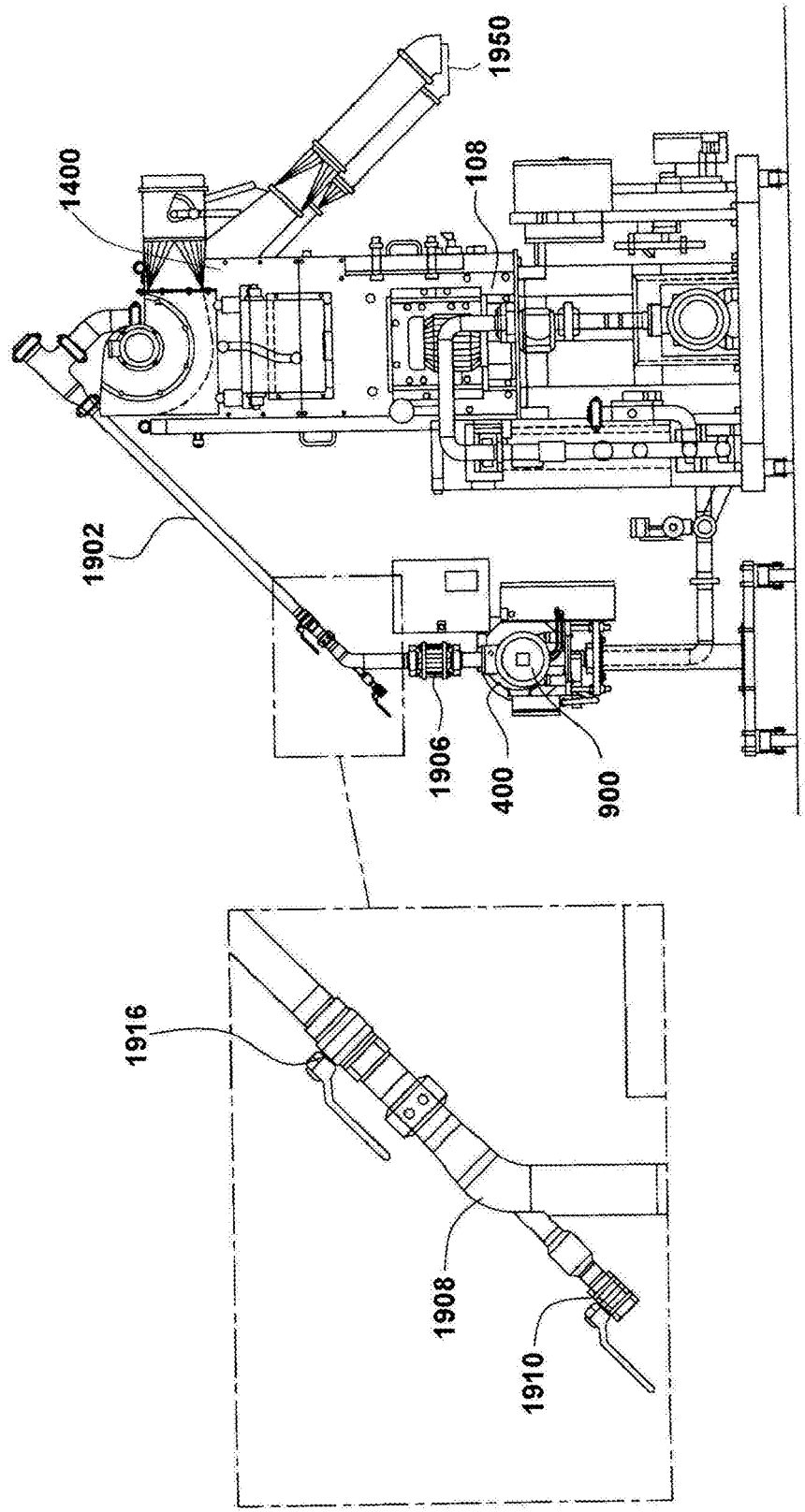
FIG. 24 is a schematic illustration showing a preferred method and apparatus for inert gas injection into the slurry line from the pelletizer to the dryer including an expanded view of the ball valve in the slurry line.

To those skilled in the art, flow rates and pipe diameters can vary according to the throughput volume, level of crystallinity desired, and the size of the pellets and granules. The high velocity air or inert gas effectively contacts the pellet water slurry generating water vapor by aspiration, and disperses the pellets throughout the slurry line propagating those pellets at increased velocity into the dryer 1400, preferably at a rate of less than one second from the transport fluid box or waterbox 400 to the dryer exit 1950 (FIG. 24). The high velocity aspiration produces a mixture of pellets in an air/gas mixture that may approach approximately 98-99% by volume of air in the gaseous mixture.

FIG. 23 illustrates air injection into the slurry line 1902. The water/pellet slurry exits the transport fluid box or waterbox 400 into the slurry line 1902 through the sight glass 1906 past the angle elbow 1908 where the compressed air is injected from the air-injection inlet valve 1910 through the angled slurry line 1902 and past the enlarged elbow 1912 through and into dryer 1400. It is preferred that the air injection into the angled elbow 1908 is in line with the axis of the slurry line 1902 providing the maximum effect of that air injection on the pellet/water slurry resulting in constant aspiration of the mixture. The angle formed between the vertical axis of slurry line 1902 and the longitudinal axis of said slurry line 1902 can vary from approximately 0° to approximately 90° or more as obviated by the variance in the height of the pelletizer 900 relative to the height of the dryer inlet 1914 to the dryer 1400. This difference in height can be due to the physical positioning of the dryer inlet 1914 of dryer 1400 in relation to the pelletizer 900 or can be a consequence of the difference in the sizes of the dryer and pelletizer. A preferred angle range is from approximately 30° to approximately 60° with the more preferred angle being approximately 45°. The enlarged elbow 1912 into the dryer inlet 1914 facilitates the transition of the high velocity aspirated pellet/water slurry from the incoming slurry line 1902 into the dryer inlet 1914 and reduces the velocity of the pellet slurry into the dryer 1400. The position of the equipment, as shown in FIG. 24, allows transport of the pellets from the pelletizer 900 to the dryer exit 1950 in approximately one second which minimizes loss of heat inside the pellet. This is further optimized by insertion of a second valve mechanism, or more preferred a second ball valve 1916, after the air-injection inlet valve 1910. This additional ball valve allows better regulation of the residence time of the pellets in the slurry line 1902 and reduces vibration that can occur in the slurry line. The second ball valve 1916 can allow additional pressurization of the air injected into the chamber and can improve the aspiration of the water from the pellet/water slurry. This can become especially important as the size of the pellets and granules decrease in size.

Abrasion, erosion, corrosion, wear, and undesirable adhesion and sticture can be problematic in transport piping as illustrated FIG. 3 for pipe 1270, in FIG. 22 for bypass loop 550 piping exemplarily including pipes 530, 560, and 565, as well as slurry line 1902 in FIG. 23. These pipes can be manufactured to form short radius and long radius right angles or alternatively can be bent to form short radius and long radius sweep angles or curves. Without intending to be bound by theory, it is anticipated that induced stresses can be introduced by such manipulations potentially leading to increased likelihood of wear-related failures due to abrasion, erosion, and/or corrosion, for example. Treatments including nitriding, carbonitriding, sintering, electrolytic plating, electroless plating, thermal hardening, plasma treatments, extrusion, rotational molding or "rotolining", slush molding, and combinations thereof can be utilized to improve the resistance to wear-related processes and to reduce adhesion and sticture. Other surface treatments for improvement of surface properties, enhancement of corrosion and abrasion resistance, improvement of wear, and/or reduction of clumping, agglomeration, and/or sticture can be used without intending to be limited.

The drying unit or dryer 1400, illustrated in FIG. 3, can be many types of apparatus for achieving a controlled level of moisture for materials that can be flake, globular, spherical, cylindrical, or other geometric shapes. It can be achieved, but is not limited by, filtration, centrifugal drying, forced or heated air convection or a fluidized bed and is preferred to be a centrifugal dryer, and is most preferred to be a self-cleaning centrifugal dryer 1400.

Figure 25:
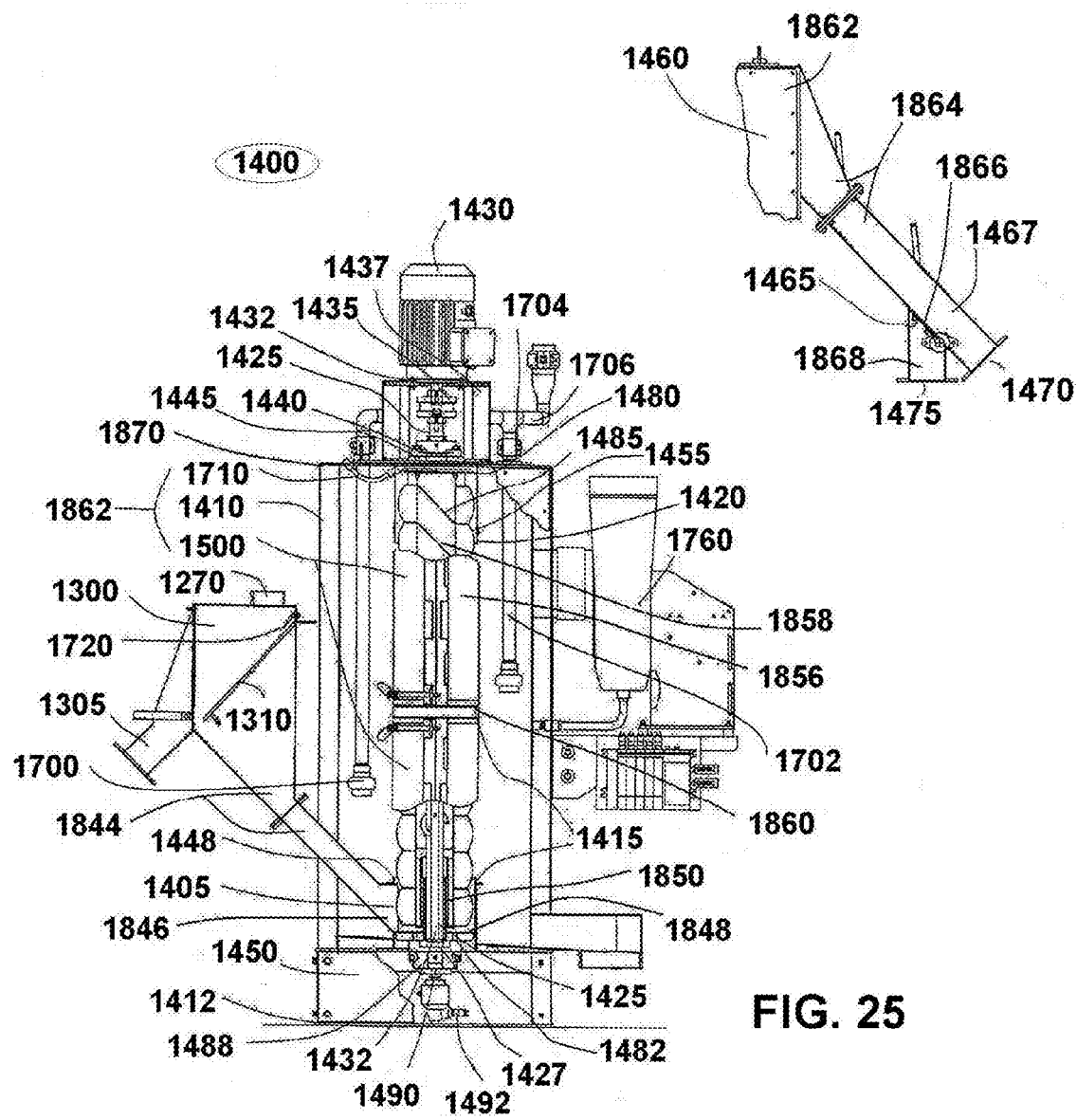
FIG. 25 is a schematic illustration of a comparative self-cleaning dryer.
Figure 26:
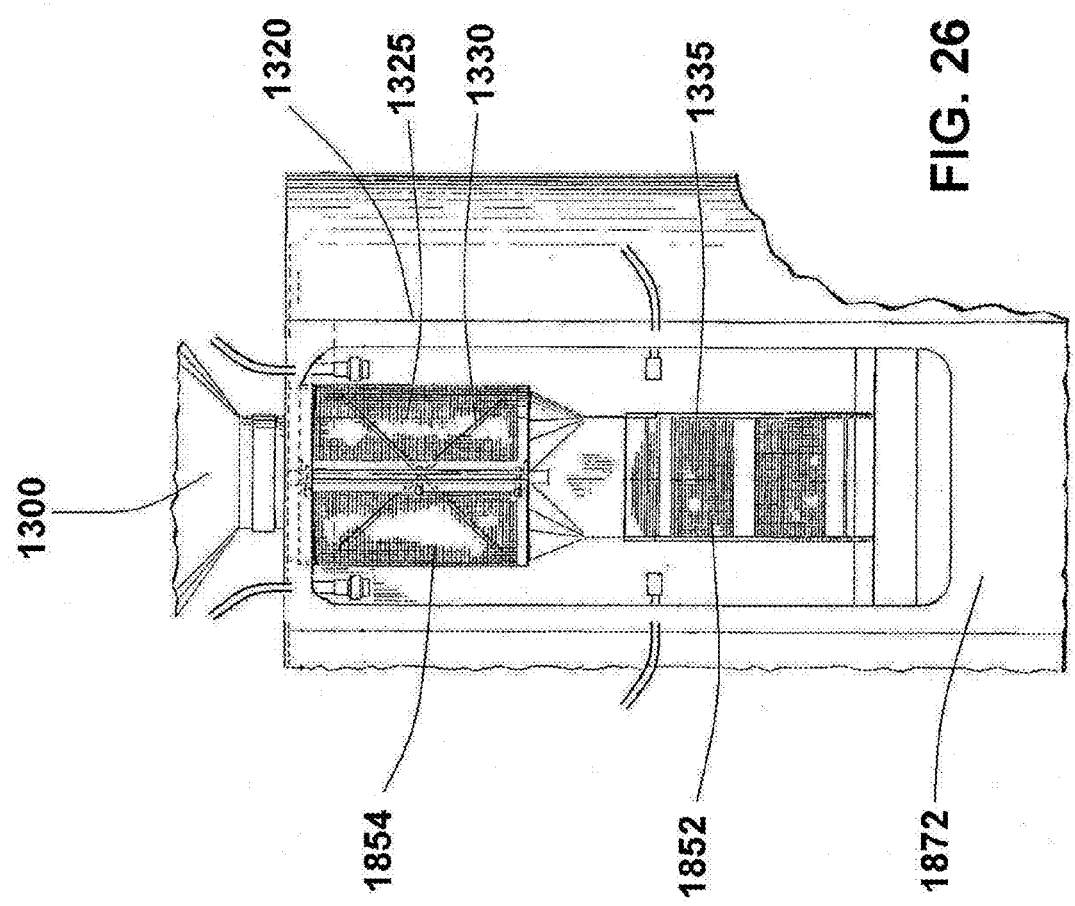
FIG. 26 is a schematic illustration of the dewatering portion of the self-cleaning dryer in FIG. 25.
Figure 27:
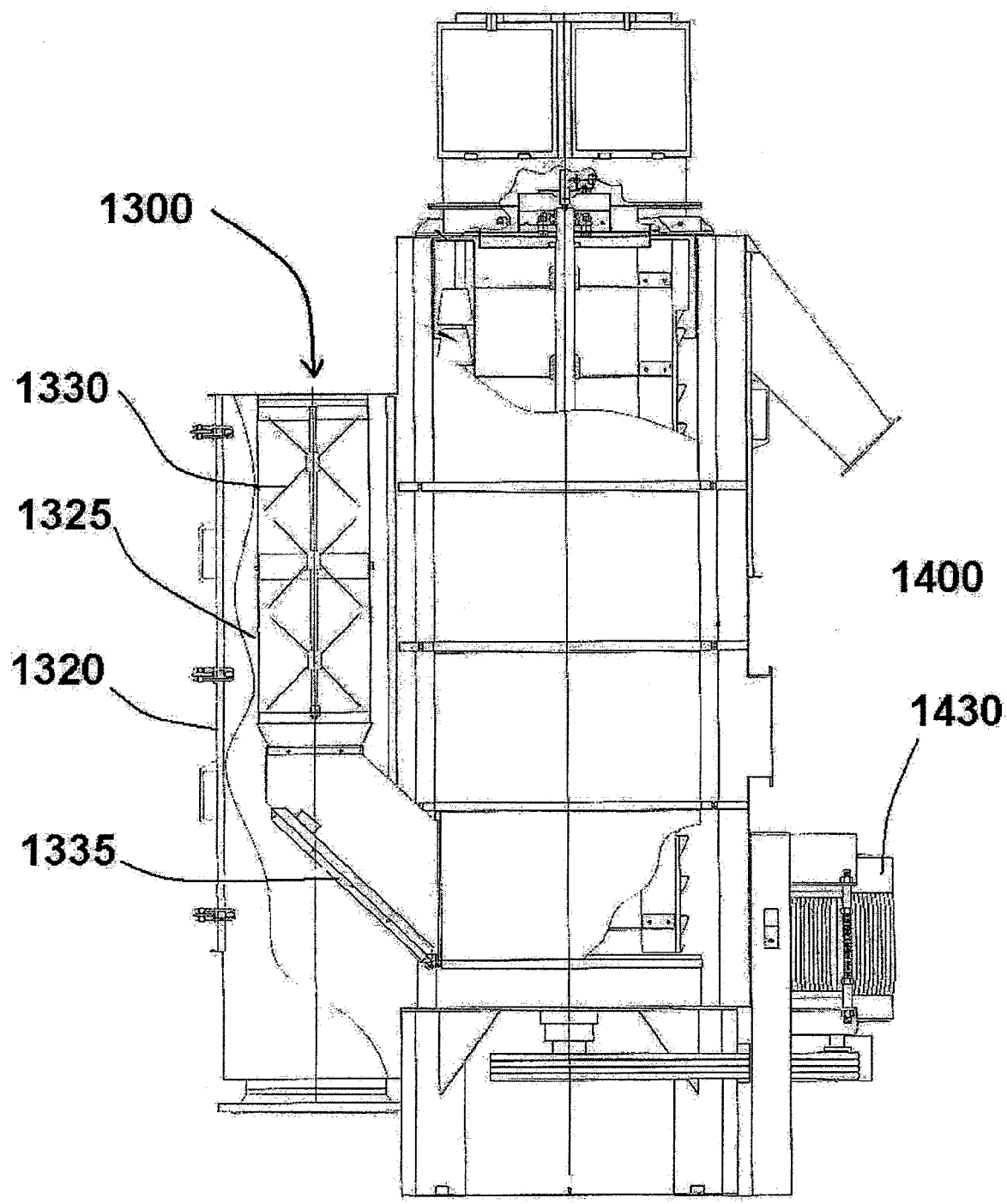
FIG. 27 is a schematic illustration of a second comparative dryer with attached dewatering section.
Figure 28:
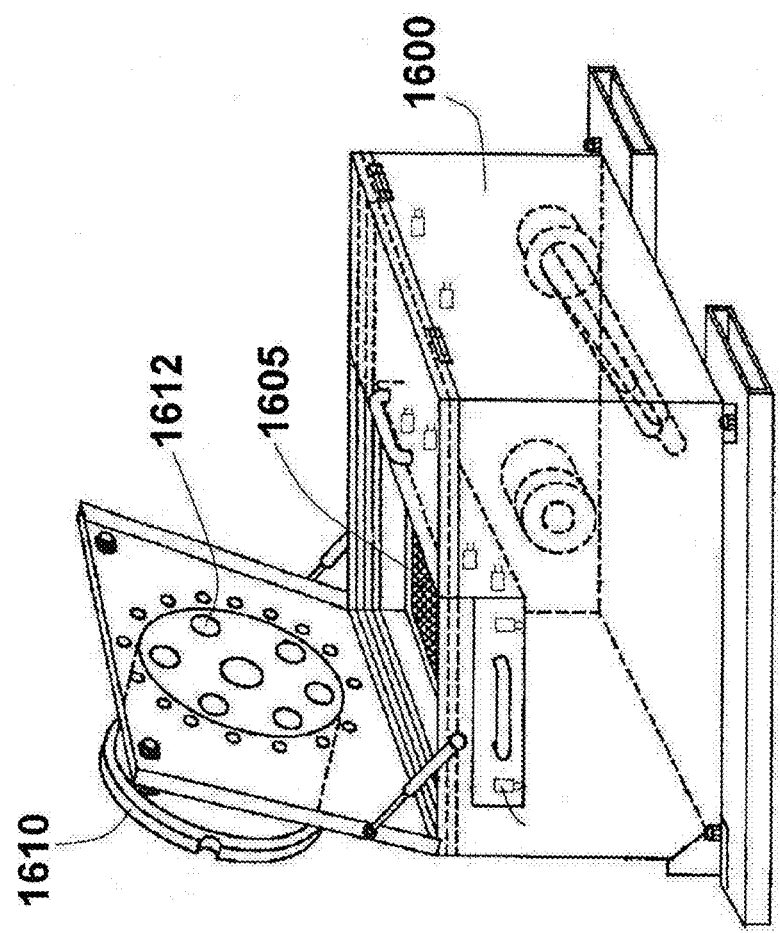
FIG. 28 is a schematic illustration of a reservoir.

Turning now to FIG. 25, the pipe 1270 discharges the pellets and fluid slurry or concentrated slurry into an agglomerate catcher 1300 that catches, removes and discharges pellet agglomerates through a discharge chute 1305. The agglomerate catcher 1300 includes an angled round bar grid, perforated plate or screen 1310 that permits passage of fluid and pellets but collects adhered, clumped, or otherwise agglomerated pellets and directs them toward the discharge chute 1305. The pellets and fluid slurry then optionally pass into a dewaterer 1320, FIG. 26 with additional detail in FIG. 27, that includes at least one vertical or horizontal dewatering foraminous membrane screen 1325 containing one or more baffles 1330 and/or an inclined foraminous membrane screen 1335 that enables fluid to pass downwardly into a fines removal screen 1605 and therethrough to the water reservoir 1600 (FIGS. 3 and 28). The pellets that still retain moisture on their surfaces are discharged from dewaterer 1320 into the lower end of the self-cleaning centrifugal dryer 1400 at a slurry inlet 1405, FIG. 25.

As illustrated in FIG. 25, the self-cleaning centrifugal pellet dryer 1400 includes but is not limited to a generally cylindrical housing 1410 having a vertically oriented generally cylindrical screen 1500 mounted on a cylindrical screen support 1415 at the base of the screen, and a cylindrical screen support 1420 at the top of the screen. The screen 1500 is thus positioned concentrically within the housing 1410 in radially spaced relation from the inside wall of the housing.

A vertical rotor 1425 is mounted for rotation within the screen 1500 and is rotatably driven by a motor 1430 that can be mounted at and/or connected to the base of the dryer (FIG. 27) or at the top of the dryer and is preferably mounted atop the upper end of the dryer, FIG. 25. The motor 1430 is connected to the rotor 1425 by a drive connection 1435 and through a bearing 1440 connected with the upper end of the housing. The connection 1445 and bearing 1440 support the rotor 1425 and guide the rotational movement of the upper end of the rotor. The slurry inlet 1405 is in communication with the lower end of the screen 1500 and rotor 1425 through the lower screen support section 1450 at connection 1448, and the upper end of the housing and rotor is in communication with a dried pellet discharge chute 1460 through a connection, not shown, in the upper screen support section 1455 at the upper end of the housing. A diverter plate 1465 in outlet 1467 can divert dried pellets out of exit 1470 or exit 1475.

The housing 1410 is of sectional construction connected at a flanged coupling, not shown, at a lower end portion of the dryer and a flanged coupling, not illustrated, at the upper end portion of the dryer. The uppermost flange coupling is connected to a top plate 1480 that supports bearing structure 1440 and drive connection 1435 that are enclosed by a housing or guard 1437. A coupling 1432 atop the housing 1437 supports the motor 1430 and maintains all of the components in assembled relation.

The lower end of the housing 1410 is connected to a bottom plate 1412 on top of a water tank or reservoir 1600 by a flange connection 1610 as illustrated in FIG. 28. Apertures 1612 communicate the lower end of the dryer housing with the reservoir 1600 for discharge of fluid from the housing 1410 into the reservoir 1600 as the surface moisture is removed from the pellets. This removal is achieved by action of the rotor that elevates the pellets and imparts centrifugal forces to the pellets so that impact against the interior of the screen 1500 will remove moisture from the pellets with such moisture passing through the screen and ultimately into the reservoir 1600 in a manner well known in the art.

The self-cleaning structure of the disclosed dryer includes a plurality of spray nozzles or spray head assemblies 1702 supported between the interior of the housing 1410 and the exterior of the screen 1500 as illustrated in FIG. 25. The spray nozzle assembly 1702 is supported at the end of spray pipes 1700 extending upwardly through top plate 1480 at the upper end of the housing with the upper ends 1704 of the spray pipes 1700 being exposed. Hoses or lines 1706 feed high pressure fluid, preferably water at a flow rate of at least approximately 40 gpm, and preferably about 60 gpm to about 80 gpm, and more preferably at 80 gpm or higher to the spray nozzles 1702. The hoses 1706 can optionally feed off a single manifold (not shown) mounted on the dryer 1400.

There are preferably at least three spray head nozzle assemblies 1702 and related spray pipes 1700 and lines 1706. The spray head nozzle assembly 1702 and pipes 1700 are oriented in circumferentially spaced relation peripherally of the screen 1500 and oriented in staggered vertical relation so that pressurized fluid discharged from the spray head nozzles 1702 will contact and clean the screen 1500, inside and out, as well as the interior of the housing 1410. Thus, collected pellets that have accumulated or lodged in hang-up points or areas between the outside surface of the screen 1500 and inside wall of the housing 1410 are flushed through apertures 1612 into the reservoir 1600, FIG. 28. Similarly, leftover pellets inside the screen 1500 and outside the rotor 1425 are flushed out of the dryer and will not contaminate or become mixed with pellets passing through the dryer during a subsequent drying cycle in that a different type pellet is dried.

The region between the screen support section 1450 at the lower end of the dryer and the inner wall of the housing 1410 includes flat areas at the port openings and seams that connect the components of the dryer housing together. The high pressure water from the spray head nozzle assembly 1702 effectively rinses this region as well. The base screen support section 1450 is attached to the bottom plate 1412 of the housing 1410 and reservoir 1600 by screws or other fasteners to stationarily secure the housing and screen to the reservoir 1600. The base screen support section 1450 is in the form of a tub or basin as shown in FIG. 25. Alternatively, in other dryers the base screen support section 1450 can be in the form of an inverted tub or inverted base (not shown).

The rotor 1425 includes a substantially tubular member 1427 provided with inclined rotor blades 1485 thereon for lifting and elevating the pellets and subsequently impacting them against the screen 1500. In other dryers, the rotor 1410 can be square, round, hexagon, octagon or other shape in cross-section. A hollow shaft 1432 extends through the rotor 1425 in concentric spaced relation to the tubular member 1427 forming the rotor. The hollow shaft guides the lower end of the rotor as it extends through an opening 1482 in a guide bushing 1488 at the lower end of the rotor 1425, as well as aligned openings in bottom plate 1412 and the top wall of the reservoir 1600, respectively. A rotary coupling 1490 is connected to the hollow shaft 1432 and to a source of fluid pressure (not shown), preferably air, through hose or line 1492 to pressurize the interior of the hollow shaft 1432.

The hollow shaft 1432 includes apertures to communicate the shaft 1432 with the interior of the hollow rotor member 1427. These holes introduce the pressurized fluid, preferably air, into the interior of the rotor 1425. The rotor 1425 in turn has apertures in the bottom wall that communicate the bottom end of the rotor 1425 with the interior of the base or tub section 1450 to enable the lower end of the rotor 1425 and the tub section 1450 to be cleaned. Pellets flushed from the rotor and inside screen 1500 are discharged preferentially through the dried pellet outlet chute 1460.

The top of the rotor 1425 inside top section 1455 is also a hang-up point and subjected to high pressure fluid, preferably air, to dislodge accumulated pellets. As shown in FIG. 25, a nozzle 1710 directs the high pressure air across the top of the rotor 1425 to drive accumulated pellets out of the top section and preferentially into the pellet outlet chute 1460. The nozzle 1710 is fed by an air hose or line, not shown, that extends through top plate 1480 and is connected to a high pressure air source.

In addition to hang-up points or areas occurring in the dryer structure, the agglomerate catcher 1300 can also be cleaned by a separate pipe or hose 1720 controlled by a solenoid valve that directs high pressure fluid onto the pellet contact side of the angled agglomerate grate or catcher plate and bar rod grid 1310 to clean off agglomerates that are then discharged through the discharge tube or chute 1305.

A hose and nozzle supply bursts of air to discharge chute or pipe 1460 in a direction such that it cleans the top of the rotor 1425 and the pellet discharge outlet 1460. The air discharge blows pellets past pipe connections and the diverter plate 1465 in outlet 1467 for discharge of dried pellets out of the dryer.

The rotor 1425 is preferably continuously turning during the full cleaning cycle. Solenoid valves are provided to supply air preferably at about between 60 psi to 80 psi, or more, to additional hang-up points not shown that include the water box bypass air port, rotor air ports, top section air port, pellet outlet air port and diverter valve air port. The solenoid valves include timers to provide short air bursts, preferably about three seconds, which cleans well and does not require a lot of time. A clean cycle button (not shown) activates the cleaning cycle with the water box bypass air port being energized first to allow air to purge the bypass with a multiplicity of air bursts, preferably five or more. The top section air port is then activated. This is followed sequentially with activation of the diverter plate 1465. This valve closes prior to activation of the spray nozzle assembly 1702 that washes the screen for one to ten seconds, preferably about six seconds. The blower 1760 should be deactivated during the water spray cycles and is then reactivated when the spray nozzle pump is de-energized thus completing one cleaning cycle. The cycle as herein described is not limited in scope and each component of the cycle can be varied in frequency and/or duration as necessitated to achieve appropriate removal of the residual pellets.

Blower 1760 in FIG. 3 is prone to abrasion, erosion, corrosion, and wear from by-products of the pelletization process as well as from the impact and/or adhesion of pellets on the surface of blower components, not shown, and can optionally be surface treated utilizing conventional nitriding, carbonitriding, sintering, high velocity air and fuel modified thermal treatments, and electrolytic plating. In addition, flame spray, thermal spray, plasma treatment, electroless nickel dispersion treatments, and electrolytic plasma treatments, singly and in combinations thereof can be utilized as is known to those skilled in the art.

Figure 29:
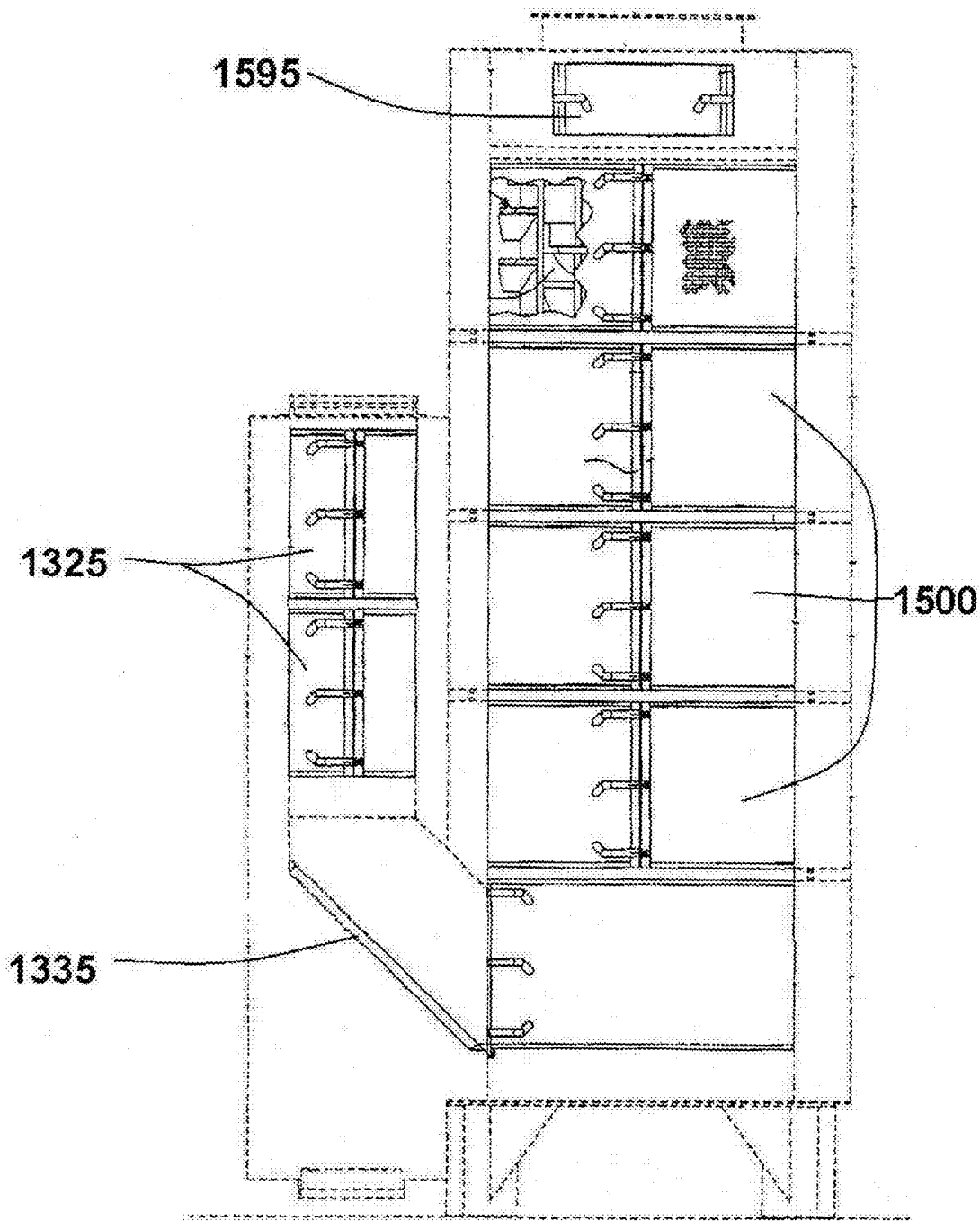
FIG. 29 is a schematic illustration of a dryer showing dewatering screen and centrifugal drying screen positioning.

The screens for the process include none, one or more horizontal or vertical dewatering screens 1325, inclined dewatering screen 1335, port screens 1595, and/or one or more cylindrically attachable screens 1500 as illustrated in FIG. 29. The size, composition, and dimensions of the screens should accommodate the pellets being generated and can be perforated, punched, pierced, woven, or of another configuration known to those skilled in the art and can be the same or different in construction, composition, and style. As the pellet size decreases in diameter, preferably the screens will be composed of two or more layers that can be of similar or different composition, design, and size. The screens are fixedly attached by latches, clamps, bolts, and many other mechanisms appropriately understood by those skilled in the art.

Figures 32, 33:
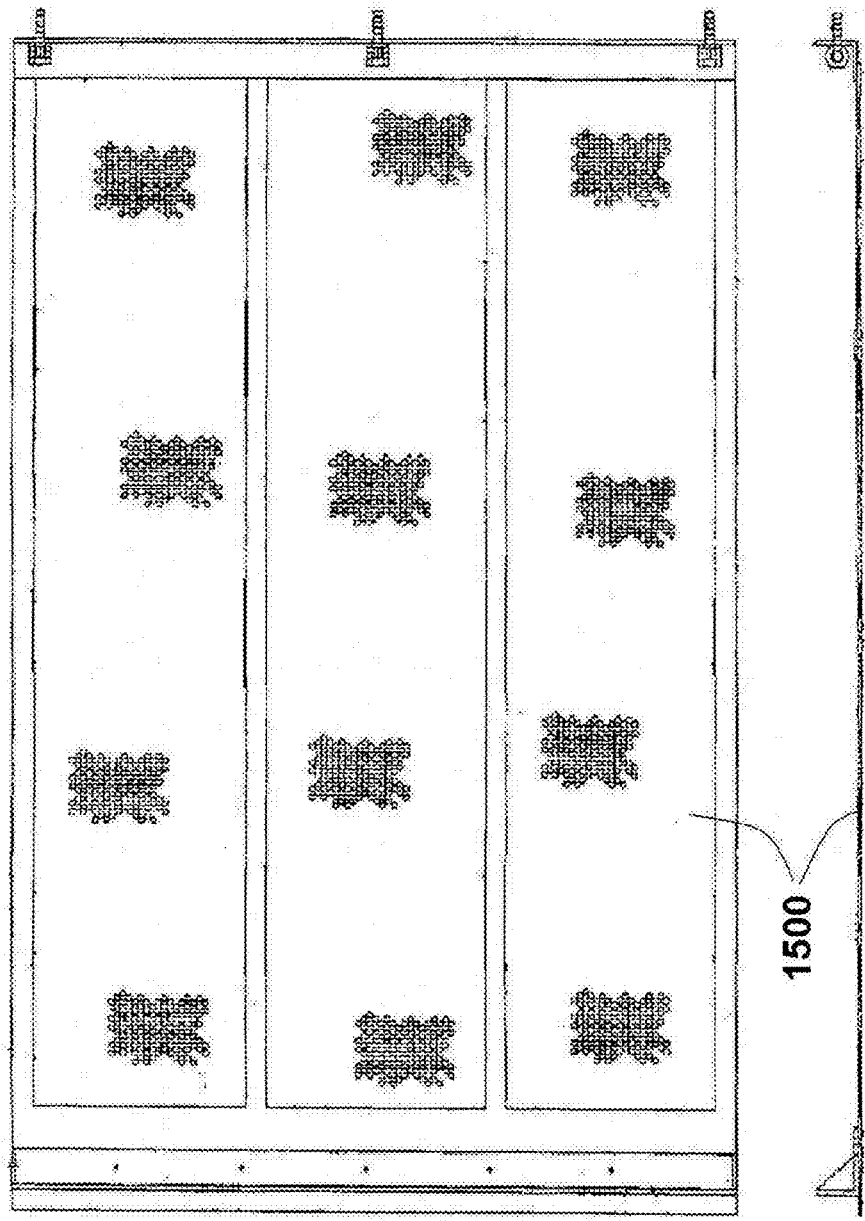
FIG. 32 illustrates a dryer screen of a configuration not requiring deflector bars.
FIG. 33 is a cross-sectional illustration of the dryer screen of FIG. 32 without deflector bars.
Figures 34, 35:
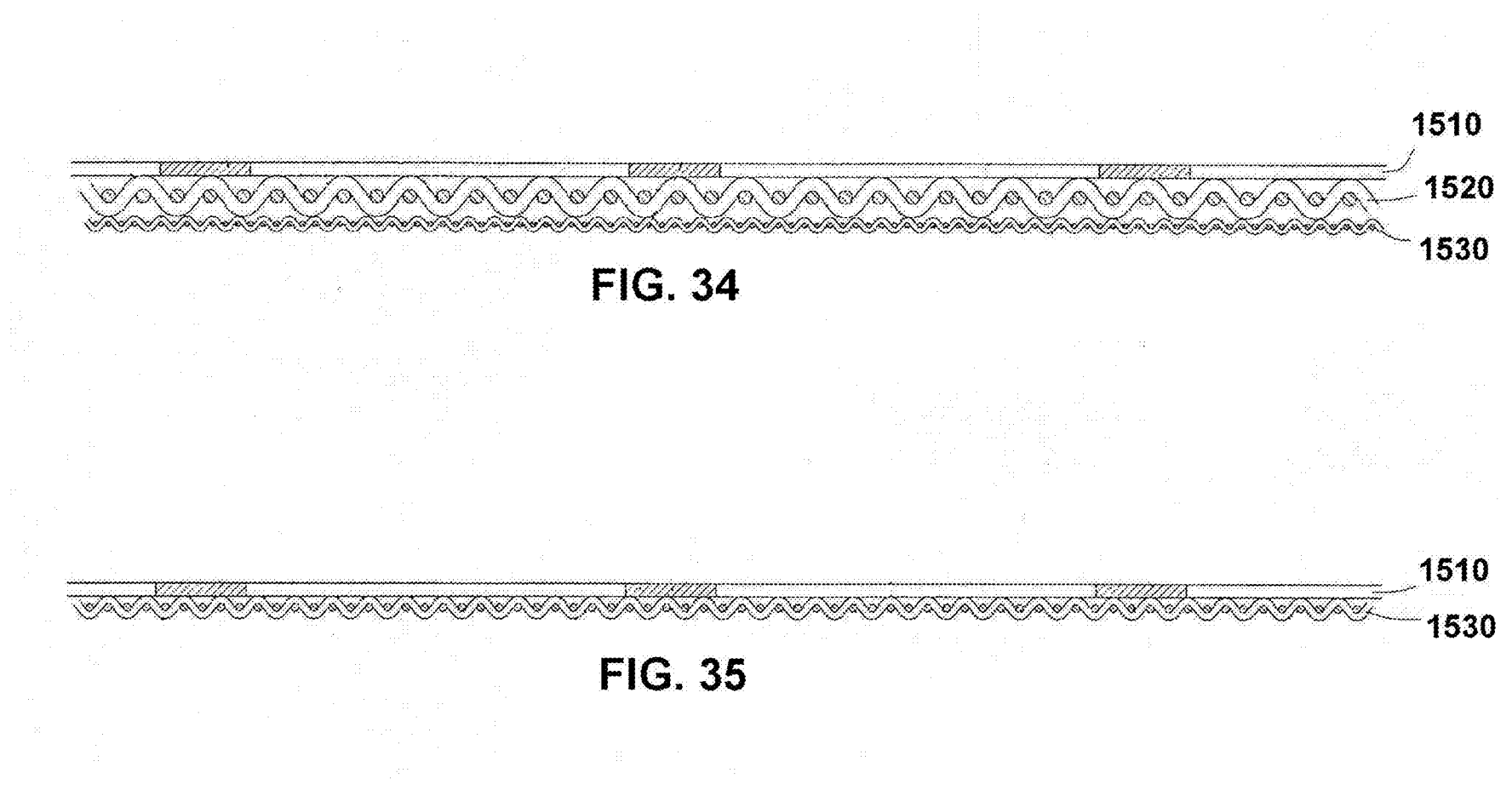
Figure 36:
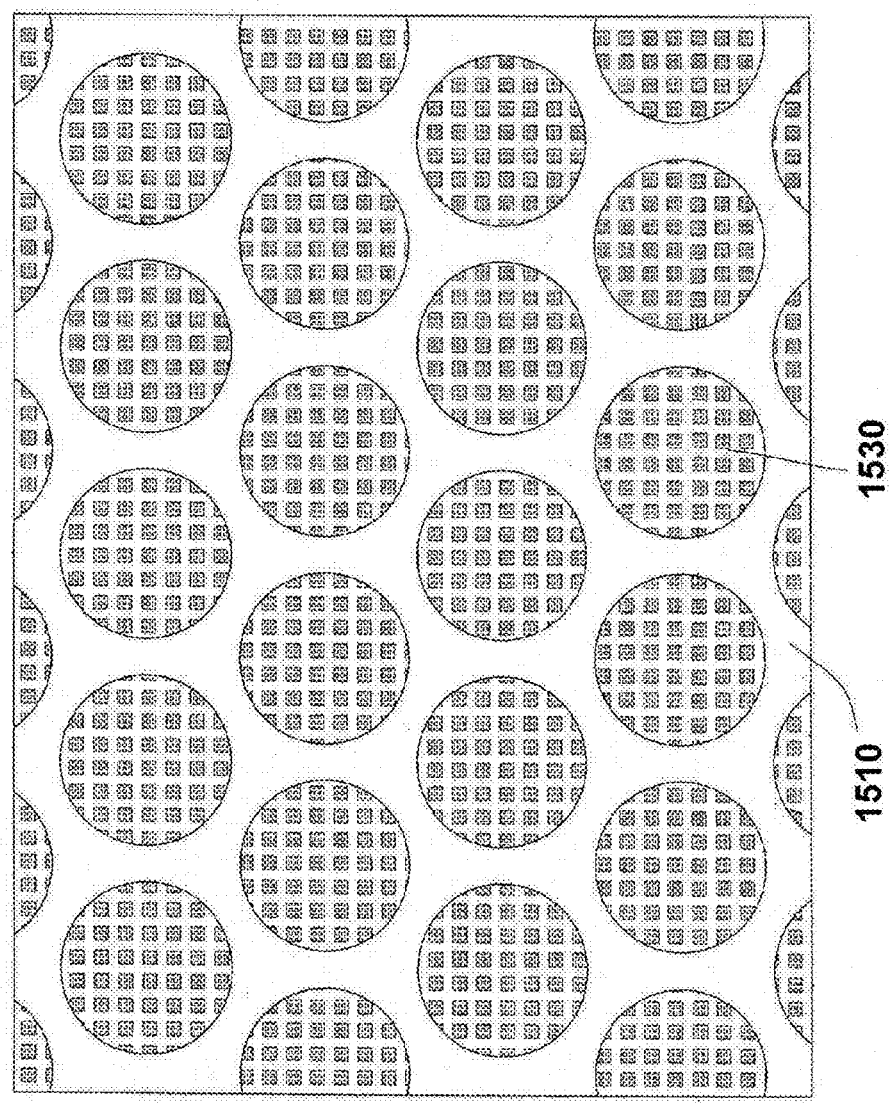
FIG. 36 illustrates an enlarged external view of a multi-layer screen following FIG. 35.

The screens 1500 are preferably of suitably flexible construction as to be circumferentially placed around the dryer 1400 and rotor 1425, and can contain deflector bars 1550 as illustrated in FIG. 30, face view, and FIG. 31, edge view, that are bolted in placed effectively segmentalizing the screen area into approximately equal areas. Alternatively, the screens can by free of deflector bars as seen in the face view of FIG. 32 with an edge view illustrated in FIG. 33. Preferably screens 1500 are compositionally two or more layers functionally incorporating an outer support screen and an inner screen that accomplishes the effective drying of the pellets and smaller micropellets. Additionally, one or more screen layers can be sandwiched between the outer support screen and the inner screen depending upon the particular application. FIG. 34 illustrates an edge view of a three-layer composition and FIG. 35 illustrates a similar edge view of a two-layer composition. FIG. 36 illustrates a surface view of a two-layer screen composition in that the view is from the side of the support layer through which is visualized the finer mesh screen layer.

The outer support screen 1510 can be composed of molded plastic or wire-reinforced plastic and compositionally can be polyethylene, polypropylene, polyester, polyamide or nylon, polyvinyl chloride, polyurethane, or similarly inert material that capably maintains its structural integrity under chemical and physical conditions anticipated in the operation of the centrifugal pellet dryers. Preferably the outer support screen 1510 is a metal plate of suitable thickness to maintain the structural integrity of the overall screen assembly and flexible enough to be contoured, exemplarily cylindrically, to fit tightly and positionally in the appropriate centrifugal pellet dryer. The metal plate is preferably 18 gauge to 24 gauge and most preferably is 20 to 24 gauge in thickness. The metal can compositionally be aluminum, copper, steel, stainless steel, nickel steel alloy, or similarly non-reactive material inert to the components of the drying process. Preferably the metal is stainless steel and most preferably is Grade 304 or Grade 316 stainless steel as necessitated environmentally by the chemical processes undergoing the drying operation.

The metal plate can be pierced, punched, perforated, or slotted to form openings that can be round, oval, square, rectangular, triangular, polygonal, or other dimensionally equivalent structure to provide open areas for separation and subsequent drying. Preferably the openings are round perforations and geometrically staggered to provide the maximum open area while retaining the structural integrity of the outer support screen. The round perforations are preferably at least approximately 0.075 inches (approximately 1.9 mm) in diameter and are positionally staggered to provide an open area of at least approximately 30%. More preferred is an open area geometric orientation such that the effective open area is approximately 40% or more. Most preferred are round perforations having a diameter of at least approximately 0.1875 inches (approximately 4.7 mm) that are positionally staggered to achieve an open area of approximately 50% or more.

Alternatively, the outer support screen can be an assembled structure or screen composed of wires, rods, or bars, stacked angularly or orthogonally, or interwoven, and welded, brazed, resistance welded or otherwise permanently adhered in position. The wires, rods, or bars can be plastic or wire-reinforced plastic compositionally similar to the molded plastic described above or can be metal, similarly and compositionally delineated as above and can be geometrically round, oval, square, rectangular, triangular or wedge-shaped, polygonal or structurally similar. The wires, rods, or bars across the width or warp of the screen can be the same as or different dimensionally as the wires, rods, or bars longitudinally contained as the weft, shute, or otherwise known to those skilled in the art.

Preferably the wires, rods, or bars are a minimum of approximately 0.020 inches (approximately 0.5 mm) in the narrowest dimension, more preferably are at least approximately 0.030 inches (approximately 0.76 mm) in the narrowest dimension, and most preferably are approximately 0.047 inches (approximately 1.2 mm) in the narrowest dimension. Open areas are dimensionally dependent on the proximal placement of adjacent structural elements and are positionally placed so as to maintain a percent open area of at least approximately 30%, more preferably above approximately 40%, and most preferably approximately 50% or greater.

The optional middle screen 1520 or screens and the inner screen 1530 are structurally similar to that described herein for the outer support screen. Dimensionally and compositionally the screens in the respective layers can be similar or different. The percent open area of the respective screens can be similar or different wherein lesser percent open area will reduce the effective open area of the screen and the least percent open area will be the most restrictive and therefore the delimiting percent open area for the screen assembly. The orientation of any screen relative to other layers of the assembly as well as the dimension and structural composition of the screens can be similar or different.

The inner screen 1530 is preferably a woven wire screen that can be in a square, rectangular, plain, Dutch or similar weave wherein the warp and weft wire diameters can be the same or different dimensionally or compositionally. More preferably the inner screen is a plain square or rectangular weave wire screen wherein the warp and weft wires are similar compositionally and dimensionally and the open area is approximately 30% or greater. Even more preferably, the inner layer screen is plain square or rectangular 30 mesh or larger mesh grade 304 or grade 316 stainless steel wherein the warp and weft wires are of a size to allow at least approximately 30% open area and most preferably are approximately 50% open area. Still more preferred is an inner screen of a plain square or rectangular weave of 50 mesh or greater mesh, with a percent open area of approximately 50% or greater. If incorporated, the middle screen 1520 would be of a mesh intermediate between the support screen 1510 and the inner screen 1530, and can be similar or different structurally, geometrically, compositionally, and orientationally. The two-layer screen is a preferred composition as delineated in the disclosure.

Returning to FIG. 25, conventional surface treatments to reduce abrasion, erosion, corrosion, wear, and undesirable adhesion and sticture to many parts of dryer 1400 can be nitrided, carbonitrided, sintered, can undergo high velocity air and fuel modified thermal treatments, and can be electrolytically plated. Exemplary of these dryer components can be included the inner surface of the upper feed chute 1844, the inner surface of the lower feed chute 1846, the inner surface of the base plate assembly 1848, the exterior surface of the pipe shaft protector 1850, the surface of the feed screen 1852 and the surface of the dewatering screen 1854 (FIG. 26), the surface of the screen assemblies 1856, the surface of the lifter assemblies 1858, the exterior surface of the support ring assemblies 1860, the inner surface of the upper portion of dryer housing 1862, the inner surface of the pellet chutes 1864 and 1868, and the exterior surface of the pellet diverter plate 1866. Components of blower 1760 similarly can be treated as is understood by those skilled in the art. Other surface treatments for improvement of surface properties, enhancement of corrosion and abrasion resistance, and improvement of wear can be used without intending to be limited.

Returning to FIG. 3, pellets discharged from dryer 1400 pass through pellet discharge chute 1460 and optionally can be deflected through exit 1475 as heretofore detailed or can pass through exit 1470 into and through pellet discharge chute extension 2040 separately positioned above and/or preferably attachedly connected to hopper or flow splitter 2000. Hopper or flow splitter 2000, as illustrated in FIG. 37, is metal or plastic square, round, rectangular, or other geometric configuration receiving device, without being limited, for the pellets which is of inlet 2030 diameter larger than the outside diameter of the pellet discharge chute extension 2040 to surroundingly encompass the outflow of pellets. From inlet 2030, the hopper or flow splitter 2000 taperingly decreases 2032 to chamber 2034 that can be geometrically similar or different than is inlet 2030. Hopper or flow splitter 2000 is preferably 18 gauge to 24 gauge metal and most preferably is 20 to 24 gauge in thickness. The metal can compositionally be aluminum, copper, steel, stainless steel, nickel steel alloy, or similarly non-reactive material inert to the components of the drying process. Preferably the metal is stainless steel and most preferably is Grade 304 or Grade 316 stainless steel as necessitated environmentally by the chemical processes undergoing the drying operation.

Additionally, conventional surface treatments to reduce abrasion, erosion, corrosion, wear, and undesirable adhesion and sticture can be applied to the inner surface (not shown) of hopper or flow splitter 2000. The inner surface can be nitrided, carbonitrided, sintered, can undergo high velocity air and fuel modified thermal treatments, and can be electrolytically plated. Additionally, flame spray, thermal spray, plasma treatment, electroless nickel dispersion treatments, and electrolytic plasma treatments, singly and in combinations thereof, can be applied wherein these treatments metallize the surface, preferably fixedly attach metal nitrides to the surface, more preferably fixedly attach metal carbides and metal carbonitrides to the surface, even more preferably fixedly attach diamond-like carbon to the surface, still more preferably attach diamond-like carbon in an abrasion-resistant metal matrix to the surface, and most preferably attach diamond-like carbon in a metal carbide matrix to the surface. Other ceramic materials can be used and are included herein by way of reference without intending to be limited.

Preferred surface treatments of this embodiment of the present invention can be further modified by application of a polymeric coating on the surface distal from the component substrate to reduce pellet adhesion, sticture, accumulation, and agglomeration to limit or prevent obstruction and blockage of the passageways. Preferably, the polymeric coatings are themselves non-adhesive and of low coefficient of friction. More preferably, the polymeric coatings are silicones, fluoropolymers, and combinations thereof. Most preferably, the application of the polymeric coatings requires minimal to no heating to effect drying and/or curing. The methods or application and benefits provided by these treatments for these components follow from those previously described herein.

Surface treatments as described herein can involve at least one, preferably two, and optionally multiple processes inclusive and exemplary of which are cleaning, degreasing, etching, primer coating, roughening, grit-blasting, sand-blasting, peening, pickling, acid-wash, base-wash, nitriding, carbonitriding, electroplating, electroless plating, flame spraying including high velocity applications, thermal spraying, plasma spraying, sintering, dip coating, powder coating, vacuum deposition, chemical vapor deposition, physical vapor deposition, sputtering techniques, spray coating, roll coating, rod coating, extrusion, rotational molding, slush molding, and reactive coatings utilizing thermal, radiational, and/or photoinitiation cure techniques, nitriding, carbonitriding, phosphating, and forming one or more layers thereon.

The layers can be similar in composition, different in composition, and many combinations thereof in multiple layer configurations.

Materials applied utilizing these processes can include at least one of metals, inorganic salts, inorganic oxides, inorganic carbides, inorganic nitrides, inorganic carbonitrides, corrosion inhibitors, sacrificial electrodes, primers, conductors, optical reflectors, pigments, passivating agents, radiation modifiers, primers, topcoats, adhesives, and polymers including urethanes and fluorourethanes, polyolefins and substituted polyolefins, polyesters, polyamides, fluoropolymers, polycarbonates, polyacetals, polysulfides, polysulfones, polyamideimides, polyethers, polyetherketones, silicones, and the like without intending to be limited. The inorganic salts, inorganic oxides, inorganic carbides, inorganic nitrides, and inorganic carbonitrides are preferably metal salts, metal oxides, metal carbides, metal nitrides, and metal carbonitrides respectively.

As illustrated in FIG. 3 and detailed in FIG. 37, inlet pipe 2002 is attachedly connected to inlet 2036, optionally including a venturi or eductor, to introduce transport fluid to and through chamber 2034 to entrain the pellets into that transport fluid forming a pellet and liquid slurry passes through outlet 2038 into attachedly connected transport pipe 2004. The distal end of transport pipe 2004 is attachedly connected to inlet valve 2006 through which is transported the pellet and liquid slurry into agglomerate catcher 2008 through the tank inlet valve 2014a and into tank 2060a fitted with agitator 2016a. Overflow assembly 2010 allows transport fluid to continue flowing into and through effluent pipe 2066 as eventuated by periodic maintenance thusly preventing shutdown of the continuous process. Alternatively, the transport pipe 2004 may be modified as an accelerated transport pipe, section 7b, as detailed in FIG. 23.

Optionally inlet valve 2006 can be attachedly connected to bypass pipe 2068 is illustrated in FIG. 37. This facilitates complete bypass of the pellet crystallization system and connects directly to transport pipe 2024 proximal to the agglomerate catcher 1300. Optional valving (not shown) can be utilized to prevent back-up into pipes not actively in use for the bypass process as is understood by someone skilled in the art.

On start-up, tanks 2060b and 2060c are filled with transport fluid through transport fluid valves 2012b and 2012c, respectively with potential overflow through orifices 2062b and 2062c that attachedly connect to effluent pipe 2066. Initially, the pellet and liquid slurry enters tank 2060a as previously filled tank 2060b begins to drain through drain valve 2018b with transport fluid valve 2012b now closed. Once tank 2060a is filled with the pellet and liquid slurry with agitation and/or after the cycle time is met, inlet valve 2014a closes and inlet valve 2014b opens to fill tank 2060b. Simultaneously, transport fluid valve 2012c is closed and drain valve 2018b opens. The cycle is now continuous and can be fully automated with flow of the pellet and liquid slurry into and ultimately through each of the three tanks 2060a, b, and c, respectively. The inlet valves 2014a, b, and c as well as drain valves 2018a, b, and c can be actuated manually, mechanically, hydraulically, electrically, and many combinations thereof and automation of these processes can be controlled manually by programmable logic control (PLC), or many comparable methods known to those skilled in the art.

On completion of the appropriate residence and/or cycle time for each tank, the appropriate drain valve 2018 a, b, or c opens and the pellet and liquid slurry flows into effluent pipe 2066 and is transported assistedly by pump 2022 into and through transport pipe 2024 to a dryer as illustrated in FIG. 37 and heretofore described as dryer 1400 in FIG. 3. The section 5 dryer (FIG. 3) and section 10 dryer (FIG. 37) can be the same or different structurally and/or dimensionally and details and options for the section 10 dryer are detailed in association with dryer 1400 in FIGS. 3, 24 to 36. Pump 500 and heat exchanger 520 as illustrated for FIG. 3 serve comparable or equivalent functions or can differ in sizing including, but not limited to, head, flow rates, heat loads, and transport agent temperatures as illustrated in FIG. 37 and are fixedly attached to inlet pipe 2002 heretofore described.

Overflow orifices 2062a, b, and c can be attachedly covered by a screen (not shown) of one or more layers and mesh size as dictated by the particle size of the individual process. Screen composition and construction follow that hereinbefore delineated for screen 1500, FIGS. 29 through 36.

Optionally, the entire pellet crystallization system, section 8, in FIG. 37 can be elevated above the level of the agglomerate catcher 1300 and dryer 1400 to allow gravity flow into the drying process 10 thusly avoiding the need for pump 2022 as heretofore described.

While FIG. 37 illustrates a preferred three (3) compartment unit design with tanks 2060a, b, and c, at least one (1) tank can allow crystallization to be accomplished in the instant invention. Two (2) or more tanks reduce the effective residence time and improve the operation of the cycle to enhance crystallization. Three (3) or more tanks in a common unit, and more preferably, three (3) or more individual tanks interconnectedly attached to accommodate the appropriate volumes and cycle times as necessitated by the throughput of the individual process are well within the scope of the present invention. As throughput rates and/or residence times for crystallization increase, four (4) or more tanks, stand alone or in unit construction, are still more preferred effectively reducing the individual tank size and enhancing the cycle time as is understood by someone skilled in the art.

Additionally, surface treatments to reduce abrasion, erosion, corrosion, wear, and undesirable adhesion and sticture can be applied to the inner surface (not shown) of tanks 2060a, b, and c, FIG. 37, screens (not shown) over the overflow orifices 2062a, b, and c, and the lumens (not shown) of distribution pipe 2064, effluent pipe 2066, bypass pipe 2068, and transport pipe 2024. The inner surface can be nitrided, carbonitrided, sintered, can undergo high velocity air and fuel modified thermal treatments, and can be electrolytically plated. Additionally, flame spray, thermal spray, plasma treatment, electroless nickel dispersion treatments, and electrolytic plasma treatments, singly and in combinations thereof, can be applied wherein these treatments metallize the surface, preferably fixedly attach metal nitrides to the surface, more preferably fixedly attach metal carbides and metal carbonitrides to the surface, even more preferably fixedly attach diamond-like carbon to the surface, still more preferably attach diamond-like carbon in an abrasion-resistant metal matrix to the surface, and most preferably attach diamond-like carbon in a metal carbide matrix to the surface. Other ceramic materials can be used and are included herein by way of reference without intending to be limited.

Preferred surface treatments of this embodiment of the present invention can be further modified by application of a polymeric coating on the surface distal from the component substrate to reduce pellet adhesion, sticture, accumulation, and agglomeration to limit or prevent obstruction and blockage of the passageways. Preferably, the polymeric coatings are themselves non-adhesive and of low coefficient of friction. More preferably, the polymeric coatings are silicones, fluoropolymers, and combinations thereof. Most preferably, the application of the polymeric coatings requires minimal to no heating to effect drying and/or curing. The methods or application and benefits provided by these treatments for these components follow from those previously described herein.

Surface treatments as described herein can involve at least one, preferably two, and optionally multiple processes inclusive and exemplary of which are cleaning, degreasing, etching, primer coating, roughening, grit-blasting, sand-blasting, peening, pickling, acid-wash, base-wash, nitriding, carbonitriding, electroplating, electroless plating, flame spraying including high velocity applications, thermal spraying, plasma spraying, sintering, dip coating, powder coating, vacuum deposition, chemical vapor deposition, physical vapor deposition, sputtering techniques, spray coating, roll coating, rod coating, extrusion, rotational molding, slush molding, and reactive coatings utilizing thermal, radiational, and/or photoinitiation cure techniques, nitriding, carbonitriding, phosphating, and forming one or more layers thereon. The layers can be similar in composition, different in composition, and many combinations thereof in multiple layer configurations.

Materials applied utilizing these processes can include at least one of metals, inorganic salts, inorganic oxides, inorganic carbides, inorganic nitrides, inorganic carbonitrides, corrosion inhibitors, sacrificial electrodes, primers, conductors, optical reflectors, pigments, passivating agents, radiation modifiers, primers, topcoats, adhesives, and polymers including urethanes and fluorourethanes, polyolefins and substituted polyolefins, polyesters, polyamides, fluoropolymers, polycarbonates, polyacetals, polysulfides, polysulfones, polyamideimides, polyethers, polyetherketones, silicones, and the like without intending to be limited. The inorganic salts, inorganic oxides, inorganic carbides, inorganic nitrides, and inorganic carbonitrides are preferably metal salts, metal oxides, metal carbides, metal nitrides, and metal carbonitrides respectively.

Alternatively, hopper or flow splitter 2000 can be fixedly attached at outlet 2038, FIG. 37, to a multiplicity of outlet pipes by common attachment pipe (not shown) through which the throughput flow of the pellet and liquid slurry is divided and distributionally regulated by valves (not shown) as is understood by those skilled in the art, to provide uniform and equivalent flows to a multiplicity of pellet crystallization system (PCS) assemblies identified as section 8 in FIG. 37. The PCS system heretofore described and parallel PCS assemblies optionally can be serially attached to additional PCS systems the numbers of which, both in parallel and/or serially, are dependent on the dimensions of PCS system, pellet content of pellet and liquid slurry, throughput rate, throughput volume, residence time, temperature variance, and degree of crystallization specific to the process for a particular pellet and liquid slurry. Without intending to be bound by theory, PCS systems in series can be the same or different in temperature wherein additional heating potentially can increase the level of crystallization and cooling potentially can decrease the level of tack facilitating the downstream drying and post-processing components of the particular process. The optimization of potential increase in crystallization and potential decrease in tack is determined by the chemical composition and/or formulation of the material being processed.

Figure 38A:
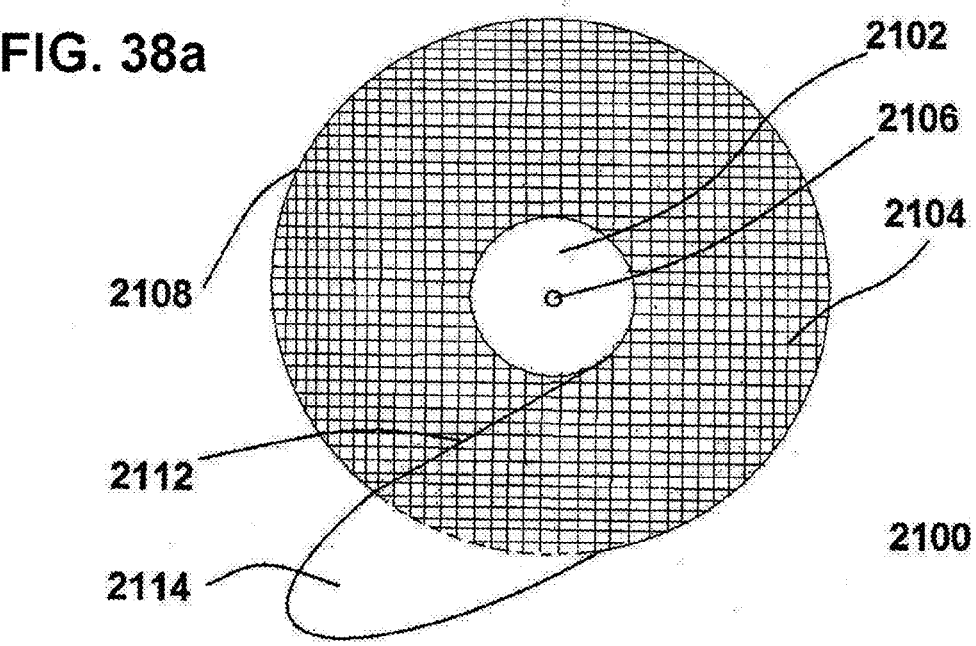
FIG. 38a is a vertical schematic view of a vibratory unit with deflector weir and pan for powder treatment of pellets.

The substantially dried pellets discharged from the dryer 1400 in FIG. 37 exit through pellet discharge chute 1460 to and through exit 1470 and optionally into and through pellet discharge chute extension 2040. These pellets optionally can be packaged, stored, transported or additionally processed. Alternatively, the pellets can be introduced into a coating pan 2102, FIGS. 38a and 38b, which is fixedly attached by bolt 2106 to the sizing screen 2104, preferably centered, in an eccentric vibratory unit 2100. The design and mechanism of operation of an eccentric vibratory unit 2100 are well known to those skilled in the art. The coating pan 2102 preferably is diametrically smaller than the diameter of the sizing screen 2104, and is preferably one-half the diameter of the sizing screen 2104. The circumference of sizing screen 2104 is bounded by unit housing 2108. The coating pan 2104 is comprised of a solid circular base satisfying the heretofore described dimensional constraints with a circumferential wall at the edge of the base of at least approximately one inch (approximately 2.5 centimeters) such that the coating material is contained therein and such that the throughput volume of the pellets introduced from pellet outlet chute 1460 is confined for an appropriate time, at approximately five (5) seconds or less, and more preferably approximately two (2) seconds or less, allowing uniform coating of the pellets expedited by the vibration of the vibratory unit 2100. The screen 2104 composition can be of construction similarly described for screen assembly 1500 of at least one layer previously described herein. The unit is fittedly attached with cover 2120.

Figure 38B:
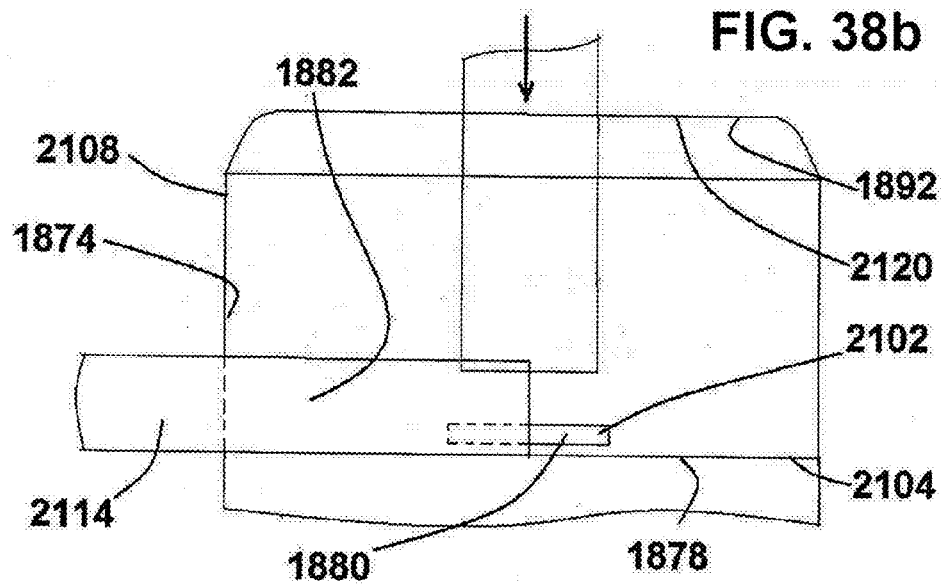
FIG. 38b is a side view illustration of a vibratory unit with deflector weir and pan for powder treatment of pellets.

The coated pellet ultimately is vibratably shaken from the coating pan 2102 onto sizing screen 2104 and circumnavigates the screen effectively removing excipient coating material that passes through the screen and is expelled from the apparatus through an outlet 2114, FIG. 38b. The coated pellet migrates about the screen until it encounters deflector weir 2112 that redirects the coated pellet through outlet 2114. Deflector weir 2112 is affixedly and tangentially attached to the wall of coating pan 2102 and distally to the unit housing 2108 adjacent to outlet 2114. Preferably the weir 2112 tapers in width from that equivalent to the wall height of the coating pan 2102 to at least two times that at the attachment point adjacent to the unit housing 2108.

Coatings can be applied to pellets to reduce or eliminate tack, to provide supplementary structural integrity to the pellet, to introduce additional chemical and/or physical properties, and to provide color and other esthetic enhancement. Exemplary of coating materials can be, but are not limited to, talc, carbon, graphite, fly ash, wax including microcrystalline, detackifying agents, calcium carbonate, pigments, clay, wollastonite, minerals, inorganic salts, silica, polymeric powders, and organic powders. Preferably, the coating materials are powders.

Figure 39A:
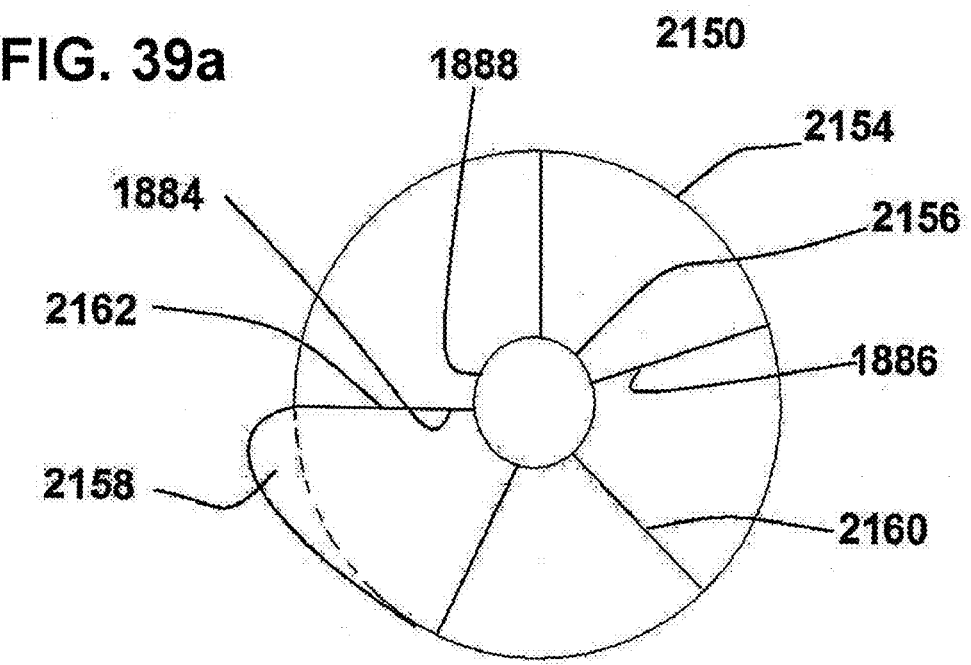
FIG. 39a is a vertical schematic view of a vibratory unit with deflector weir and retainer weirs for enhanced crystallization of pellets.
Figure 39B:
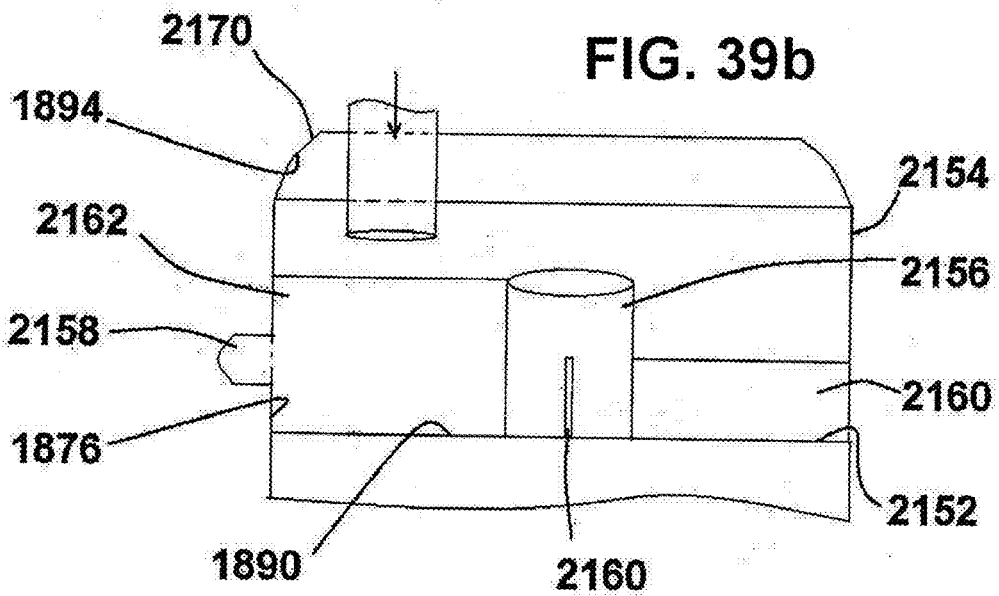
FIG. 39b is a side view illustration of a vibratory unit with deflector weir and retainer weirs for enhanced crystallization of pellets.

FIGS. 39a and 39b illustrate an alternative eccentric vibratory unit 2150 that can increase residence time allowing additional drying, cooling, and/or preferably crystallization and any combination thereof. The unit 2150 comprises a solid plate 2152 circumferentially enclosed by and fixedly attached to the unit housing 2154. Centrally attached onto the solid plate 2152 is a cylindrical core 2156 to which are attachedly and perpendicularly connected at least one and, preferably, a plurality of weirs. Deflector weir 2162 is fixedly attached to the unit housing 2154 distally from the cylindrical core 2156 and adjacent to outlet 2158. Preferably at least one (1) retainer weir 2160 and more preferably at least two (2) retainer weirs 2160 are similarly attached to the cylindrical core 2156 and the unit housing 2154. Retainer weir or a plurality thereof are lower in height than is the deflector weir 2162 and preferably are one-half the height of the deflector weir 2156. Retainer weirs 2160 are circumferentially placed around the unit 2150 and can be positioned symmetrically, asymmetrically, or both. The unit is fittedly attached with cover 2170.

Pellets are fed into unit 2150 on the side of the deflector weir 2162 remote from outlet 2158. Movement of pellets occurs circumferentially about the unit 2150 until a retainer weir 2160 is encountered, if any, against which pellet volume accumulates until such volume exceeds the height of retainer weir 2160 and pellets fall over to migrate vibrationally therearound to the next retainer weir 2160 or deflector weir 2162 as determined by design of unit 2150. Upon encounter of the pellet and the deflector weir 2156, movement of the pellet is redirected to and through outlet 2158. The design and mechanism of operation of that eccentric vibratory unit 2150 are well known to those skilled in the art. Increasing the number of retainer weirs 2160 increases the volume of pellets allowed to accumulate, thusly increasing the residence time the pellets are retained by the eccentric vibratory unit 2150. Variance of the number and/or height of the retainer weirs 2160 can enhance the effective drying, cooling, and crystallization times for the pellets. On deflection to and through outlet 2158 the pellets can be transported to additional post-processing and/or storage as required.

The present invention anticipates that other designs of eccentric vibratory units, oscillatory units, and their equivalent known to those skilled in the art can be used effectively to achieve comparable results as disclosed herein. Components of the assemblies for the eccentric vibratory units described herein can be metal, plastic or other durable composition and are preferably made of stainless steel, and most preferably are made of 304 stainless steel. The shape of the vibratory units in FIGS. 35a, 35b, 36a, and 36b may be round, oval, square, rectangular or other appropriate geometrical configuration and is not limited.

Referring again to FIGS. 38a, b and 39a, b, conventional surface treatments to reduce abrasion, erosion, corrosion, wear, and undesirable adhesion and sticture to many parts of vibratory units 2100 and 2150 can be nitrided, carbonitrided, sintered, can undergo high velocity air and fuel modified thermal treatments, and can be electrolytically plated. Exemplary of these vibratory unit components can be the inner surface of housings 1874 and 1876, the surface of screen 1878, the surface of coating pan 1880, the surface of deflector weir 1882, the surfaces of deflector weir 1884 and the surfaces of retainer weirs 1886, the outer surface of the cylindrical core 1888, the upper surface of baseplate 1890, and the inner surface of cover assemblies 1892 and 1894. Other surface treatments for improvement of surface properties, enhancement of corrosion and abrasion resistance, improvement of wear, and/or reduction of clumping, agglomeration, and/or sticture can be used without intending to be limited.

The temperature of the transport fluid for sections 4a (FIG. 3) and 4b (FIG. 23 and comparative to section 9b) can be the same as or different than that of sections 9a and 9b. Preferably the temperature of the transport fluid in sections 9a and 9b is higher to achieve enhancement of crystallization. Additionally the temperature of the transport fluid in sections 9a (FIG. 37) and 9b (FIG. 23 and comparative to section 4b) can be lower to reduce or avoid tack for the pellets formed. Similarly, the composition of the transport fluid for sections 4a and 4b can be the same as or different than that of the transport fluid in Sections 9a and 9b. Additives can be added to the water including, but not limited to, glycols, glycerols, water-miscible solvents, cosolvents, surfactants, defoamers, pellet coating formulations, and/or viscosity modifiers. Preferably both transport fluids in sections 4a and 4b as well as sections 9a and 9b are water, and more preferably, both sections 4a and 4b as well as sections 9a and 9b are at temperatures below the boiling point of water eliminating the need for additional application of pressure in the transport systems. Materials that can be crystallized include, and are not limited to, polyolefins, polyesters, polyamides, polyurethanes, hot melt adhesives, polyethers, polycarbonates, polysulfones, polysulfides, and many copolymers thereof. Preferably, the materials can be controllably extruded to maintain temperatures such that pelletization does not result in freeze off, wrap around of the die, and other problematic process challenges known to those skilled in the art and typical of high melt index, low viscosity, and narrow melting point. More preferably, the controllably pelletized materials can be crystallized according to the extant invention wherein expedition of pellet and liquid slurry transport, increased and/or decreased temperature with agitation, increased residence time, optional multiple parallel and/or serial pellet crystallization systems can be attachedly connected, optional pellet coating, and optional post pellet crystallization enhancement are disclosed.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method of multiple sequential processing to achieve crystallization of polymeric material comprising:
   feeding the polymeric material to a mixer,
   mixing the polymeric material in the mixer,
   extruding the polymeric material from the mixer,
   pelletizing the extruded polymeric material,
   first transporting the pelletized polymeric material to a first dryer, a first transport medium used to transport the pelletized polymeric material at a first temperature,
   first drying the pelletized polymeric material in the first dryer,
   second transporting the dried pelletized polymeric material to a pellet crystallization system, a second transport medium used to transport the pelletized polymeric material at a second temperature,
   crystallizing the pelletized polymeric material in the pellet crystallization system,
   third transporting the crystallized and pelletized polymeric material to a second dryer, a third transport medium used to transport the crystallized and pelletized polymeric material at a third temperature, and
   second drying the crystallized and pelletized polymeric material,
   wherein the first, second, and third temperatures are different.

2. The method of multiple sequential processing according to claim 1, wherein the first, second and third transport media are water.

3. The method of multiple sequential processing according to claim 1, wherein the first temperature is lower than the third temperature, enhancing crystallization.

4. The method of multiple sequential processing according to claim 1, wherein mixing the polymeric material occurs at mixing processing conditions, and extruding the polymeric material occurs at extruding processing conditions, and at least one common condition of both the mixing processing conditions and the extruding processing conditions are different.

5. The method of multiple sequential processing according to claim 1, wherein one or more of the first, second and third transporting steps comprises the injection of pressurized inert gas to minimize cooling of the pelletized polymeric material.

6. The method of multiple sequential processing according to claim 1, wherein the first dryer and the second dryer are the same dryer.

7. The method of multiple sequential processing according to claim 1, wherein first drying the pelletized polymeric material occurs at first drying processing conditions, and second drying the crystallized and pelletized polymeric material occurs at second drying processing conditions, and at least one common condition of both the first and second drying conditions are different.

8. A method of multiple sequential processing to achieve crystallization of polymeric material comprising:
   providing multiple sequential processing steps to process polymeric material into crystallized and pelletized polymeric material, the steps comprising;
      feeding the polymeric material to a mixer,
      mixing the polymeric material in the mixer,
      extruding the polymeric material from the mixer,
      pelletizing the extruded polymeric material,
      first transporting the pelletized polymeric material to a first dryer,
      first drying the pelletized polymeric material in the first dryer,
      second transporting the dried pelletized polymeric material to a pellet crystallization system,
      crystallizing the pelletized polymeric material in the pellet crystallization system,
      third transporting the crystallized and pelletized polymeric material to a second dryer, and
      second drying the crystallized and pelletized polymeric material,
   operating each of the processing steps at processing conditions;
   wherein each of the processing steps operates at least one different condition from each of the other of the processing steps.

9. The method of multiple sequential processing according to claim 8 further comprising injection of pressurized inert gas into one or more of the transporting steps to expedite the transport rate to minimize cooling of the pellets.

10. The method of claim 8, wherein a processing condition is temperature.

11. The method of claim 8, wherein a processing condition is pressure.

12. The method of claim 8, wherein a processing condition is flow rate.

13. The method of claim 8, wherein a processing condition is residence time.

14. The method of claim 8, wherein a processing condition is agitation rate.

15. The method of claim 8, wherein a processing condition is transfer agent.

16. The method of claim 8, further comprising surface treating at least a portion of at least one component of the multiple sequential processing steps with at least one component layer.

17. The method of claim 16, wherein the at least one component layer is a cleaning, degreasing, etching, primer coating, roughening, grit-blasting, sand-blasting, peening, pickling, acid-wash, base-wash, nitriding, carbonitriding, electroplating, electroless plating, flame spraying, thermal spraying, plasma spraying, sintering, dip coating, powder coating, vacuum deposition, chemical vapor deposition, physical vapor deposition, sputtering, spray coating, roll coating, rod coating, extrusion, rotational molding, slush molding, reactive coating, or phosphating agent, or combinations thereof.

18. The method of claim 1, further comprising surface treating at least a portion of at least one component of the multiple sequential process with at least one component layer.

19. The method of claim 18, wherein the at least one component layer is a cleaning, degreasing, etching, primer coating, roughening, grit-blasting, sand-blasting, peening, pickling, acid-wash, base-wash, nitriding, carbonitriding, electroplating, electroless plating, flame spraying, thermal spraying, plasma spraying, sintering, dip coating, powder coating, vacuum deposition, chemical vapor deposition, physical vapor deposition, sputtering, spray coating, roll coating, rod coating, extrusion, rotational molding, slush molding, reactive coating, or phosphating agent, or combinations thereof.

* * * * *